(12) United States Patent
Yamauchi et al.

(10) Patent No.: US 8,086,090 B2
(45) Date of Patent: *Dec. 27, 2011

(54) RECORDING MEDIUM AND PLAYBACK APPARATUS FOR SELECTING SUB-PICTURE DATA ACCORDING TO COMBINATION OF ASPECT RATIO OF DISPLAY SCREEN AND TYPE OF DISPLAY MODE

(75) Inventors: Kazuhiko Yamauchi, Neyagawa (JP); Kaoru Murase, Nara-ken (JP); Masayuki Kozuka, Neyagawa (JP); Shinichi Saeki, Osaka-fu (JP); Katsuhiko Miwa, Osaka (JP)

(73) Assignee: Panasonic Corporation, Osaka (JP)

( * ) Notice: Subject to any disclaimer, the term of this patent is extended or adjusted under 35 U.S.C. 154(b) by 1091 days.

This patent is subject to a terminal disclaimer.

(21) Appl. No.: 11/931,348

(22) Filed: Oct. 31, 2007

(65) Prior Publication Data

US 2008/0062256 A1 Mar. 13, 2008

Related U.S. Application Data

(62) Division of application No. 10/891,385, filed on Jul. 14, 2004, now Pat. No. 7,444,065, which is a division of application No. 10/456,776, filed on Jun. 6, 2003, now Pat. No. 6,785,463, which is a division of application No. 10/098,089, filed on Mar. 14, 2002, now Pat. No. 6,631,241, which is a division of application No. 09/311,019, filed on May 13, 1999, now Pat. No. 6,393,202, which is a division of application No. 08/853,070, filed on May 8, 1997, now Pat. No. 5,907,659.

(30) Foreign Application Priority Data

May 9, 1996 (JP) .................................. 8-114534

(51) Int. Cl.
*H04N 9/80* (2006.01)
(52) U.S. Cl. ......................................... 386/248; 386/232
(58) Field of Classification Search .................. 386/248, 386/232
See application file for complete search history.

(56) References Cited

U.S. PATENT DOCUMENTS 4,845,562 A 7/1989 Koslov et al.
(Continued)

FOREIGN PATENT DOCUMENTS

CA 2182260 2/1997
(Continued)

*Primary Examiner* — David Harvey

(57) ABSTRACT

A multimedia optical disc for recording main video data which is composed of sets of frame data that is processed beforehand to allow compatibility with displays of a plurality of aspect ratios. The disc has a stream area storing streams made up of the main video data and a plurality of sets of sub-picture data, with each set of sub-picture data including a set of tel-op data and a set of coordinate information showing a display position of the set of tel-op data. The disc also includes a control area storing a plurality of pairings of a set of display mode information and a set of sub-picture indicating information. Each set of display mode information shows a species of display method according to which the frame data is to be processed for a case when the frame data decoded from the main video data is displayed at one of the plurality of aspect ratios. Each set of sub-picture indicating information shows a set of sub-picture data, out of the plurality of sets of sub-picture data in a same stream as the main video data, which includes a set of coordinate information which coincides with the species of display method shown by the display mode information.

2 Claims, 39 Drawing Sheets

U.S. PATENT DOCUMENTS

| | | | |
|---|---|---|---|
| 4,953,035 A | 8/1990 | Yoshio | |
| 5,043,826 A | 8/1991 | Yoshio et al. | |
| 5,065,252 A | 11/1991 | Yoshio et al. | |
| 5,097,349 A | 3/1992 | Nomura et al. | |
| 5,331,423 A | 7/1994 | Ota et al. | |
| 5,467,142 A | 11/1995 | Ichinokawa | |
| 5,506,370 A | 4/1996 | Nakai et al. | |
| 5,515,346 A | 5/1996 | Watanabe et al. | |
| 5,598,276 A | 1/1997 | Cookson et al. | |
| 5,630,006 A | 5/1997 | Hirayama et al. | |
| 5,655,052 A | 8/1997 | Nakai et al. | |
| 5,675,390 A | 10/1997 | Schindler et al. | |
| 5,687,160 A | 11/1997 | Aotake et al. | |
| 5,745,643 A * | 4/1998 | Mishina | 386/220 |
| 5,758,007 A | 5/1998 | Kitamura et al. | |
| 5,907,659 A | 5/1999 | Yamauchi et al. | |
| 6,166,778 A | 12/2000 | Yamamoto et al. | |
| 6,393,202 B1 | 5/2002 | Yamauchi et al. | |
| 6,463,210 B1 | 10/2002 | Yokogawa | |
| 6,535,688 B1 | 3/2003 | Kawamura et al. | |
| 6,631,241 B2 * | 10/2003 | Yamauchi et al. | 386/240 |
| 6,658,661 B1 | 12/2003 | Arsenault et al. | |

FOREIGN PATENT DOCUMENTS

| | | |
|---|---|---|
| EP | 661888 | 7/1995 |
| EP | 677961 | 10/1995 |
| EP | 0 738 078 | 4/1996 |
| EP | 724264 | 7/1996 |
| EP | 737008 | 10/1996 |
| EP | 737980 | 10/1996 |
| EP | 746162 | 12/1996 |
| JP | 8314485 | 11/1996 |
| JP | 8-336105 | 12/1996 |
| JP | 8336104 | 12/1996 |
| JP | 951501 | 2/1997 |
| WO | 95/12276 | 5/1995 |

\* cited by examiner

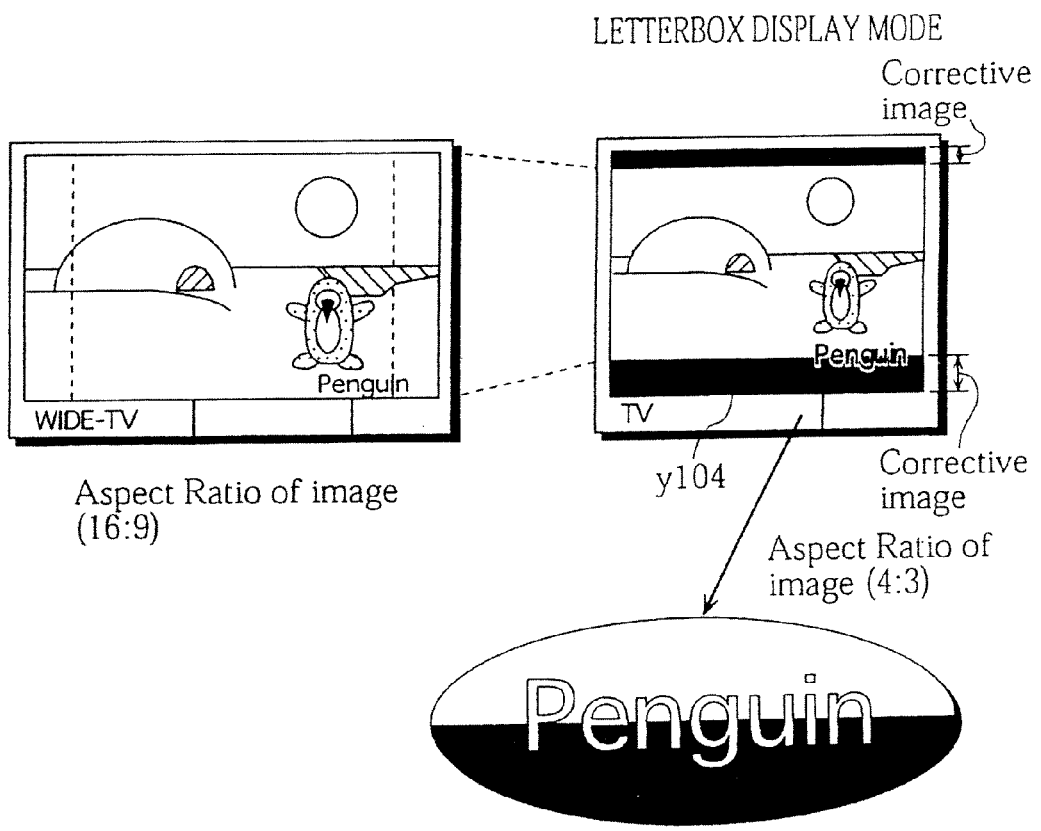

PAN SCAN DISPLAY MODE

LETTERBOX DISPLAY MODE

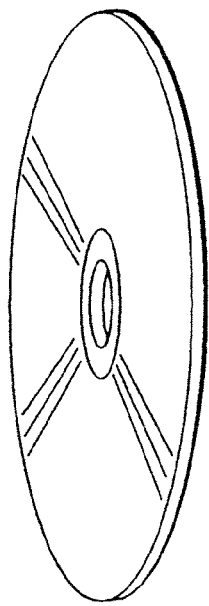
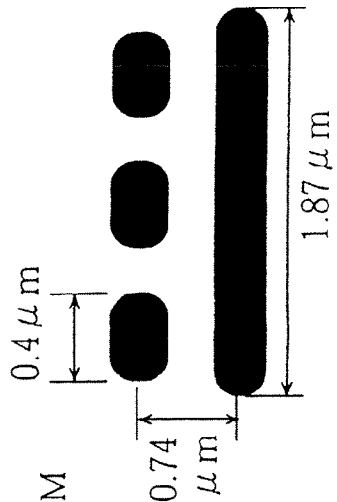
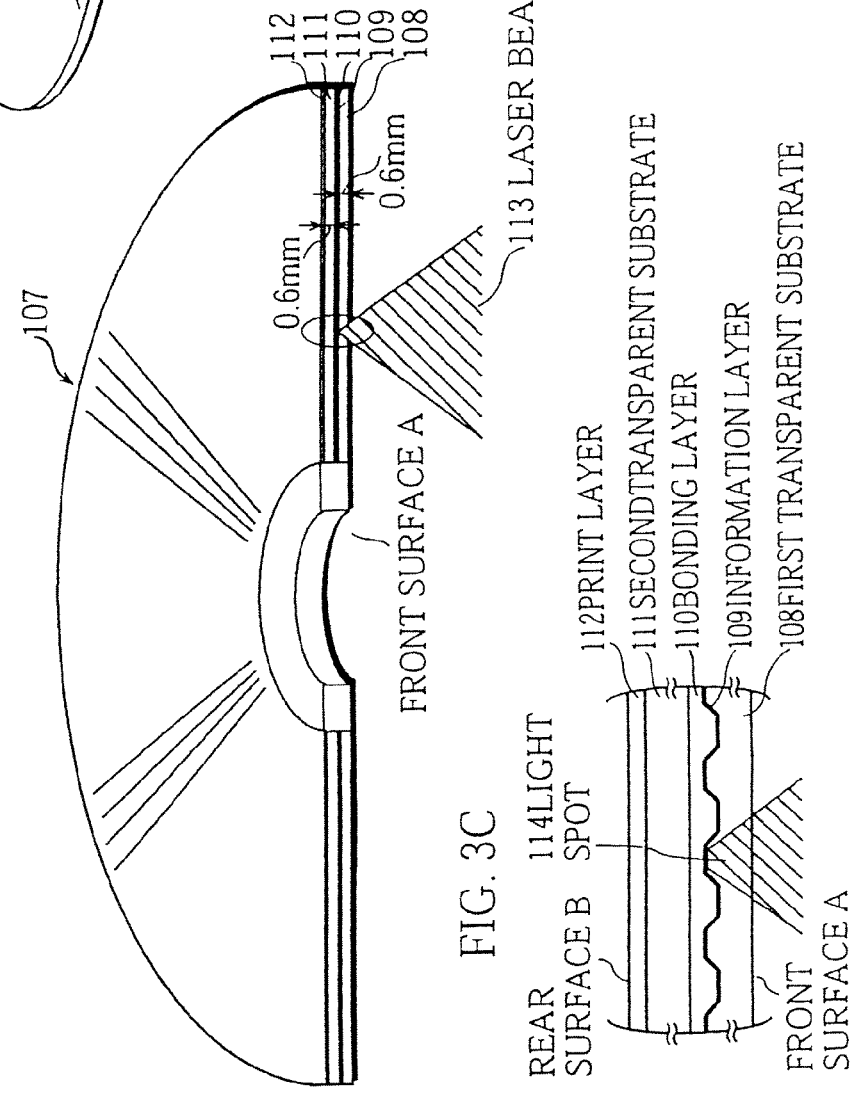
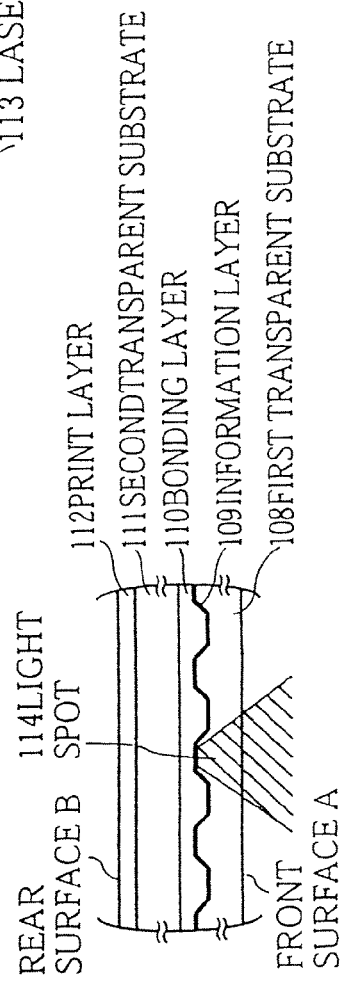

FIG. 7

| | |
|---|---|
| VOB#1(10min.) | ACTUAL FOOTAGE OF THE HABITAT OF THE EMPEROR PENGUIN |
| VOB#2(50sec.) | ACTUAL FOOTAGE OF A MOTHER AND CHILD RAZORBACK |
| VOB#3(8min.) | ACTUAL FOOTAGE OF THE BREAKAWAY OF THE ANTARCTIC CONTINENTAL ICE CAP |
| VOB#4(48sec.) | ACTUAL FOOTAGE OF THE INDENTATION OF THE WEDDELL SEA IN SOUTH NEW ZEALAND |
| VOB#5(13min.) | ACTUAL FOOTAGE SHOWING STATUES OF FAMOUS ANTARCTIC EXPLORERS AND THE ROUTES OF THEIR EXPEDITIONS |
| VOB#6(45sec.) | ACTUAL FOOTAGE REPORTING THE RECENT DEVELOPMENTS AT AN ANTARCTIC RESEARCH CAMP |
| VOB#7(16min.) | SCENE WITH AN EMPEROR PENGUIN HATCHING ITS EGGS |
| VOB#8(59sec.) | SCENE OF AN EMPEROR PENGUIN CHICK WALKING FOR THE FIRST TIME |
| VOB#9(6min.) | SCENE OF AN EMPEROR PENGUIN CATCHING FISH IN THE SEA |
| VOB#10(59sec.) | SCENE OF A MOTHER AND CHILD EMPEROR PENGUIN |

GROUP OF VIDEO MATERIALS

FIG. 8

VOB #1

| VOBU #1 (00:00.00) | VOBU #2 (00:00.50) | VOBU #3 (00:01.00) |
| VOBU #4 (00:01.50) | VOBU #5 (00:02.00) | VOBU #6 (00:02.50) |
| VOBU #7 (00:03.00) | VOBU #8 (00:03.50) | VOBU #9 (00:04.00) |
| VOBU #91 (00:45.50) | VOBU #92 (00:46.00) | VOBU #93 (00:46.50) |
| VOBU #94 (00:47.00) | VOBU #95 (00:47.50) | VOBU #96 (00:48.00) |
| VOBU #147 (01:13.50) | VOBU #148 (01:14.00) | VOBU #149 (01:14.50) |
| VOBU #150 (01:15.00) | VOBU #151 (01:15.50) | VOBU #152 (01:16.00) |
| VOBU #153 (01:16.50) | VOBU #154 (01:17.00) | VOBU #155 (01:17.50) |

FIG. 9

| VOBU#50 (00:00:25.00) | NAVI-50 | video50.1 | video50.2 | ... | audio-0.55 | audio-1.55 | audio-3.55 |
| VOBU#51 (00:00:25.50) | NAVI-51 | video51.1 | video51.2 | ... | SP-0.55.1 | SP-1.55.1 | SP-2.55.1 | ... | SP-15.55.1 |
| VOBU#52 (00:00:26.00) | NAVI-52 | video52.1 | video52.2 | ... | SP-0.55.2 | SP-1.55.2 | SP-2.55.2 | ... | SP-15.55.2 |
| VOBU#53 (00:00:26.50) | NAVI-53 | video53.1 | video53.2 | ... | SP-0.55.3 | SP-1.55.3 | SP-2.55.3 | ... | SP-15.55.3 |
| VOBU#54 (00:00:27.00) | NAVI-54 | video54.1 | video54.2 | ... | SP-0.55.4 | SP-1.55.4 | SP-2.55.4 | ... | SP-15.55.4 |
| VOBU#55 (00:00:27.50) | NAVI-55 | video55.1 | video55.2 | ... | SP-0.55.5 | SP-1.55.5 | SP-2.55.5 | ... | SP-15.55.5 |

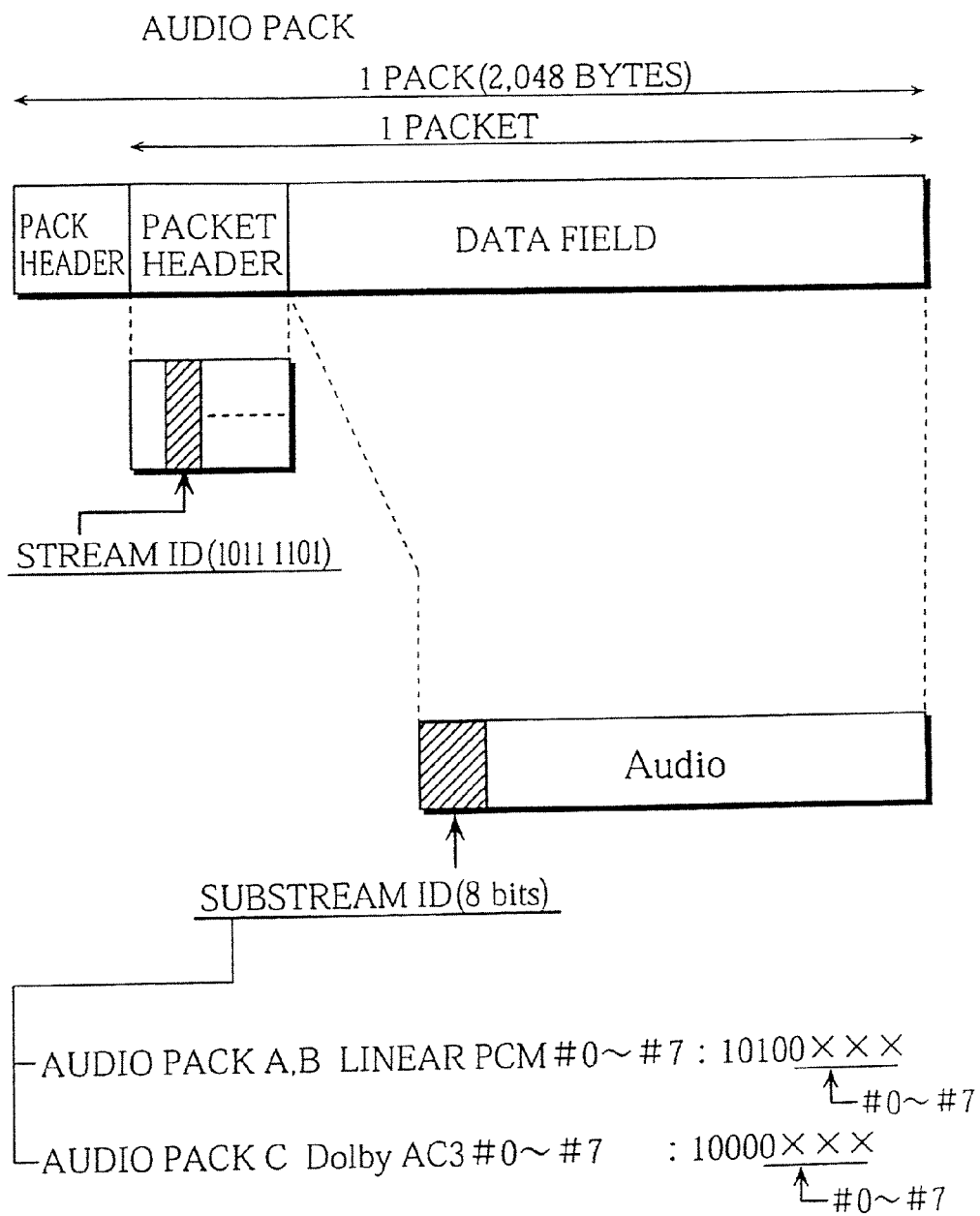

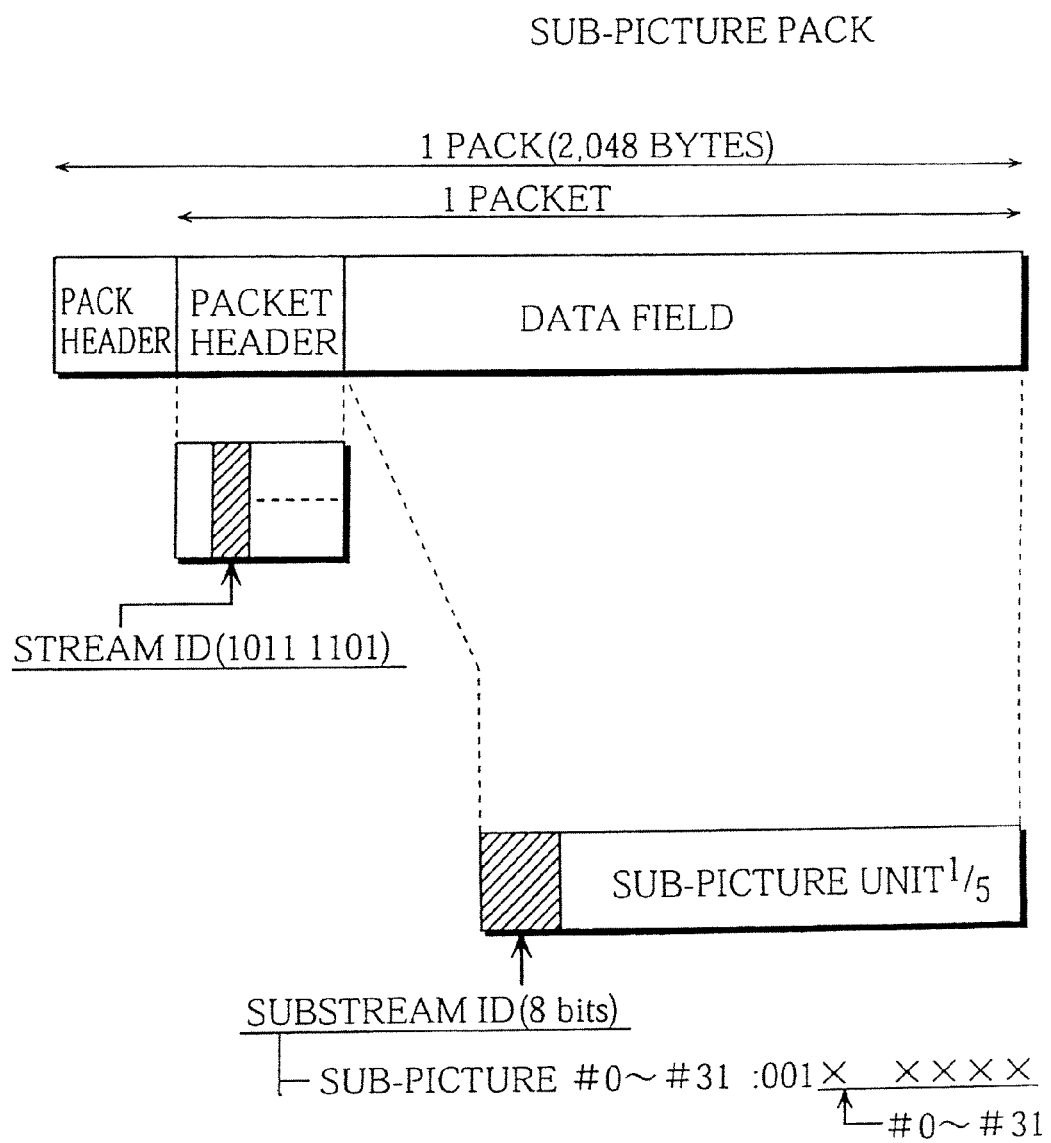

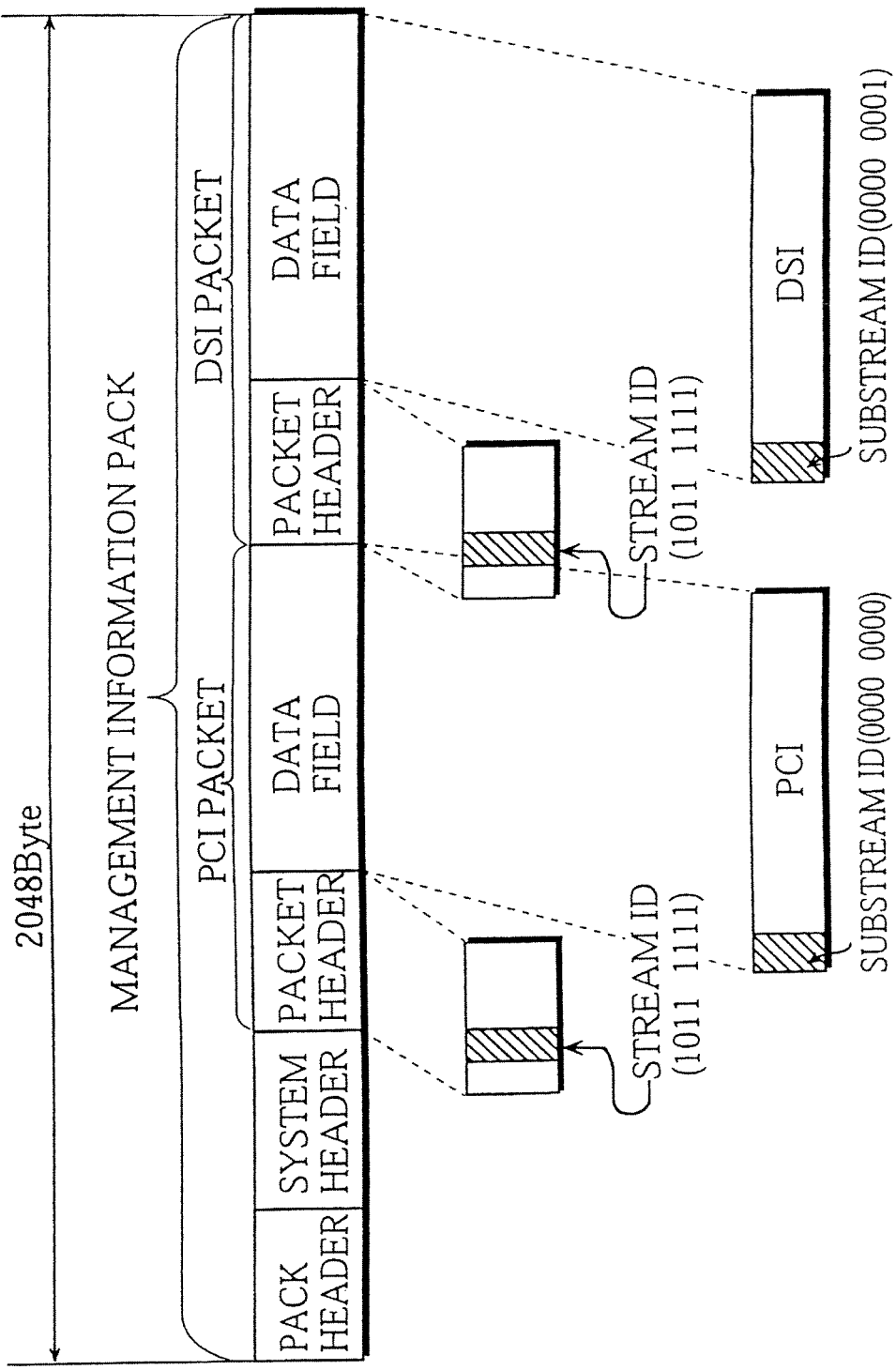

FIG. 11A

SUB-PICTURE UNIT SP−0.55 SUBSTREAM ID=0 FORMED FROM SUB-PICTURE PACKS 0.55.1−0.55.5 FOR THE REPRODUCTION TIME (00:27.50) OF VOBU #55

| · DATA SIZE<br>· STARTING<br>  ADDRESS | RLE CODE SEQUENCE f1<br>(VARIABLE LENGTH) | (Xp1,Yp1)~(Xp2,Yp2)<br>WIDTHp1 HEIGHTp1 |

← PAN SCAN COORDINATE SYSTEM

FIG. 11B

SUB-PICTURE UNIT SP−1.55 SUBSTREAM ID=1 FORMED FROM SUB-PICTURE PACKS 1.55.1−1.55.5 FOR THE REPRODUCTION TIME (00:27.50) OF VOBU #55

| · DATA SIZE<br>· STARTING<br>  ADDRESS | RLE CODE SEQUENCE f11<br>(VARIABLE LENGTH) | (Xb1,Yb1)~(Xb2,Yb2)<br>WIDTHb1 HEIGHTb1 |

← LETTERBOX COORDINATE SYSTEM

FIG. 11C

SUB-PICTURE UNIT SP−2.55 SUBSTREAM ID=2 FORMED FROM SUB-PICTURE PACKS 2.55.1−2.55.5 FOR THE REPRODUCTION TIME (00:27.50) OF VOBU #55

| · DATA SIZE<br>· STARTING<br>  ADDRESS | RLE CODE SEQUENCE f1<br>(VARIABLE LENGTH) | (Xw1,Yw1)~(Xw2,Yw2)<br>WIDTHw1 HEIGHTw1 |

← WIDE-SCREEN DISPLAY COORDINATE SYSTEM

FIG. 11D

SUB-PICTURE UNIT SP-6.55 SUBSTREAM ID=6 FORMED FROM SUB-PICTURE PACKS 6.55.1~6.55.5 FOR THE REPRODUCTION TIME (00:27.50) OF VOBU #55

| • DATA SIZE<br>• STARTING ADDRESS | RLE CODE SEQUENCE f2<br>(VARIABLE LENGTH) | (Xp3,Yp3)~(Xp4,Yp4)<br>WIDTHp1 HEIGHTp1 |

← PAN SCAN COORDINATE SYSTEM

FIG. 11E

SUB-PICTURE UNIT SP-12.55 SUBSTREAM ID=12 FORMED FROM SUB-PICTURE PACKS 12.55.1~12.55.5 FOR THE REPRODUCTION TIME (00:27.50) OF VOBU #55

| • DATA SIZE<br>• STARTING ADDRESS | RLE CODE SEQUENCE f2<br>(VARIABLE LENGTH) | (Xb3,Yb3)~(Xb4,Yb4)<br>WIDTHb1 HEIGHTb1 |

← LETTERBOX COORDINATE SYSTEM

FIG. 11F

SUB-PICTURE UNIT SP-15.55 SUBSTREAM ID=15 FORMED FROM SUB-PICTURE PACKS 15.55.1~15.55.5 FOR THE REPRODUCTION TIME (00:27.50) OF VOBU #55

| • DATA SIZE<br>• STARTING ADDRESS | RLE CODE SEQUENCE f2<br>(VARIABLE LENGTH) | (Xw3,Yw3)~(Xw4,Yw4)<br>WIDTHw1 HEIGHTw1 |

← WIDE-SCREEN DISPLAY COORDINATE SYSTEM (Xp0,Yp0) I picture in VOBU55

(Xp1,Yp1)  (Xp2,Yp2)

I picture in VOBU55

VIDEO TITLE SET INTERNAL TITLE SEARCH POINTER TABLE

| VTS INTERNAL TITLE SEARCH POINTER #1 | VTS #1.VTS INTERNAL TITLE #1 | ··· | ENTRY-PGC #5 |
|---|---|---|---|
| VTS INTERNAL TITLE SEARCH POINTER #2 | VTS #1.VTS INTERNAL TITLE #2 | ··· | ENTRY-PGC #8 |
| VTS INTERNAL TITLE SEARCH POINTER #3 | VTS #1.VTS INTERNAL TITLE #3 | ··· | ENTRY-PGC #1 |
| VTS INTERNAL TITLE SEARCH POINTER #4 | VTS #1.VTS INTERNAL TITLE #4 | ··· | ENTRY-PGC #3 |

FIG. 15

| PGC INFORMATION #1_start | | | |
|---|---|---|---|
| PGC LINK INFORMATION   PGC#2 | | | |
| PGC INFORMATION #1 SUB-PICTURE MAPPING INFORMATION | | | |
| CHANNEL NUMBER | DISPLAY MODE VALUE | SUBSTREAM ID | SUBSTREAM ID INDICATED CONTENT |
| CH0 | ASPECT RATIO 4:3 STANDARD | 001_00000 | SUB-PICTURE 0TH SUBSTREAM |
| CH0 | ASPECT RATIO 16:9 STANDARD | 001_00010 | SUB-PICTURE 2ND SUBSTREAM |
| CH0 | ASPECT RATIO 4:3 LETTERBOX | 001_00001 | SUB-PICTURE 1ST SUBSTREAM |
| CH0 | ASPECT RATIO 4:3 PAN SCAN | 001_00000 | SUB-PICTURE 0TH SUBSTREAM |
| CH1 | ASPECT RATIO 4:3 STANDARD | 001_01111 | SUB-PICTURE 15TH SUBSTREAM |
| CH1 | ASPECT RATIO 16:9 STANDARD | 001_00110 | SUB-PICTURE 6TH SUBSTREAM |
| CH1 | ASPECT RATIO 4:3 LETTERBOX | 001_01100 | SUB-PICTURE 12TH SUBSTREAM |
| CH1 | ASPECT RATIO 4:3 PAN SCAN | 001_01111 | SUB-PICTURE 15TH SUBSTREAM |
| VOB POSITION INFORMATION TABLE | | | |
| VOB#1(10min.)  VOB#2(50sec.)  VOB#3(8min.)  VOB#4(48min.) | | | |
| PGC INFORMATION #2_start | | | |
| PGC LINK INFORMATION   PGC#3 | | | |
| PGC INFORMATION #2 SUB-PICTURE MAPPING INFORMATION | | | |
| CHANNEL NUMBER | DISPLAY MODE VALUE | SUBSTREAM ID | SUBSTREAM ID INDICATED CONTENT |
| CH0 | ASPECT RATIO 4:3 STANDARD | 001_00000 | SUB-PICTURE 0TH SUBSTREAM |
| CH0 | ASPECT RATIO 16:9 STANDARD | 001_00000 | SUB-PICTURE 0TH SUBSTREAM |
| CH0 | ASPECT RATIO 4:3 LETTERBOX | 001_00000 | SUB-PICTURE 0TH SUBSTREAM |
| CH0 | ASPECT RATIO 4:3 PAN SCAN | 001_00000 | SUB-PICTURE 0TH SUBSTREAM |
| CH1 | ASPECT RATIO 4:3 STANDARD | 001_01111 | SUB-PICTURE 15TH SUBSTREAM |
| CH1 | ASPECT RATIO 16:9 STANDARD | 001_01111 | SUB-PICTURE 15TH SUBSTREAM |
| CH1 | ASPECT RATIO 4:3 LETTERBOX | 001_01111 | SUB-PICTURE 15TH SUBSTREAM |
| CH1 | ASPECT RATIO 4:3 PAN SCAN | 001_01111 | SUB-PICTURE 15TH SUBSTREAM |
| VOB POSITION INFORMATION TABLE | | | |
| VOB#5(10min.)  VOB#8(5min.)  VOB#9(30sec.)  VOB#10(8min.) | | | |
| PGC INFORMATION #3_start | | | |
| PGC LINK INFORMATION   PGC#4 | | | |
| PGC INFORMATION #3 SUB-PICTURE MAPPING INFORMATION | | | |
| CHANNEL NUMBER | DISPLAY MODE VALUE | SUBSTREAM ID | SUBSTREAM ID INDICATED CONTENT |
| CH0 | ASPECT RATIO 4:3 STANDARD | 001_00000 | SUB-PICTURE 0TH SUBSTREAM |
| CH0 | ASPECT RATIO 16:9 STANDARD | 001_00010 | SUB-PICTURE 2ND SUBSTREAM |
| CH0 | ASPECT RATIO 4:3 LETTERBOX | 001_00001 | SUB-PICTURE 1ST SUBSTREAM |
| CH0 | ASPECT RATIO 4:3 PAN SCAN | 001_00000 | SUB-PICTURE 0TH SUBSTREAM |
| CH1 | ASPECT RATIO 4:3 STANDARD | 001_01111 | SUB-PICTURE 15TH SUBSTREAM |
| CH1 | ASPECT RATIO 16:9 STANDARD | 001_00110 | SUB-PICTURE 6TH SUBSTREAM |
| CH1 | ASPECT RATIO 4:3 LETTERBOX | 001_01100 | SUB-PICTURE 12TH SUBSTREAM |
| CH1 | ASPECT RATIO 4:3 PAN SCAN | 001_01111 | SUB-PICTURE 15TH SUBSTREAM |
| VOB POSITION INFORMATION TABLE | | | |
| VOB#11(10min.)  VOB#12(50sec.)  VOB#13(8min.)  VOB#14(48min.) | | | |

PGC INFORMATION I1 (rows for PGC INFORMATION #1)
PGC INFORMATION I2 (rows for PGC INFORMATION #2)
PGC INFORMATION I3 (rows for PGC INFORMATION #3)

FIG. 16A

PGC INFORMATION

| PGC LINK INFORMATION |
| SUB-PICTURE MAPPING INFORMATION |
| VOB POSITION INFORMATION TABLE |

FIG. 16B

VOB POSITION INFORMATION TABLE

| REPRODUCTION TIME OF VOB #1 | OFFSET FOR VOB #1 | NUMBER OF BLOCKS FORMING VOB #1 |
| REPRODUCTION TIME OF VOB #2 | OFFSET FOR VOB #2 | NUMBER OF BLOCKS FORMING VOB #2 |
| REPRODUCTION TIME OF VOB #3 | OFFSET FOR VOB #3 | NUMBER OF BLOCKS FORMING VOB #3 |
| REPRODUCTION TIME OF VOB #4 | OFFSET FOR VOB #4 | NUMBER OF BLOCKS FORMING VOB #4 |
| REPRODUCTION TIME OF VOB #5 | OFFSET FOR VOB #5 | NUMBER OF BLOCKS FORMING VOB #5 |
| REPRODUCTION TIME OF VOB #6 | OFFSET FOR VOB #6 | NUMBER OF BLOCKS FORMING VOB #6 |
| REPRODUCTION TIME OF VOB #7 | OFFSET FOR VOB #7 | NUMBER OF BLOCKS FORMING VOB #7 |
| REPRODUCTION TIME OF VOB #8 | OFFSET FOR VOB #8 | NUMBER OF BLOCKS FORMING VOB #8 |

FIG. 17   VIDEO MANAGER

| VM MANAGEMENT TABLE | | |
|---|---|---|
| VM INTERNAL TITLE SEARCH POINTER TABLE | | |
| | NUMBER OF TITLE SEARCH POINTERS | |
| | VM INTERNAL TITLE SEARCH POINTER #1 | TitleSet #1. VTS INTERNAL TITLE #1 |
| | VM INTERNAL TITLE SEARCH POINTER #2 | TitleSet #1. VTS INTERNAL TITLE #2 |
| | VM INTERNAL TITLE SEARCH POINTER #3 | TitleSet #1. VTS INTERNAL TITLE #3 |
| | VM INTERNAL TITLE SEARCH POINTER #4 | TitleSet #1. VTS INTERNAL TITLE #4 |
| | VM INTERNAL TITLE SEARCH POINTER #5 | TitleSet #2. VTS INTERNAL TITLE #1 |
| | VM INTERNAL TITLE SEARCH POINTER #6 | TitleSet #2. VTS INTERNAL TITLE #2 |
| | VM INTERNAL TITLE SEARCH POINTER #7 | TitleSet #3. VTS INTERNAL TITLE #1 |
| | VM INTERNAL TITLE SEARCH POINTER #8 | TitleSet #3. VTS INTERNAL TITLE #2 |
| PGC #1 FOR MENU | | |
| | PGC LINK INFORMATION  PGC #1 | |
| | VOB POSITION INFORMATION TABLE   VOB #1 FOR MENU | |
| VOB #1 FOR MENU | | |
| | MANAGEMENT INFORMATION PACK(PLURALITY OF TitlePlay) | |
| | SUB-PICTURE(CHARACTER STRING FOR TITLE NAME) | |
| | MAIN IMAGE(BACKGROUND IMAGE) | |

FIG. 18

MENU

THANK YOU FOR BUYING THIS DISC.
TO COMMENCE REPRODUCTION,PLEASE INDICATE YOUR
DESIRED TITLE USING THE CURSOR.

1 : WILDLIFE IN THE ANTARCTIC:A PICTORIAL DOCUMENTARY
2 : INTERACTIVE ANTARCTIC ADVENTURE
3 : A FAIRY TALE OF THE ANTARCTIC
4 : MULTIMEDIA GUIDE TO THE WILDLIFE OF THE ANTARCTIC
5 : EXPLORING THE HISTORIC SITES OF SOUTH-EAST ASIA
6 : INTERACTIVE TOUR OF THE HISTORIC SITES OF SOUTH-EAST ASIA
7 : FRESHWATER FISH OF THE AMAZON
8 : FRESHWATER FISH OF THE AMAZON:NAME QUIZ

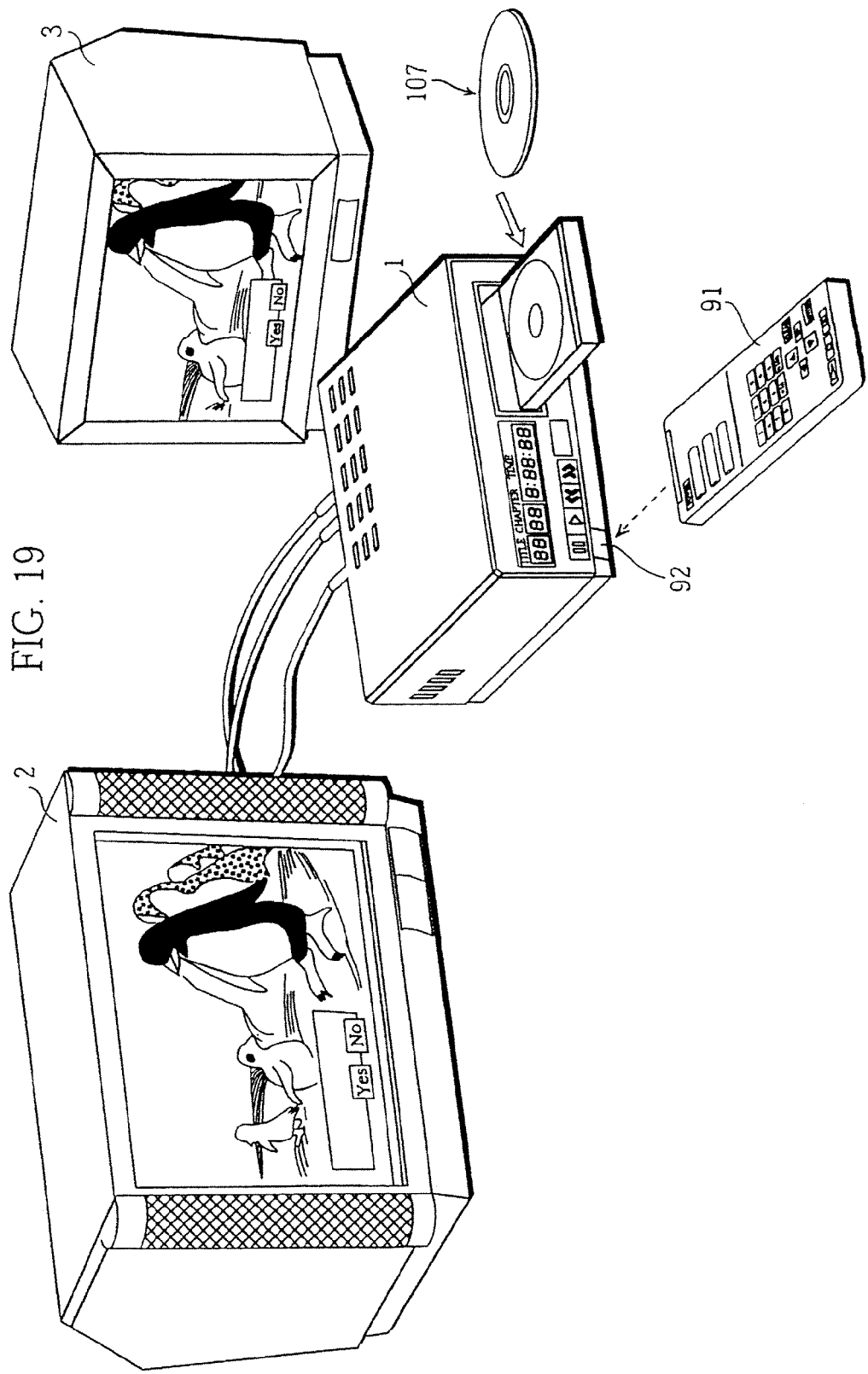

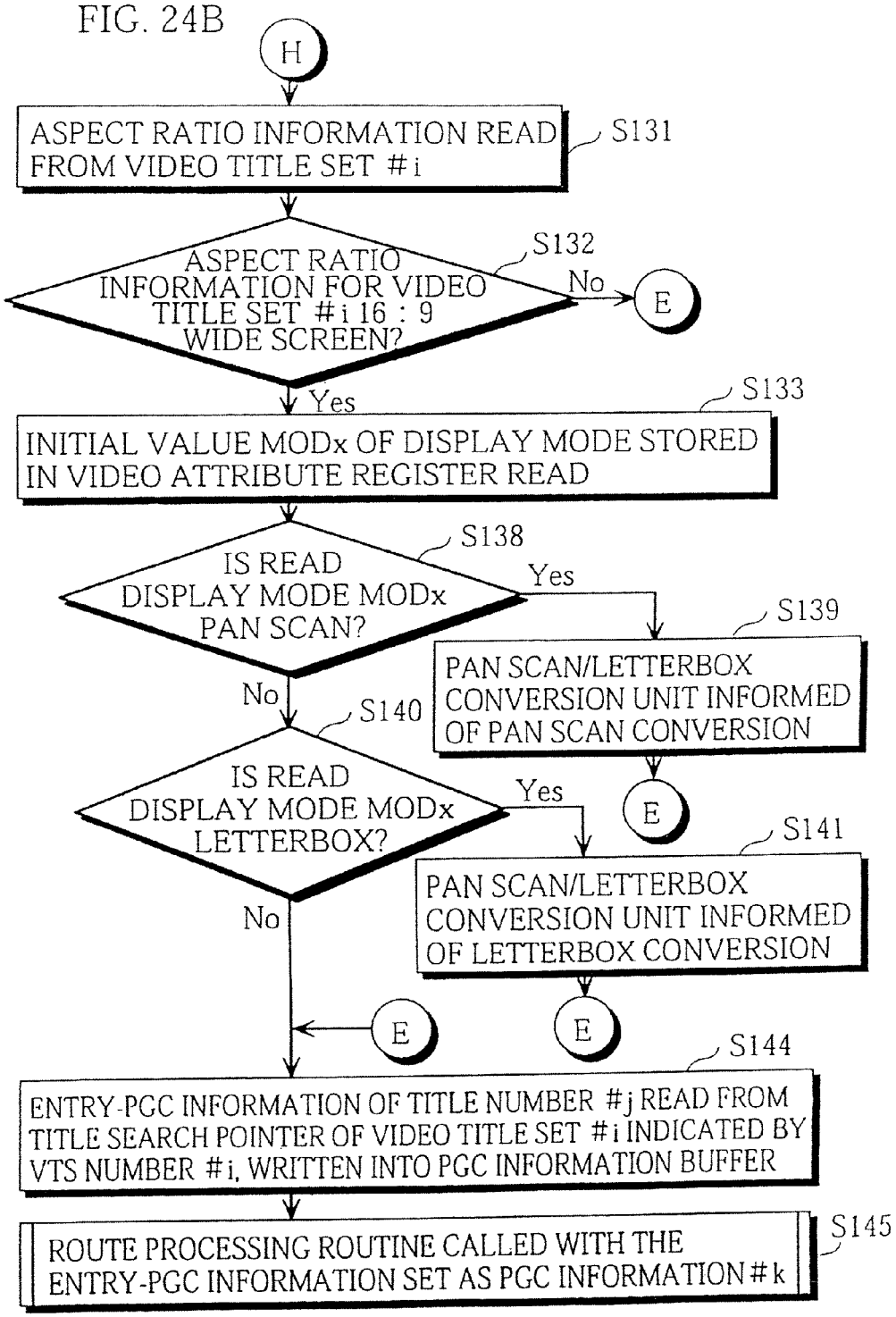

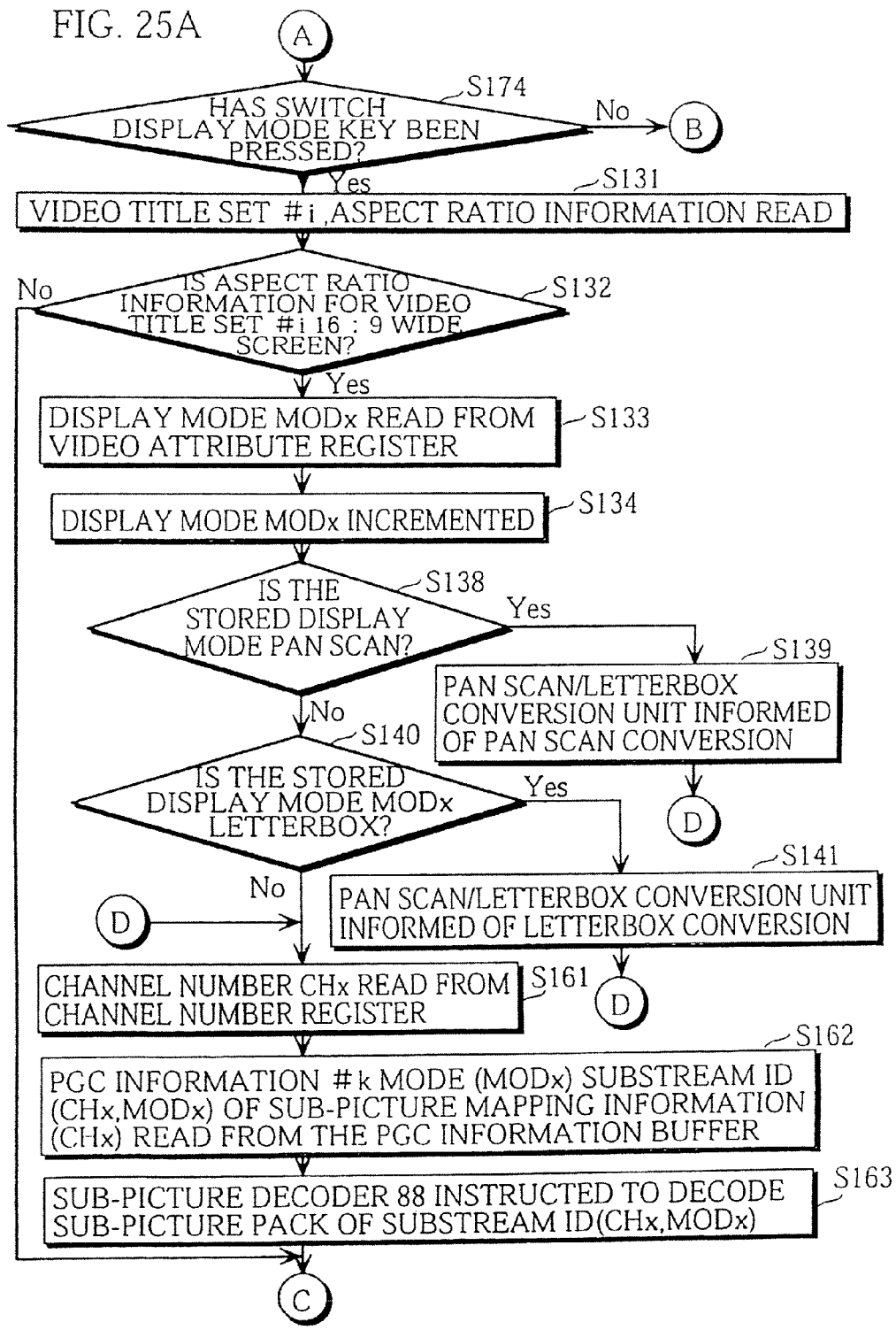

FIRST DISPLAY TYPE

SECOND DISPLAY TYPE

THIRD DISPLAY TYPE

FOURTH DISPLAY TYPE

RECORDING MEDIUM AND PLAYBACK APPARATUS FOR SELECTING SUB-PICTURE DATA ACCORDING TO COMBINATION OF ASPECT RATIO OF DISPLAY SCREEN AND TYPE OF DISPLAY MODE

RELATED APPLICATIONS

This is a Divisional application of U.S. patent Ser. No. 10/891,385 U.S. Pat. No. 7,444,065 filed on Jul. 14, 2004, which is a Divisional application of U.S. patent Ser. No. 10/456,776 U.S. Pat. No. 6,785,463 filed on Jun. 6, 2003, which was a Divisional application of Ser. No. 10/098,089 U.S. Pat. No. 6,631,241 filed on Mar. 14, 2002, which was a Divisional application of Ser. No. 09/311,019 U.S. Pat. No. 6,393,202, filed on May 13, 1999, which was a Continuation application of Ser. No. 08/853,070 U.S. Pat. No. 5,907,659, filed on May 8, 1997.

BACKGROUND OF THE INVENTION

1. Field of the Invention

The present invention relates to an optical disc on which an information signal is recorded, and to a reproduction apparatus for the optical disc. More specifically, it relates to an optical disc which is used for recording video information which includes video data, audio data, and image data, and to a reproduction apparatus for the disc.

2. Description of the Related Art

Video applications, such as movies, are one kind of application which can be achieved using optical discs, such as laser discs, and a suitable reproduction device. These video applications are usually referred to as "video titles".

As the supply of video titles becomes increasingly internationalized, "multilingual video titles" are starting to appear on the market. Here, the expression "multilingual" refers to the user being able to select subtitles for one out of a plurality of languages which are then reproduced with the moving picture information. As one example, a multilingual video title aimed at the U.S. and European markets can include separate dubbing soundtracks and sub-picture information for English subtitles, German subtitles, French subtitles, and Spanish subtitles, so that users can watch a movie in their specified language.

One of the technologies which underpins the realization of "multilingual video titles" is the use of MPEG (Moving Pictures Experts Group) stream data as format for the data stored on the disc. MPEG streams include video information which has been compressed at a high compression rate according to MPEG methods, and can also include multiple sub-picture channels and multiple audio channels which are selectively reproduced. This is to say, "multilingual video titles" can be achieved by storing the moving picture information as the video information, dubbing soundtracks for each of the featured languages as the multiple channels of audio information, and subtitles for each of the featured languages as the multiple channels of sub-picture information.

Another of the technologies which underpins the realization of "multilingual video titles" is the use of a process called OSD (On-Screen Display) processing performed by the disc reproduction apparatus. Here, OSD processing refers to the decoding of the image data included as sub-picture information and the mixing of the image data with the moving picture on the display. This is to say, when the user selects the language he/she would like reproduced, the disc reproduction apparatus selects and reproduces the sub-picture information on one of the channels in accordance with the selected language, with the sub-picture information being reproduced together with the moving picture. The image data used here for displaying subtitles is known as "tel-op" data.

The position at which the sub-picture information is superimposed onto the moving pictures is decided by the title producer when developing the title. As a result, during reproduction the sub-picture information can be positioned at the producer's desired position. Here, should the producer indicate a display command for a coordinate position around the chest of one of the characters in the main image, the disc reproduction apparatus may respond to that command by displaying subtitles showing the character's name which are superimposed over the chest area of the character. Here, when a plurality of characters are concurrently displayed, the subtitles for characters' names can be displayed at positions corresponding to the respective characters, making such subtitles extremely effective.

Another recent trend in video titles, apart from the development of "multilingual titles", is the development of "wide-screen TV-adapted titles". Adaptation for wide-screen television refers to the development of titles which have a high visual impact when displayed on a wide-screen television with an aspect ratio of 16:9, with the objective of giving commercially available video titles the same big-screen feeling attained from watching movies at a movie theater.

One of the technologies underpinning the adaptation of titles for wide-screen TVs is, of course, the development of wide-screen TV sets. Wide-screen TV sets have a screen whose aspect ratio is 16:9 and perform interpolation for a NTSC (National Television System Committee) signal whose image content has an aspect ratio of 4:3 to display an image whose aspect ratio is 16:9. This is to say, video information which is stored on a disc is processed so as to squeeze its image content in the horizontal direction to enable the information to be optimally displayed at a 16:9 aspect ratio. As described above, wide-screen TV sets perform interpolation for this video data which has been squeezed in the horizontal direction and by doing so display the video information with an aspect ratio of 16:9.

Another of the technologies underpinning the adaptation of titles for wide-screen TVs is display mode transformation processing by disc reproduction apparatuses. Here, display mode transformation processing refers to image interpolation which enables a video title adapted to a 16:9 aspect ratio to be reproduced by a conventional television set which has an aspect ratio of 4:3. As described above, video titles which are adapted to wide-screen TV use are processed so as to give an optimal display when displayed at an aspect ratio of 16:9. To do so, the video information is shrunk in the horizontal direction. As a result, conventional TV sets which cannot perform horizontal interpolation during display end up displaying the image shrunk in the horizontal direction as it is. In order to perform compensation, display mode transformation processing is executed by disc reproduction apparatuses, and by switching the display format (display mode) of the image signal for the main image, the image content can be arranged within the limited display area of a conventional TV set.

Here, "pan scan display mode" and "letterbox display mode" are representative examples of display modes. In the former, pan scan display mode, video which is adapted to wide-screen television is slid by given distances in the vertical and horizontal directions in accordance with the FCVO (Frame Center Vertical Offset) and the FCHO (Frame Center Horizontal Offset) which are standardized under MPEG, before the left and right edges of the image are trimmed to give an image which will fit onto a TV screen with an aspect ratio of 4:3. Putting this into other words, pan scan display mode involves a compensatory cutting of the image content of each frame so that the image can be displayed on a TV screen with an aspect ratio of 4:3. In the latter, letterbox display mode, the image recorded with an aspect ratio of 16:9 is reduced and displayed in the central area of a 4:3 aspect ratio TV screen, with a corrective image being added above and below the central belt-like area where the image is displayed. Putting this in other words, letterbox display mode involves a compensatory reduction of the image content of each frame with an aspect ratio of 16:9 so that the image can be displayed on a TV screen with an aspect ratio of 4:3.

When pan scan display mode and letterbox display mode are compared, letterbox display mode has the distinct merit of being an easier mode to achieve. This is because in pan scan display mode, the producer must set the FCVO and FCHO values very carefully for each frame of video, so that unintentional and undesired losses of image data, such as the trimming of half a character's face, can be avoided.

Using the letterbox display mode and the pan scan display mode described above, video information which has been adapted for wide-screen TV can be favorably arranged onto a conventional TV screen with an aspect ratio of 4:3. However, there remains the problem for TV sets, disc reproduction apparatuses, and disc that when "multilingual video titles" which have been developed for wide-screen TV are displayed using the above modes, the superimposing position of the subtitles cannot always be performed in accordance with the producer's intentions.

When a disc reproduction apparatus has a video title adapted for wide-screen TV displayed on a conventional TV with an aspect ratio of 4:3, conversion to pan scan display mode is performed as described above, with this changing the position at which the video content is arranged. As a result, the sub-picture will end up being displaced from the desired position, which leads to a breakdown in the positional correspondence between items on the screen and the subtitles related to the items.

The following is a detailed explanation of the breakdown in the positional relationship between a sub-picture and actual video footage which will refer to a specific example of video footage. Here, when editing a video title which is a nature program, the producer wishes to superimpose subtitles onto a frame introducing bird life. Here, this one frame of the wide-screen TV-adapted image is as shown by the reference numeral y101 in FIG. 1A, with reference number y102 showing the subtitles which are to be superimposed onto the frame. These subtitles are to be superimposed at the feet of the bird in the image, with the producer indicating that subtitles indicating the word "Penguin" are to be superimposed at certain coordinates in the wide-screen TV-adapted image.

The combined image y103 shows the results of the superimposing of the subtitles y102 on the image y101. Should the producer only see image, he/she should be satisfied with the results of the superimposing, since in FIG. 1A the subtitles have been superimposed at the producer's desired position. Here, the results of the same superimposing for a main image displayed using pan scan mode are shown in FIG. 1B. From FIG. 1B, it can be clearly seen that the subtitles have been displaced from the intended position, since the superimposing has been performed with the "Penguin" subtitles at a position spatially defined with respect to the wide-screen TV-adapted image, despite the fact that the image has been trimmed to fit the standard TV screen. This is because the coordinates for superimposing the sub-picture on the main video image in pan scan display mode are different to the coordinates for superimposing the sub-picture on the main video image in wide-screen TV-adapted mode. Here, the use of coordinates for an optimal superimposing position in wide-screen TV-adapted mode when displaying according to pan scan display mode can often result in the displacement of the display of the sub-picture.

FIG. 1C shows the combined image which results from the disc reproduction apparatus switching to letterbox display mode. As can be seen, the "Penguin" subtitles once again end up displaced from the intended image content. This leftward displacement of the superimposing position is caused, as was the case with the displacement in pan scan display mode, by the use of different coordinate systems. Here, the use of coordinates for an optimal superimposing position in wide-screen TV-adapted mode when displaying according to pan scan display mode can often result in the displacement of the display of the sub-picture.

As shown in FIG. 1C, the subtitles end up being superimposed onto the border between the main image and the corrective image, with the top half of the subtitles being displayed on the main image and the bottom half being displayed on the corrective image. As shown by the enlargement indicated by the arrow y104, since the subtitles are displayed in black, the favorable color contrast of the top half of the subtitles is not achieved in the lower half.

Since the above displacement is due to the use of different display modes, it is possible to consider that the superimposing of the sub-picture on the main image would be better performed at a earlier stage of the process, which is to say before the conversion to pan scan or letterbox display. An example of when the main image and the sub-picture are combined before conversion into pan scan display mode is shown in FIG. 2A, with FIG. 2B showing the case when the main image and the sub-picture are combined after conversion into letterbox display mode. With the case shown in FIG. 2A, trimming the image for pan scan display mode results in the loss of the final two letters of "Penguin", while in FIG. 2B, reduction of the image for letterbox display mode results in the reduction of the subtitles, so that the "e" and "g" of "Penguin" and end up appearing as if they have been colored in, making the letters very difficult to read.

While combining the main image and sub-picture at an early stage in this way helps to overcome the problems of displacement, this improvement is surpassed by the loss of subtitles or by the difficulty of reading reduced characters, so that such methods cannot be considered practicable.

SUMMARY OF THE INVENTION

The primary object of the present invention is to provide a multimedia optical disc and disc reproduction apparatus which can superimpose subtitles onto a main video image at the producer's desired position, for the display mode which is set for a television screen.

With the present construction, the multimedia optical disc stores information for selecting the sub-picture data in accordance with the present display mode, so that even when a video title is displayed on a standard TV with an aspect ratio of 4:3 in pan scan or letterbox mode, the subtitles will be superimposed at a position which is suitable for the present display mode. By providing an area on a multimedia optical disc for storing information for selecting sub-picture information in accordance with the display mode, the user becomes able to select a desired display mode while avoiding displacement of the subtitles on the television screen. As a result, video titles which are unaffected by display mode switching operations can be produced.

Here, the superimposing position of the sub-picture in the coordinate system for wide-screen television display mode may be set to protrude into the left or right edges of the screen which are trimmed in pan scan display mode, while the superimposing position of the sub-picture in the coordinate system for pan scan display mode may be set so that the subtitles do not protrude into the edges of the screen which are trimmed in pan scan display mode, and the superimposing position of the sub-picture in the coordinate system for letterbox display mode may be set so that the subtitles are superimposed over the corrective image.

Here, the multimedia optical disc is provided with information for selecting sub-picture data in accordance with a combination of a type of display mode and a logical channel number set in the disc reproduction apparatus. As a result, when a video title is reproduced using a television and the display is switched to pan scan or letterbox display mode, the subtitles can be displayed at an optimal superimposing position for the present display mode. By providing an area on a multimedia optical disc for storing information for selecting sub-picture information in accordance with the display mode and logical channel number, displacement of the subtitles can be avoided, and the producer can decide the channel number allocation for different sets of sub-picture data. As a result, video titles which are unaffected by display mode switching operations can be produced.

On the other hand, when it is not necessary to take measures against the effects of display switching operations, a same set of sub-picture data may be commonly used in a plurality of display modes, so that it is not necessary to provide a separate set of sub-picture data for every display mode in every multiplexed stream in the stream area. Putting this into other words, the stream area can include sets of sub-picture data which are unique to one display mode and sets of sub-picture data which are used in several display modes. Multiplexed streams in which a set of sub-picture data is used in several display modes have the advantage of being a small data size, so that such streams will take up smaller amount of the storage capacity of the multimedia optical disc.

BRIEF DESCRIPTION OF THE DRAWINGS

These and other objects, advantages and features of the invention will become apparent from the following description taken in conjunction with the accompanying drawings which illustrate a specific embodiment of the invention. In the drawings:

FIG. 1C shows a combining of main image and sub-picture performed in letterbox display mode;

FIG. 3A shows the appearance of the optical disc used in the present embodiment;

FIG. 3B shows a cross-section of the optical disc;

FIG. 3C shows an enlargement of the area around the focused spot of the laser beam;

FIG. 3D shows sequences of pits in the information layer 109;

FIG. 7 shows an example of the group of video materials which are included in video title set V1;

FIG. 8 shows the internal construction of VOB#1 which is included in the group of video materials of video title set V1;

FIG. 9 shows the content of VOBU#50 through VOBU#55;

FIG. 10B shows the internal composition of an audio pack;

FIG. 10C shows the internal composition of a sub-picture pack;

FIG. 10D shows the internal composition of a management information pack;

FIG. 11A shows the internal construction of sub-picture unit SP-0.55;

FIG. 11B shows the internal construction of sub-picture unit SP-1.55;

FIG. 11C shows the internal construction of sub-picture unit SP-2.55;

FIG. 11D shows the internal construction of sub-picture unit SP-6.55;

FIG. 11E shows the internal construction of sub-picture unit SP-12.55;

FIG. 11F shows the internal construction of sub-picture unit SP-15.55;

FIG. 14 shows an example of the internal composition of the VTS internal title search pointer table;

FIG. 15 shows the internal composition of the PGC table in the VTS internal title set management information;

FIG. 16A shows the format of the PGC information;

FIG. 16B shows the internal composition of the "VOB position information table";

FIG. 17 shows an example of the internal composition of the video manager;

FIG. 18 shows an example of the volume menu;

FIG. 19 shows the viewing environment for a video title in the present embodiment;

FIGS. 24A through 24C are flowcharts showing the content of the processing executed by the system control unit 93;

FIGS. 25A and 25B are flowcharts showing the processing in the remote control processing routine of the system control unit 93;

DESCRIPTION OF THE PREFERRED EMBODIMENTS

Figure 1A:
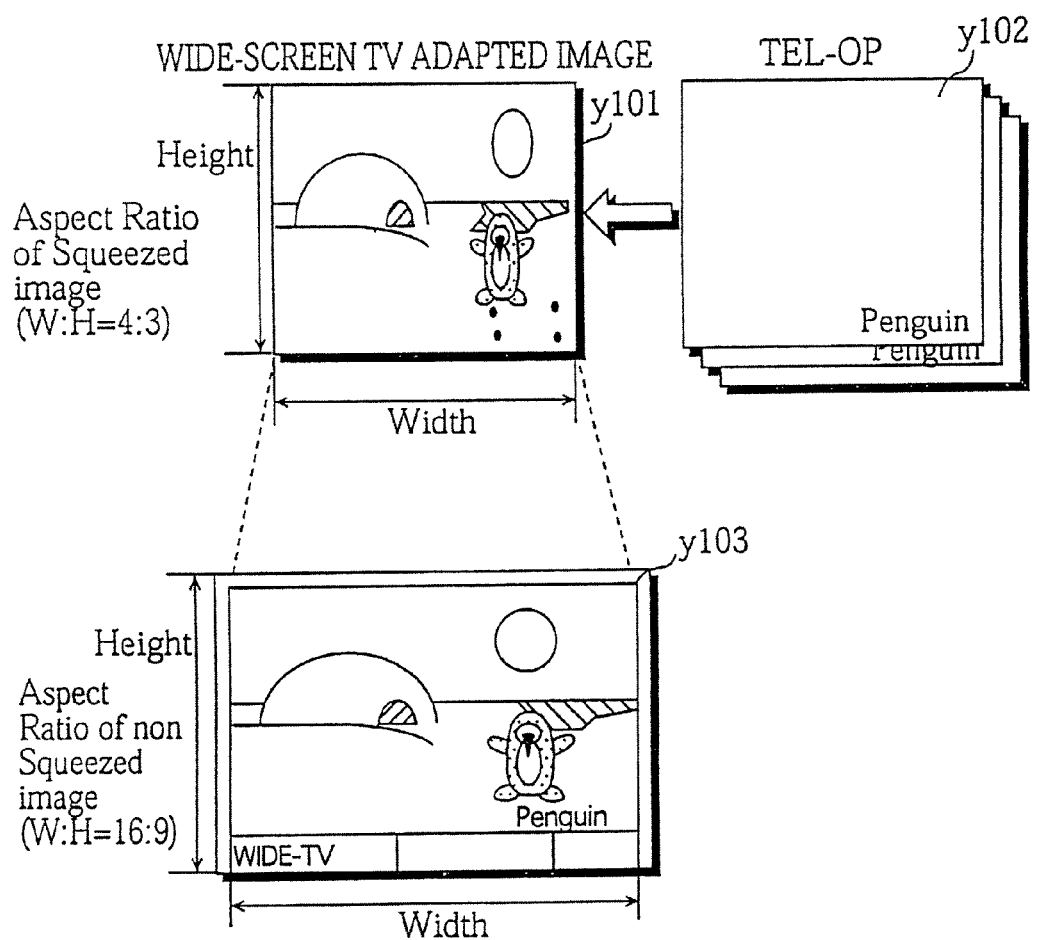
FIG. 1A shows the combining of a wide-screen TV-adapted main image and a sub-picture.
Figure 1B:
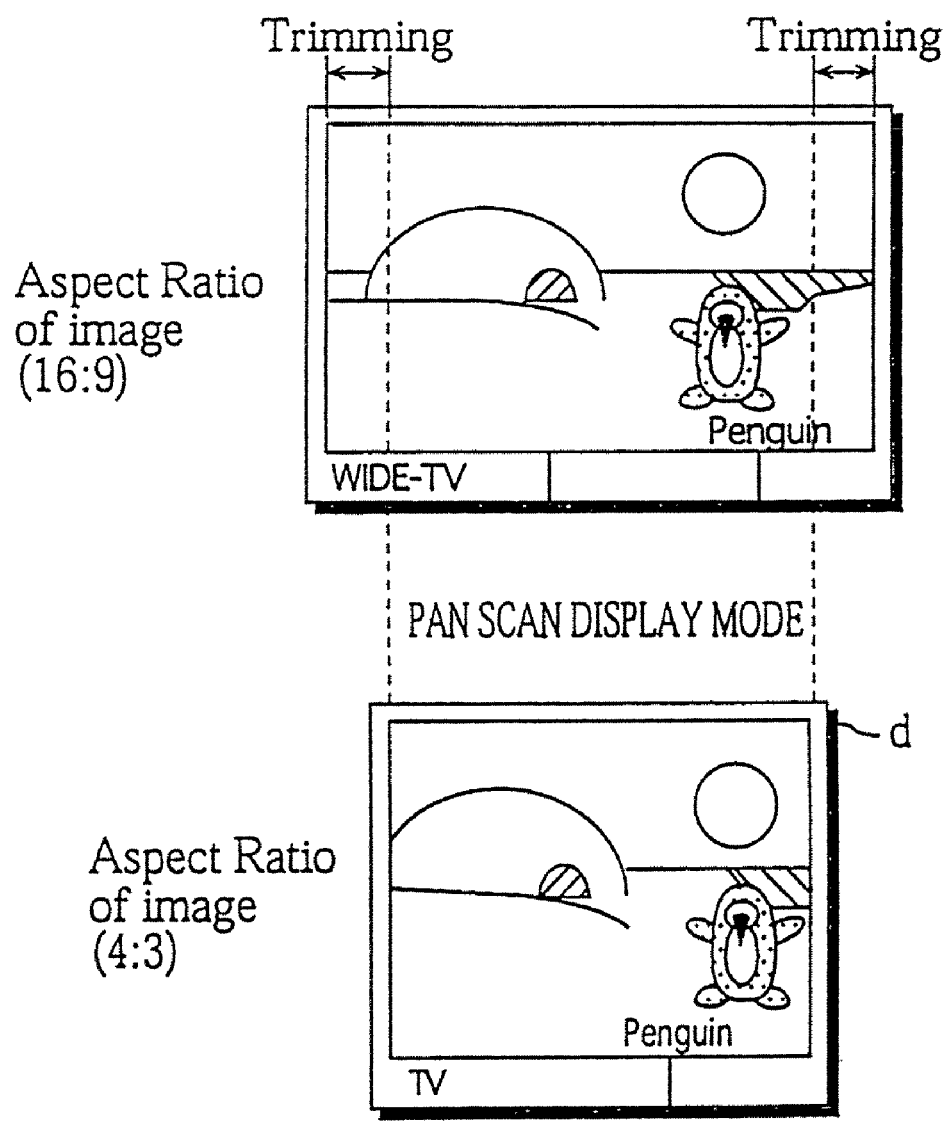
FIG. 1B shows a combining of main image and sub-picture performed in pan scan display mode.
Figure 2A:
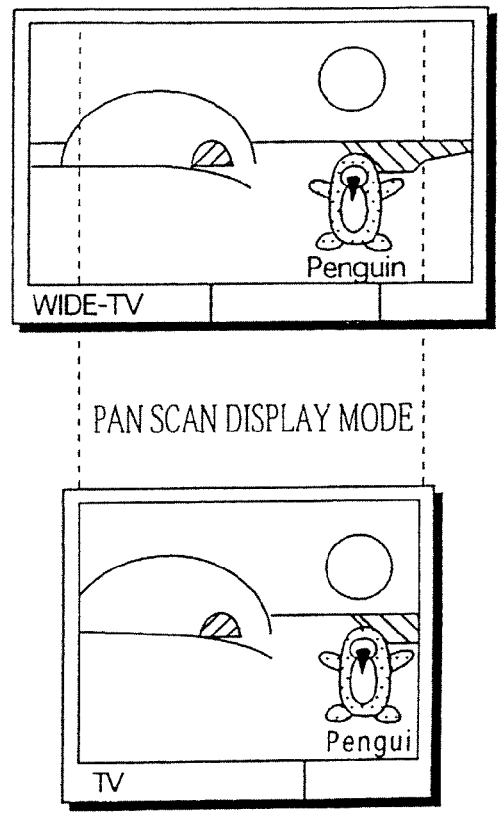
FIG. 2A shows a combined image displayed in pan scan display mode when combining is performed at an early stage.
Figure 2B:
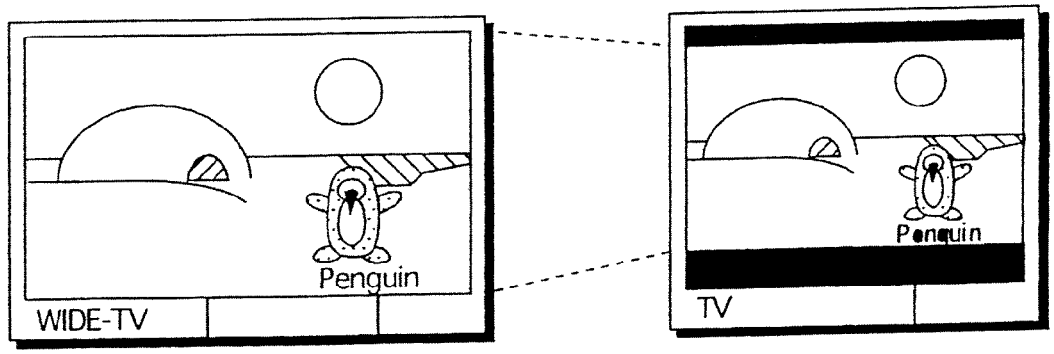
FIG. 2B shows a combined image displayed in letterbox display mode when combining is performed at an early stage.

In order to assist the reader's understanding, the following explanation has been divided into items which have each been given an index number. Here, the number of digits in the index number indicates the level of the item in question in the overall structure of the explanation. Here, the highest-ranked classification numbers are (1) and (2), with (1) relating to the optical disc and (2) relating to the reproduction device (disc player).

(1) Physical Construction of the Optical Disc
  (1.1) Logical Construction of the Optical Disc
    (1.1.1) Logical Construction . . . Video Title Set
      (1.1.1.1) Video Title Set . . . Video Object (VOB)
        (1.1.1.1.1) Each kind of pack multiplexed into a Video Object (VOB)
        (1.1.1.1.2) Sub-picture unit formed by a Video Object (VOB)
        (1.1.1.1.3) Video Object (VOB)—Management Information Pack
      (1.1.1.2) Video Title Set—Video Title Set Management Information
        (1.1.1.2.1) Video Title Set Management Information—PGC information
    (1.1.2) Logical Construction—Video Manager
  (2.1) Outline of the Disc Reproduction Device
  (2.2) Construction Elements of the Disc Reproduction Device
    (2.2.1) Disc Reproduction Device—Construction of Signal Separating Unit 86
    (2.2.2) Disc Reproduction Device—Construction of System Control Unit 93

(1) Physical Construction of the Optical Disc

A digital video disc (DVD) which has a diameter of 120 mm and has a storage capacity of 4.7 GB on one side is ideally suited for use as the multimedia optical disc of the present embodiment.

FIG. 3A shows the appearance of the optical disc, while FIG. 3B shows its cross-section and FIG. 3C shows an enlargement of the circled part of FIG. 3B. Starting from the bottom of this figure, DVD 107 is formed of a first transparent substrate 108, an information layer 109, a bonding layer 110, a second transparent substrate 111 and a print layer 112 for printing a label.

The first transparent substrate 108 and the second transparent substrate 111 are reinforcing substrates which are made of a same material and are around 0.6 mm thick. This is to say, both substrates are roughly 0.5 mm-0.7 mm thick.

The bonding layer 110 is provided between the information layer 109 and the second transparent substrate 111 to bond them together.

The information layer 109 includes a reflective membrane, such as metal foil, which is attached to the first transparent substrate 108. Here, a high density of indented and protruding pits is formed in this reflective membrane by a manufacturing process.

The shape of these pits is shown in FIG. 3D. As shown in FIG. 3D, the length of the pits varies between 0.4 μm and 2.13 μm, with the pits being aligned in a spiral with radial intervals of 0.74 μm between them to form one spiral track.

By shining the laser beam 113 on these pits and measuring the changes in the reflection ratio of the light spot 114 shown in FIG. 3C, information can be retrieved from the disc.

The light spot 114 on a DVD has a diameter of around 1/1.6 times the diameter of a light spot on a conventional CD due to an increase in the numerical aperture (NA) of the objective lens and a reduction in the wavelength λ of the laser beam.

DVDs of the physical construction described above can store around 4.7 GB of information on one side, which is almost eight times the storage capacity of a conventional CD. As a result, it is possible to achieve a great improvement in picture quality for moving pictures and to increase the reproduction time from the 74 minutes which is possible with a video CD to over two hours.

The substrate technique which has enabled this improvement in storage capacity is a reduction of the spot diameter D of the laser beam. Here, spot diameter D is given by the equation "D=laser wavelength λ/numerical aperture of objective lens NA", so that the spot diameter D can be reduced by reducing the laser wavelength λ and by increasing the numerical aperture of objective lens NA. It should be noted here that if the numerical aperture of objective lens NA is increased, comatic aberration occurs due to the relative inclination, known as "tilt", between the optical axis of the beam and the disc surface. In order to suppress this phenomenon, DVDs use a transparent substrate of reduced thickness. Such a reduction in the thickness of the transparent substrate creates the problem of reduced physical durability for the disc, although this problem can be overcome by reinforcing DVDs with another substrate.

Data is read from DVDs using an optical system with a short wavelength (650 nm) red semiconductor laser and an objective lens whose NA (numerical aperture) can be enlarged up to around 0.6 mm. If the thickness of the transparent substrate is reduced to around 0.6 mm, a storage capacity of up to 4.7 GB can be achieved for one side of a 120 mm diameter optical disc.

Figure 4A:
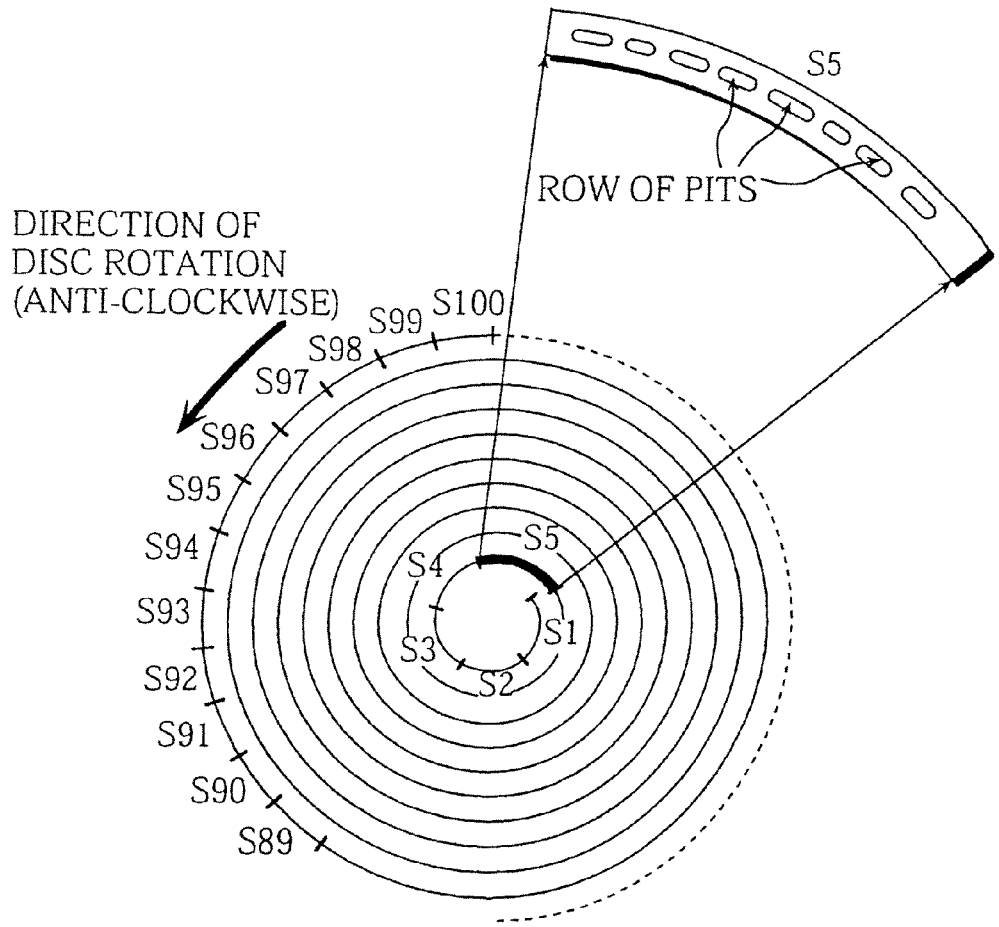
FIG. 4A shows the track arrangement of the information layer of the optical disc.

FIG. 4A shows the arrangement when the spiral track is formed leading from the inner periphery to the outer periphery of the information layer 109, with a very large number of physical sectors being formed on this spiral track in the direction for disc rotation. In the present embodiments, a physical sector is an arc on the spiral track, and is the smallest unit of data which can be reliably retrieved.

Figure 4B:
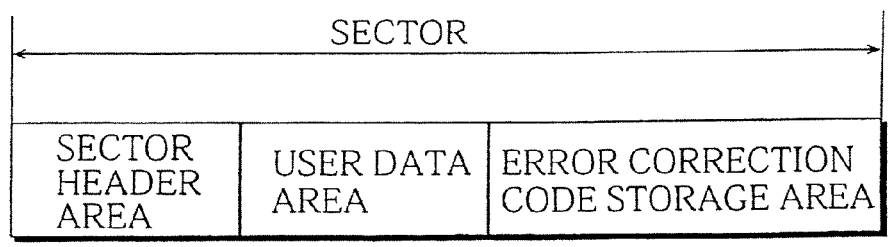
FIG. 4B shows the physical sectors of the information layer of the optical disc.

Each sector has the internal construction shown in FIG. 4B to ensure the reliability of data retrieval. As shown in FIG. 4B, each sector is made up of a sector header area which is used to identify the respective sector, a user data area for storing 2 Kbytes of data, and an error correction code storage area which stores an error correction code for the user data area in the same sector. When reading the user data area in the same sector, a disc reproduction device uses the error correction code to detect any errors in the sector, and performs error correction when such errors are detected.

(1.1) Logical Construction of the Optical Disc

Figure 5A:
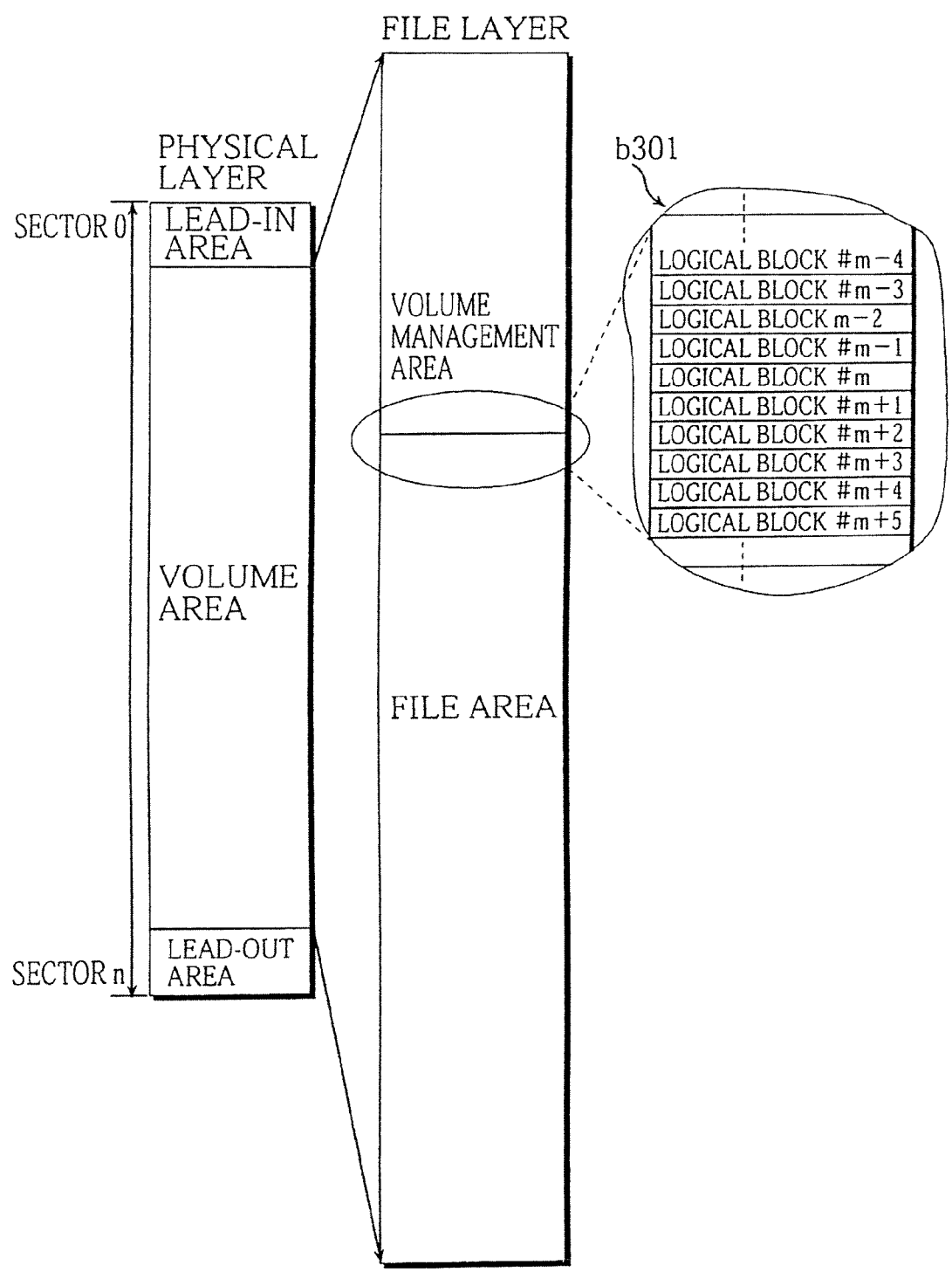
FIG. 5A shows the logical construction of the optical disc.
Figure 5B:
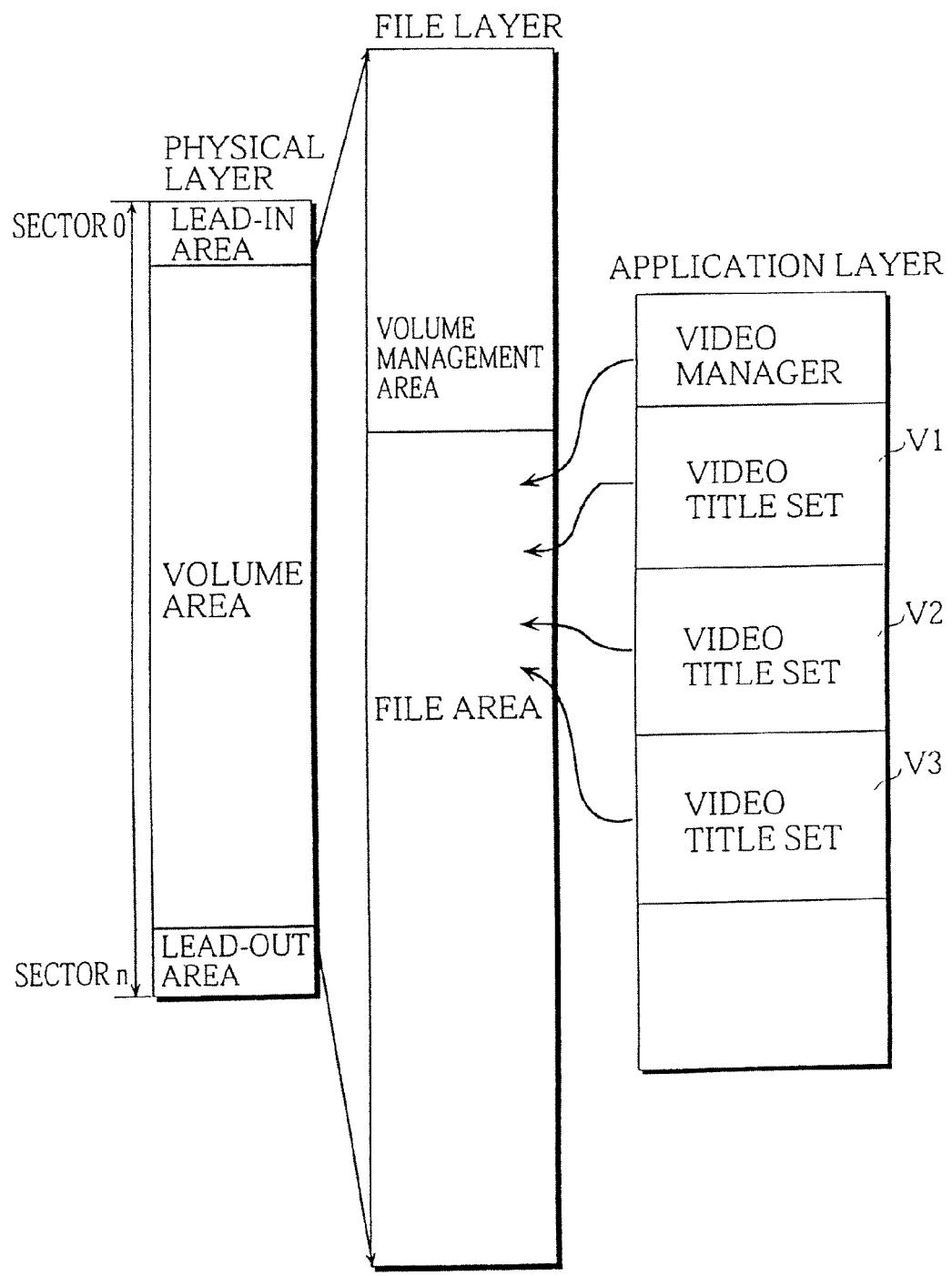
FIG. 5B shows the basic arrangement of the file layer and the application layer.

The following is an explanation of the logical construction of the optical disc. This logical construction is made up of a three-layer hierarchy. The hierarchy is made up of a physical layer whose logical construction is oriented towards the firmware of the disc reproduction apparatus, a file layer whose logical construction is designed for the management of a plurality of sectors in file units, and an application layer which has a multi title logical construction. Here, the logical construction of the physical layer is shown in FIG. 5A and the logical constructions of the file layer and the application layer are shown in FIG. 5B.

The following explanation will first deal with the physical layer whose logical construction is oriented towards firmware. Here, firmware refers to the control program for controlling a mechanical construction which includes a spindle motor and an actuator for an optical pick-up. In order from the top of FIG. 4A, the logical format of the physical layer is composed of a lead-in area which has identification information included in a sector address, a volume area and finally a lead-out area, so that on reading such areas, the firmware has the spindle motor and actuator of the optical pickup activated.

The lead-in area stores operation stabilization data and the like which is used when the disc reproduction apparatus starts reading data from the optical disc. The lead-out area informs the reproduction device of the end of reproduction and does not store meaningful data.

The volume area is an area for storing many kinds of data, as well as for managing the physical sectors to which the volume area belongs as logical blocks. These logical blocks are identified by firmware using serial numbers which are assigned to consecutive physical sectors, with the first physical sector in the data recording area being assigned the number zero. The enlarged portion "b301" of FIG. 5A shows a group of logical blocks in the volume area. Here, the figures, #m, #m+1, #m+2 and #m+3 which are appended to the logical blocks in this circled area are the logical block numbers.

The following is an explanation of the file layer and the application layer. This file layer and application layer exist in the volume area shown in FIG. 5B.

The file layer is divided into a volume management area and a file area. The volume management area stores file system management information which is used to manage a plurality of logical blocks as files, in accordance with ISO 13346 Standard. The file system management information shows the relations between the file names for a plurality of files and addresses of the groups of logical blocks which contain the corresponding files. This file system management information is used by the disc reproduction device to access the disc in file units. More specifically, when accessing this area, the disc reproduction apparatus refers to all the system management information to calculate all of the groups of logical blocks for the desired file, before accessing these groups of logical blocks to fetch the desired digital data.

The following is an explanation of the logical construction of the application layer. The information in this application layer can be most loosely classified into a Video Manager and a plurality of Video Title Sets. Here, a Video Title Set is a group of movie titles which are classified from the viewpoint of common use of a same set of video material, while the Video Manager is information for managing all of the groups in the title sets as a single set. In the example shown in FIG. 5B, the grouping of video materials included in Video Title Set V1 is a collection of images of mammals and birds shot on location on the Antarctic, while Video Title Set V2 is made up of images showing historical sites in South-East Asia which have been produced with the cooperation of the local governments. Using the video materials in Video Title Set V1, a plurality of video titles, namely "Wildlife in the Antarctic: a Pictorial Documentary", "Interactive Antarctic Adventure", "A Fairy Tale of the Antarctic", and "Multimedia Guide to the Wildlife of the Antarctic", can be provided to make full use of valuable scenes shot on location in the Antarctic.

Using the video materials included in Video Title Set V2, the title producer can have the viewer enjoy a documentary about the excavation of historical sites, a multimedia guide to historical sites, an adventure game where participants search for historical sites, or a quiz about historical sites around the world. By making good use of the valuable video materials in this way, the producer can provide a plurality of video titles to the user.

By classifying video titles in terms of usage of shared video materials in this way, it is possible to have a plurality of titles with common video materials grouped together.

(1.1.1) Logical Construction—Video Materials Included in a Video Title Set

Each video title set is made up of video title set management information and a group of video materials. The following explanation will first deal with the group of video materials included in a video title set. Normally, when a movie is recorded onto film or video tape, an editing process is performed whereby only the required scenes are cut from the master tape and are arranged into the order of the story. When such scenes are recorded into a Video Title Set, however, no such editing operations are performed. This is to say, there is no editing process in which only the necessary parts of the necessary scenes are extracted and arranged into the order of the story. In fact, a Video Title Set can store video materials in a completely random order without any extraction of necessary materials from the original footage. The group of video materials which are stored in Video Title Set V1 are shown in FIG. 7. As shown in this figure, the Video Title Set V1 of FIG. 7 includes a plurality of video objects (VOBs) which each have different reproduction times. Here, the expression "VOB" refers to one set of multiplexed stream data that is made up of various kinds of stream data, such as video data, audio data, sub-picture data, and control data, which are of variable code length. Such multiplexed stream data is better known as an MPEG stream, and this is the unit that is used for recording one scene on a DVD.

In FIG. 7, VOB#1 has a reproduction time of ten minutes, and is actual footage of the habitat of the emperor penguin. VOB#2 has a reproduction time of fifty seconds and is actual footage of an adult and child razorback. VOB#3 has a reproduction time of eight minutes and is actual footage of the breaking away of the Antarctic ice cap. VOB#4 has a reproduction time of forty-eight seconds and is actual footage of the indentation of the Weddell sea. The footage in these VOBs is entirely shot on location in the Antarctic.

(1.1.1.1) Composition of a Video Object (VOB)

FIG. 8 shows the internal composition of a VOB. As shown in the drawing, each VOB is made up of a sequence of a plurality of VOB units (VOBU) which has been arranged in a time series with the first VOBU to be reproduced at the front. Here, a VOBU is a multiplexed set of the various kinds of variable code length data, with each of the multiplexed pieces having a reproduction time between 0.5 and 1.0 seconds. As examples, VOBU#91 is a collection of the variable code length data which is to be used for the reproduction for the time period of 00 min:45.50 sec to 00 min:46.00 sec after the reading of VOB#1 has commenced, while VOBU#147 is a collection of the variable code length data which is to be used for the reproduction for the time period of 01 min:13.50 sec to 01 min:14.00 sec after the reading of VOB#1 has commenced.

The "variable code length data" which is described above as being multiplexed into a VOB can be video data, a plurality of channels of audio data, and a plurality of channels of sub-picture data, with pieces of such data which are multiplexed into a VOBU being respectively called video packs, audio packs, and sub-picture packs, each of which is 2 KB in size.

While the VOB units in each VOB are arranged into a time series, each pack in each VOB unit is arranged in an order which, with the exception of the provision of the management information pack at the front, is completely random in terms of number of packs and pack order. This is to say, there can be VOB units which have the order audio data, sub-picture data, video data, and other VOB units which have the order, sub-picture data, video data, audio data. As other examples, there may also be VOB units which are made up of three hundred or so packs of nothing but video data, and other VOB unit which are made up of five hundred or so packs.

Here, the reason the order of the packs can be different for each VOB unit is that it is not necessary for packs of a same kind to be next to each other when the variable code length data is fetched and buffered by a reproduction apparatus. The reason why there can be different numbers of video, audio and sub-picture packs in each VOBU is that these kinds of data are encoded with a variable coding length, so that there can be large discrepancies in the amount of data which is necessary to achieve reproduction for a 0.5 to 1.0 second period.

To achieve reproduction with the unit time at 0.5 seconds, it is necessary to inform the disc reproduction apparatus before the start of the 0.5 second period whether it is sufficient to transfer only a small amount of data, or whether a large amount of data is required, and to have the decoder provided inside the disc reproduction apparatus perform decoding for the necessary amount of transferred data. Here, to have variable code-length data reproduced with a uniform reproduction time of 0.5 seconds, a management information pack is provided at the start of each set of VOB unit, with this management information pack indicating the transfer rate which is required for the reproduction of the VOB unit to which it belongs, as well as the transfer rate and buffer size which are required by each of the video stream, the audio stream, and the management information stream in the VOB unit. To give a specific numerical example, 0.5 seconds of video reproduction will generally require several hundred video packs, with the reproduction device being informed of a necessary transfer rate in the region of 4.5 Mbit/second before such number of packs are read from the DVD to enable the decoding of such number of video packs.

FIG. 9 shows the contents of VOBU#50 through VOBU#55, which are VOB-units for the 3.0 second reproduction period from the 25.00 second reproduction mark of VOB#1 to the 28.00 reproduction mark.

VOBU#50 is the VOB unit which is used for the reproduction period between the 00 hr:00 min:25.00 sec and the 00 hr:00 min:25.50 sec marks after the commencement of the reading of VOB#1, while VOBU#51 is the VOB unit which is used for the reproduction period between the 00 hr:00 min:25.50 sec and the 00 hr:00 min:26.00 sec marks after the commencement of the reading of VOB#1. In the same way, VOBU#55 is the VOB unit which is used for the reproduction period between the 00 hr:00 min:27.50 sec and the 00 hr:00 min:28.00 sec marks after the commencement of the reading of VOB#1.

(1.1.1.1.1) Each Kind of Pack in a VOB Unit (VOBU)

The following is an explanation of the content each VOBU with reference to FIG. 9. As shown in the figure, VOB#50, which is reproduced between the 00 hr:00 min:25.00 sec and the 00 hr:00 min:25.50 sec marks, includes the management information pack "NAVI-50", the video packs "video50.1" and "video50.2", and the audio packs "audio-0.55", "audio-1.55", and "audio-3.55".

The management information pack "NAVI-50" informs the disc reproduction apparatus of the transfer rate and buffer size which are required by the reproduction of VOBU#50 between the 00 hr:00 min:25.00 sec and the 00 hr:00 min:25.50 sec marks.

The video packs "video50.1" and "video50.2" are the video packs which are used during the reproduction of VOBU#50. These video packs are two of the first video packs which are used, out of the several hundred video packs reproduced during the reproduction of VOBU#50 between the 00 hr:00 min:25.00 sec and the 00 hr:00 min:25.50 sec marks.

Figure 10A:
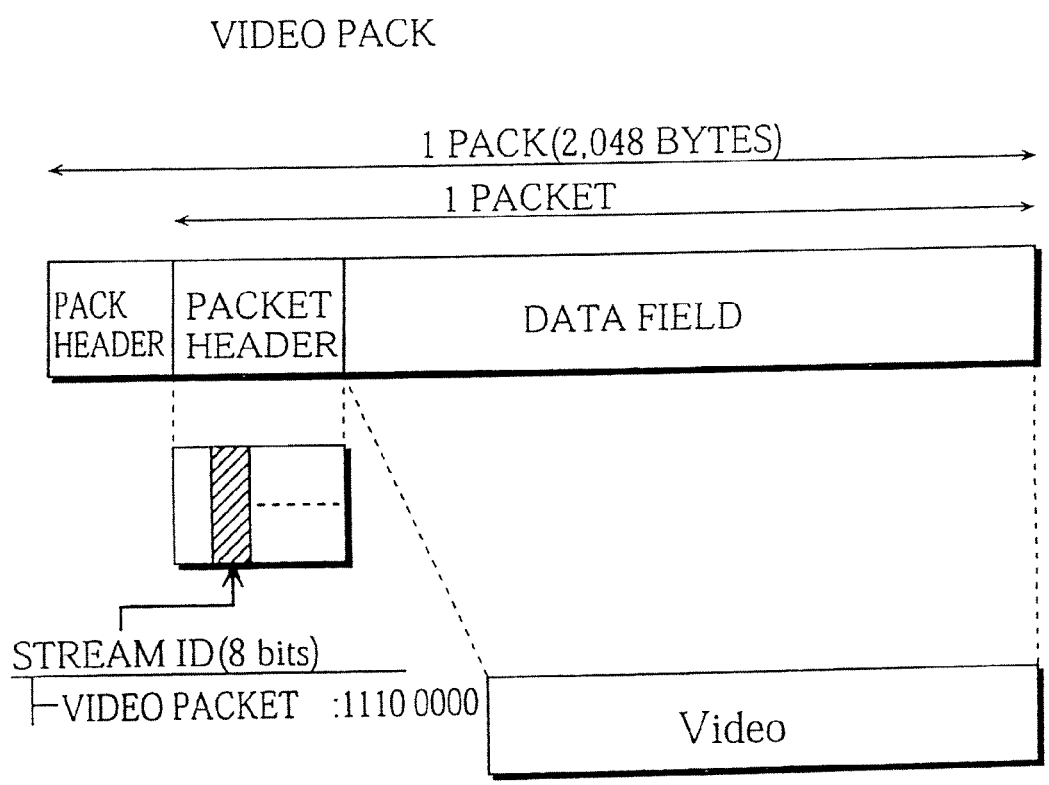
FIG. 10A shows the internal composition of a video pack.

These video packs, such as "video50.1" and "video50.2", have the standard data format which is shown in FIG. 10A. The video packs shown in the drawing are made up of a "pack header", a "packet header", and a "data field" which are standardized according to MPEG, and are each 2 KB in size. The "pack header" includes data called a "pack start code", a "system clock reference (SCR)", and a "multiplex (MUX) rate" which is standardized under MPEG, while the "packet header" is made up of a stream ID, a packet length, an STD (System Target Decoder) buffer scale size, a PTS (Presentation Time Stamp), and a DTS (Decoding Time Stamp) which are similarly standardized under MPEG.

The stream ID in the "packet header" is set at "1110 0000" for a video pack, as shown below the packet header in FIG. 10A. This information shows that the elementary stream forming this pack is a video stream.

The SCR and PTS of a video pack are used for the synchronization of the decoding process with the decoding processes of audio packs and sub-picture packs. More specifically, the video decoder of the disc reproduction apparatus is synchronized to a standard clock based on the SCR, and, having decoded the video data in the data field, waits for the standard clock to reach the time specified by the PTS. Once this time is reached, the decoded video data is outputted to a television monitor. By delaying its output based on the time indicated by the PTS, the video decoder can avoid synchronization errors with the sub-picture output and the audio output.

The data field of the video packs stores data which is composed of I-pictures (Intra-Pictures), P-pictures (Predicative pictures) and B-pictures (Bidirectionally predicative pictures) which are standardized under MPEG. These, I-pictures, P-pictures, and B-pictures are obtained by encoding actual video footage. It should be noted here that in the video packs, "video50.1" and "video50.2", the signal component of the video signal is "squeezed" before coding is performed. Here, "squeezing" refers to compression of the image content in the horizontal direction. In this way, the video packs "video50.1", "video 50.2" represent video which has been adapted to wide-screen TV display mode.

The audio packs "audio-0.55", "audio-1.55" represent the audio data which is used when VOBU#55 is reproduced. The reproduction period of VOBU#55 is from 00 hr:00 min:27.50 sec to 00 hr:00 min:28.00 sec, so that in the present figure, the audio packs for a reproduction time of 2.5 seconds further forward are stored in VOBU#50. The "0" and "1" used in the reference numbers of audio packs "audio-0.55" and "audio-1.55" respectively show that these audio packs are used as the $0^{th}$ and the $1^{st}$ substreams during the reproduction period of VOBU#55. Under MPEG standards, the "$n^{th}$ substream" refers to a $n^{th}$ digital data sequence which is obtained by recombining the multichannel sub-picture data and audio data for a classification known under MPEG as a "private stream". Here, a "private stream" is one species of elementary stream, with an elementary stream being a general name for digital data sequences in which packs belonging to a VOB are combined according to type. Since it is not possible to make a clear distinction between audio data and sub-picture data, substreams are provided in the logical construction of DVDs to clarify the classification of sub-picture data and audio data, so that by assigning fixed substream IDs to sub-picture data and audio data, these classifications can be clearly established.

The audio packs described above share the standard data format which is shown in FIG. 10B. This format is fundamentally the same as that of a video pack in that it contains a "pack header", a "packet header", and a "data field". The differences with a video pack lie in the setting of the stream ID at "1011 1101" in the packet header and in the setting of the substream ID in the first eight bits in the bits field, with these being shaded in FIG. 10B. The setting of the stream ID at "1011 1101" in the stream ID shows that the elementary stream formed by the pack in question is a private stream.

As with a video pack, the "pack header" of an audio pack includes data, such as a pack start code and an SCR which are standardized under MPEG. The "packet header", meanwhile, stores a stream ID, a packet length, an STD buffer scale size, a PTS, and a DTS which are standardized under MPEG.

The SCR and PTS of an audio pack are used for synchronization adjustments with respect to the decoding of video packs and sub-picture packs. More specifically, the audio decoder of a disc reproduction apparatus is synchronized to a standard clock based on the SCR, and, having decoded the audio data in the data field, waits for the standard clock to reach the time specified by the PTS. Since the decoding of audio data has a much lighter load than the decoding of video data or sub-picture data, the output delay for audio data is somewhat longer than those of video data and sub-picture data. Once the time indicated by the PTS has been reached, the audio decoder outputs result of the decoding to a speaker. By delaying its output based on the time indicated by the PTS, the audio decoder can avoid synchronization errors with the sub-picture output and the video output.

The "data field" of an audio pack stores digital audio according to Linear PGM or Dolby AC-3 methods.

For the example shown in FIG. 9, the audio packs used in VOBU#55 are stored in VOBU#50. This is possible because the disc reproduction apparatus can know from the PTS at what time audio data is to be reproduced. As a result, audio packs may be stored in VOBUs whose reproduction times are well in advance of a present VOBU without causing any operational problems.

The following is an explanation of the internal composition of VOBU#51 shown in FIG. 9. As shown in FIG. 9, VOBU#51, which is reproduced between the 00 hr:00 min: 25.50 sec and the 00 hr:00 min:26.00 sec marks, includes the management information pack "NAVI-51", the video packs "video51.1" and "video51.2", and the sub-picture packs "SP-0.55.1", "SP-1.55.1", "SP-2.55.1", and "SP-15.55.1".

The management information pack "NAVI-51" informs the disc reproduction apparatus of the transfer rate and buffer size which are required by the reproduction of VOBU#51 between the 00 hr:00 min:25.50 sec and the 00 hr:00 min: 26.00 sec marks.

The sub-picture pack "SP-0.55.1" represents the sub-picture data which is used when VOBU#55, whose reproduction period is from 00 hr:00 min:27.50 sec to 00 hr:00 min:28.00 sec, is reproduced. The numeral "55" in the reference number "SP-0.55.1" shows that the present sub-picture pack is one of the sub-picture units which is used during the reproduction of VOBU#55. This means that packs for a reproduction time of 2.0 seconds further forward are stored in VOBU#51. Here, a sub-picture unit is the smallest unit of sub-picture information which is can be subjected to OSD processing by the disc reproduction apparatus, and includes display commands and image data which is encoded according to run-length encoding.

The "1" in the reference number "SP-0.55.1" is a serial unit number which is allocated to the sub-picture pack. Here, serial unit numbers are serial numbers which are assigned to a plurality of sub-picture packs which compose one sub-picture unit, so that the setting of "1" in sub-picture pack "SP-0.55" shows that this sub-picture pack is the first compositional element in the sub-picture unit for the reproduction time of "VOBU#55".

The number "0" in the reference number "SP-0.55.1" shows the substream ID of the present sub-picture pack. Here, a substream ID is an identifier showing to which of the 32 sub-picture substreams the present sub-picture pack belongs. Naturally, the setting "0" for the present sub-picture pack indicates that the present sub-picture pack is an element of the sub-picture unit which is used as $0^{th}$ sub-picture substream.

In addition to "SP-0.55.1", the sub-picture packs "SP-0.55.2", "SE-0.55.3", "SP-0.55.4", and "SP-0.55.5" are also present as sub-picture packs which form the sub-picture unit for the $0^{th}$ substream for the reproduction time of VOBU#55 between the 00 hr:00 min:27.50 sec and 00 hr:00 min:28.00 sec marks. These show the second, third, fourth, and fifth sub-picture packs which form the sub-picture unit for the $0^{th}$ substream at the reproduction time of VOBU#55. Putting this another way, the sub-picture unit for the $0^{th}$ substream which is used at the reproduction time of VOBU#55 is divided into five VOB units (VOBU#51 through VOBU#55) when recorded onto an optical disc. Here, the reason the sub-picture units used at a given reproduction time are distributed among preceding VOB units is that the image data which forms the major element of the sub-picture unit is of a large data size, so that if such data were to be read during the reproduction time of VOBU#55 between the 00 hr:00 min:27.50 sec and 00 hr:00 min:28.00 sec marks, it would be necessary for the disc reproduction apparatus to read a large amount of data in a short period of time, which carries the risk of breakdown in the reading process. With this in mind, the sub-picture packs which form a sub-picture unit are distributed among a plurality of VOBUs to prevent the reading processes of the disc reproduction apparatus being concentrated at the reproduction time of data.

In the same way, the sub-picture packs "SP-1.55.1", "SP-1.55.2", "SP-1.55.3", "SP-1.55.4", and "SP-1.55.5" are the sub-picture packs which form the sub-picture unit for the $1^{st}$ substream for the reproduction time of VOBU#55. These show the first, second, third, fourth, and fifth sub-picture packs which form the sub-picture unit for the $1^{st}$ substream at the reproduction time of VOBU#55. From this, it can be seen that the sub-picture unit for the $1^{st}$ substream which is used at the reproduction time of VOBU#55 is divided into five VOB units (VOBU#51 through VOBU#55) when recorded onto an optical disc.

The sub-picture packs "SP-2.55.1", "SP-2.55.2", "SP-2.55.3", "SP-2.55.4", and "SP-2.55.5", are the sub-picture packs which form the sub-picture unit for the $2^{nd}$ substream for the reproduction time of VOBU#55. These show the first, second, third, fourth, and fifth sub-picture packs which form the sub-picture unit for the $2^{nd}$ substream at the reproduction time of VOBU#55. From this, it can be seen that the sub-picture unit for the $2^{nd}$ substream which is used at the reproduction time of VOBU#55 is divided into five VOB units (VOBU#51 through VOBU#55) when recorded onto an optical disc.

As described above, the sub-picture units for VOBU#55 further include a $6^{th}$, a $12^{th}$ and a $15^{th}$ substreams. Although not shown in the drawing, they are also divided into sub-picture packs which are distributed among a plurality of VOBUs which precede VOBU#55 in the time series.

The sub-picture packs introduced here share the standard format which is shown in FIG. 10C. As can be seen by comparing the formats shown in FIGS. 10B and 10C, the data construction of a sub-picture pack is fundamentally the same as that of an audio pack, with it comprising a "pack header", a "packet header", and a "data field", as well as having a eight-bit substream ID at the front of the data field.

As with an audio pack, the "pack header" includes a pack start code and an SCR which are standardized under MPEG. The "packet header" includes a stream ID, a packet length, an STD buffer scale size, an SCR, and a PTS, which are similarly standardized under MPEG.

The SCR and PTS of a sub-picture pack are used for synchronization adjustments with respect to the decoding of video packs and audio packs. More specifically, the sub-picture decoder of a disc reproduction apparatus is synchronized to a standard clock based on the SCR, and, having decoded the audio data in the data field, waits for the standard clock to reach the time specified by the PTS. The decoder waits for such time because of the large discrepancies in the processing loads of the decoding process for run-length encoded sub-picture data, the decoding process for the video data which requires internal frame decoding/internal field decoding and other movement compensating prediction, and the decoding process for audio data. Also, while the decoding of video data is necessary for each GOP (Group of Pictures), the decoding of subtitles need only be performed at intervals of several seconds. When the time indicated by the SCR is reached, the sub-picture decoder outputs the decoded sub-picture signal to the TV monitor. By delaying its output based on the time indicated by the PTS, the sub-picture decoder can avoid synchronization errors with the audio output and the video output.

As with an audio pack, the stream ID of the "packet header" of a management information pack is set at "1011 1101" indicating a private stream, although the substream ID in the data field is set a different value. The most significant three bits of the substream ID in a management information pack are set at "001", with this being shaded in FIG. 10C. The least significant five bits of the substream ID are used for an identification code which indicates one of the sub-picture substreams #0~#31.

(1.1.1.1.2) Video Object—Internal Composition of a Sub-Picture Unit

FIG. 11A shows the composition of sub-picture unit 0.55 in the $0^{th}$ substream for the reproduction time of 00 hr:00 min:27.50 sec to 00 hr:00 min:28.00 sec which is composed of the sub-picture packs 0.55.1 to 0.55.5.

Figure 12A:
FIG. 12A shows an example of Japanese language subtitles which are used in pan scan display mode.
Figure 13A:
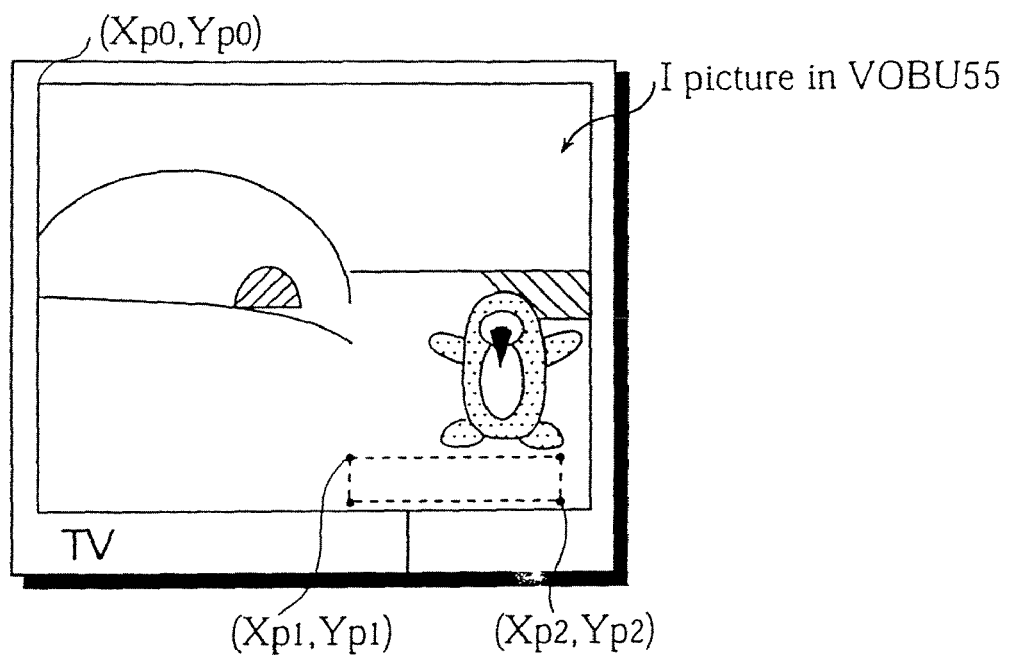
FIG. 13A shows the combining coordinates for subtitles which are used in pan scan display mode.

The sub-picture unit in the present figure includes the code sequence "RLE code sequence f1" that is obtained by subjecting image data to run-length encoding and a display command "(Xp1,Yp1), Widthp1 Heightp1" that informs the disc reproduction apparatus of the area on the TV screen in which RLE code sequence f1 should be displayed. FIG. 12A shows an example of the image data which represents the Japanese word ペンギン meaning "penguin". The "p" in "(Xp1,Yp1)" indicates that pan scan display mode is operational, so that sub-picture unit SP-0.55 includes a display command for optimizing the coordinates of the code sequence "RLE code sequence f1" in pan scan display mode. Here, Widthp1 shows the horizontal extent of the image data of FIG. 12A, while Heightp1 shows its vertical extent. FIG. 13A shows the area indicated by (Xp1,Yp1) to (Xp2,Yp2) in the frame displayed using VOBU#55. In this drawing, the area corresponding to (Xp1,Yp1) to (Xp2,Yp2) in the main image is colored black to prepare it for the superimposing of image data.

In the coordinate system for pan scan display mode, the area (Xp1,Yp1) to (Xp2,Yp2) has the superimposing position shifted slightly to the left so that the character row does not protrude into the area of the image which is trimmed. By shifting the superimposing coordinates slightly to the left, the producer is able to prevent the sub-picture protruding into the trimmed region.

FIG. 11B shows the composition of the sub-picture unit 1.55 of the $1^{st}$ substream which is composed of sub-picture packs 1.55.1 to 1.55.5 for the reproduction time of 00 hr:00 min:27.50 sec to 00 hr:00 min:28.00 sec.

Figure 12B:
FIG. 12B shows an example of Japanese language subtitles which are used in letterbox display mode.

As shown in FIG. 11B, the sub-picture units include the code sequence "RLE code sequence f11" which is obtained by subjecting the image data shown in FIG. 12B to run-length encoding. The difference between the image data of FIG. 12A and that of FIG. 12B is that a larger point setting of wider-spaced font is used in the latter.

Figure 13B:
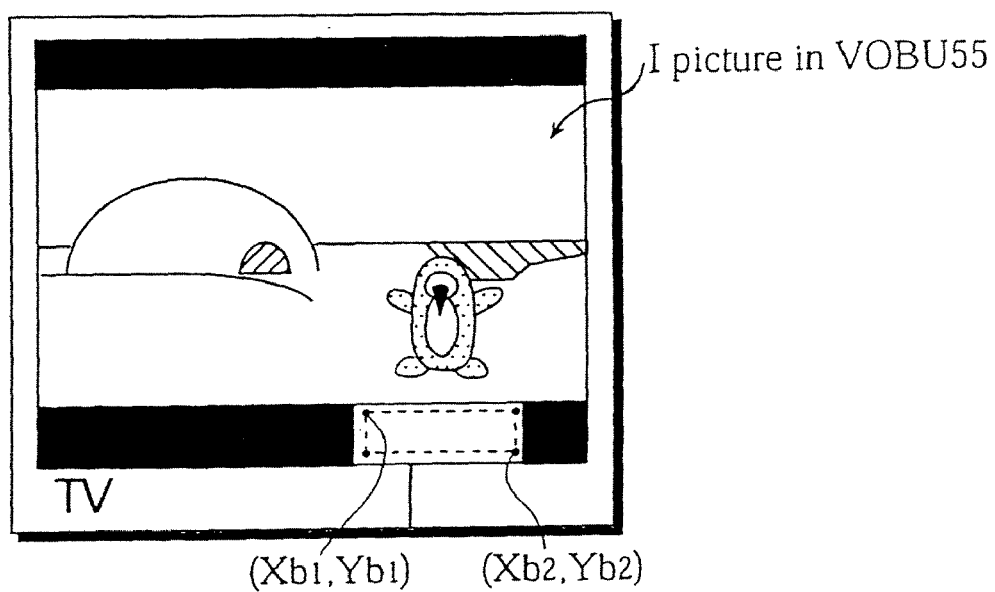
FIG. 13B shows the combining coordinates for subtitles which are used in letterbox display mode.

The sub-picture unit SP-1.55 includes a display command for optimizing the display coordinates of code sequence "RLE code sequence f11" in letterbox display mode, with this command being "(Xb1, Yb1)~(Xb2, Yb2), Widthb1, Heightb1". The "b" in "(Xbn,Ybn)" is indicative of letterbox display mode, while "Widthb1" and "Heightb1" respectively express the horizontal and vertical extent of the image data of FIG. 12B in Letterbox display mode. FIG. 13B shows the area on the display which is indicated by the coordinates (Xb1, Yb1)~(Xb2,Yb2) for the one frame image which is displayed for VOBU#55. Here, RLE code sequence f11 has its image data displayed on an area which has been colored white on top of the black corrective image. By having the superimposing position of the RLE code sequence f11 determined in this command, the producer can have the sub-picture displayed at a position which does not coincide with the main image in letterbox display mode.

FIG. 11C shows the composition of the sub-picture unit 2.55 of the $2^{st}$ substream which is composed of sub-picture packs 2.55.1 to 2.55.5 for the reproduction time of 00 hr:00 min:27.50 sec to 00 hr:00 min:28.00 sec.

Figure 13C:
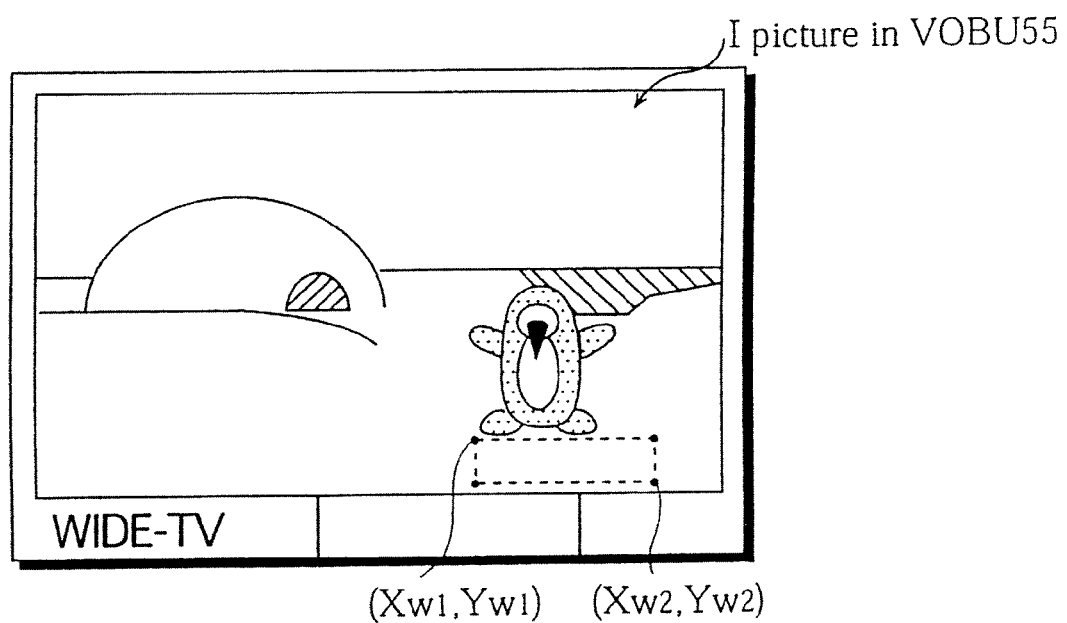
FIG. 13C shows the combining coordinates for subtitles which are used in wide-screen TV display mode.

In this drawing, the code sequence "RLE code sequence f11" is obtained by subjecting the image data shown in FIG. 12A for the same subtitles as the sub-picture unit of the $0^{th}$ elementary stream to run-length encoding. The display command "(Xw1, Yw1)~(Xw2, Yw2) Widthw1, Heightw1" in this drawing informs a disc reproduction apparatus of the area on the TV screen where the code sequence "RLE code sequence f11" is to be superimposed. Here, (Xw1,Yw1) are the coordinates in wide-screen TV display mode for the standard position of the image data, with the "w" in "Xwn,Ywn" indicating that the coordinates are for wide-screen TV display mode. As before, "Widthw1" and "Heightw1" respectively express the horizontal and vertical extent of the image data of FIG. 12A in wide-screen TV display mode. FIG. 13C shows the area on the display which is indicated by the coordinates (Xw1, Yw1)~(Xw2,Yw2) for the one frame image which is displayed for VOBU#55. Here, RLE code sequence f11 has its image data displayed in the indicated area which is first colored black. It can be seen from FIG. 13C that the superimposing position in wide-screen TV display mode protrudes rightward into the area which would be trimmed in pan scan display mode. In this way, the present sub-picture unit is able to arrange the subtitles so as to make the most of the extended width of the screen in wide-screen TV display mode.

From the above description, it can be seen that the sub-picture units for the $0^{th}$, $1^{st}$, and $2^{nd}$ substreams which are set the reproduction time of VOBU#55 all include Japanese language subtitles which can be superimposed onto the main image at an optimal position for any of pan scan, letterbox, or wide-screen TV display modes.

FIGS. 11D, 11E, and 11F show the compositions of the sub-picture units of the $6^{th}$, $12^{th}$, and $15^{th}$ substreams which are each composed of sub-picture packs n.55.1 to n.55.5 (n being 6, 12, or 15) for the reproduction time of 00 hr:00 min:27.50 sec to 00 hr:00 min:28.00 sec.

Figure 12C:
FIG. 12C shows an example of English language subtitles.

The sub-picture units in the present figures include the code sequence "RLE code sequence f2" which is obtained by subjecting image data the image data shown in FIG. 12C to run-length encoding. As shown in FIG. 12C, this image data is for the English subtitles "Penguin". In FIG. 11D, the coordinates (Xp3, Yp3)~(Xp4, Yp4) indicate the superimposing position for the English subtitles "Penguin" in pan scan display mode, while in FIG. 11E, the coordinates (Xb3, Yb3)~(Xb4, Yb4) indicate the superimposing position for the English subtitles "Penguin" in letterbox display mode, and in FIG. 11F, the coordinates (Xw3, Yw3)~(Xw4, Yw4) indicate the superimposing position for the English subtitles "Penguin" in wide-screen TV display mode.

From the above description, it can be seen that the sub-picture units for the $6^{th}$, $12^{th}$, and $15^{th}$ substreams which are set the reproduction time of VOBU#55 all include English language subtitles which can be superimposed onto a main image at an optimal position for any of pan scan, letterbox, or wide-screen TV display modes.

As can be seen from the above description, VOB#55 uses six substreams to optimize the superimposing position, font and character pitch in each of the three display modes. It should be especially noted here that VOB#1 which includes the VOB unit which is designed to display subtitles at the feet of the penguin shown in the main image is an exceptional video object, with the vast majority of VOBs included in the video materials having only one or two sub-picture substreams. This is because the majority of VOBs will use a same superimposing position, font, and character pitch in all three display modes which are namely, pan scan display mode, letterbox display mode, and wide-screen TV display mode.

On the other hand, there can of course be VOBs which have as many as fifteen substreams. These are VOBs which include subtitles for five languages in the three display modes.

The number of substreams provided in each VOB does not need to be equal and consists of a smallest necessary number in the range of one to thirty-two. By only multiplexing substreams where necessary, the data size of VOBs can be reduced, which leads to more efficient use of the storage capacity of discs.

1.1.1.1.3) Video Object (VOB)—Management Information Pack

As described above, the management information packs "NAVI-50", "NAVI-51", and "NAVI-52" shown in FIG. 9 are arranged at the front of each VOBU and are used to indicate the required transfer rate. Since a management information pack is stored at the front of each VOB unit, each management information pack is only opened in a buffer in the disc reproduction apparatus for the 0.5 seconds while the video packs, audio packs, and sub-picture packs in the first VOB unit are read and reproduced, before the management information pack in the next VOB unit is read. Once this 0.5 second period has expired, the next management information pack is overwritten into the buffer. Since each management information pack is only opened in the buffer during the reading of the video, audio, and sub-picture packs in the same VOB unit, in addition to the transfer rate, control information which only applies to the present VOB unit can be indicated to the disc reproduction apparatus for only the 0.5-1.0 second period for which the video, audio, and sub-picture packs in the present VOB unit are reproduced.

FIG. 9 shows the data construction of the management information packs "NAVI-50", "NAVI-51", and "NAVI-52". While the video packs, audio packs, and sub-picture packs are each formed of one packet, the management information packs are each formed of two packets. Of these, one packet is called a PCI packet (Presentation Control Information packet) while the other packet is called a DSI packet (Data Search Information packet). The data construction of a management information pack is somewhat different to that of a video packet or an audio packet in that it is made up of a "pack header", a "system header", a "packet header for PCI packet", a "data field for PCI packet", a "packet header for DSI packet" and a "data field for DSI packet".

The system header stores management information for the entire VOB unit which has this management information pack at the front, in accordance with MPEG standards. It stores the overall necessary transfer rate and an indication of a transfer rate and buffer size for each of the video stream, the audio stream, and the sub-picture stream.

The stream IDs of the two packet headers in a management information pack, as shown by the oblique shading in FIG. 9, are both set the identification code "1011 1111" which indicates "private stream 2".

The PCI packet contains the Highlight Information which is used to perform reproduction control in accordance with cursor operations for menus and confirmation operations for items, when the sub-picture pack is used to display a menu made up of a plurality of items. In the present embodiment, the Highlight Information includes color information for the colors to be used in the sub-picture display, as well as reproduction control information for reproduction control to be performed in response to confirmation operations.

A representative example of such "reproduction control in response to a confirmation operation" is a branch which switches reproduction from a present reproduction route to another reproduction route. Here, switching of reproduction route is performed by having commands, named "Highlight commands", stored in the Highlight information corresponding to each item in a menu, and by having these commands executed when the management information pack is read by the disc reproduction apparatus. Since these commands which correspond to each item, which in turn correspond to a confirmation operation, are executed selectively, reproduction routes can be switched in units of one set of PGC information. PGC information is described in more detail later in this specification.

A DSI packet stores information which is necessary for the reproduction of an MPEG stream from the present data position. Each DSI packet also stores the addresses of the preceding and succeeding DSI packets, which are referred to when special reproduction functions, such as fast forward, are performed.

This concludes the explanation of video objects (VOB), so that the following explanation will deal with the composition of the Video Title Set management information in the Video Title Set.

(1.1.1.2) Video Title Set—Video Title Set Management Information

The Video Title Set management information is a collection of control information for reproducing video materials, which have not been subjected to any editing processes and have not been arranged in order of reproduction, so that they compose one video title.

Figure 6:
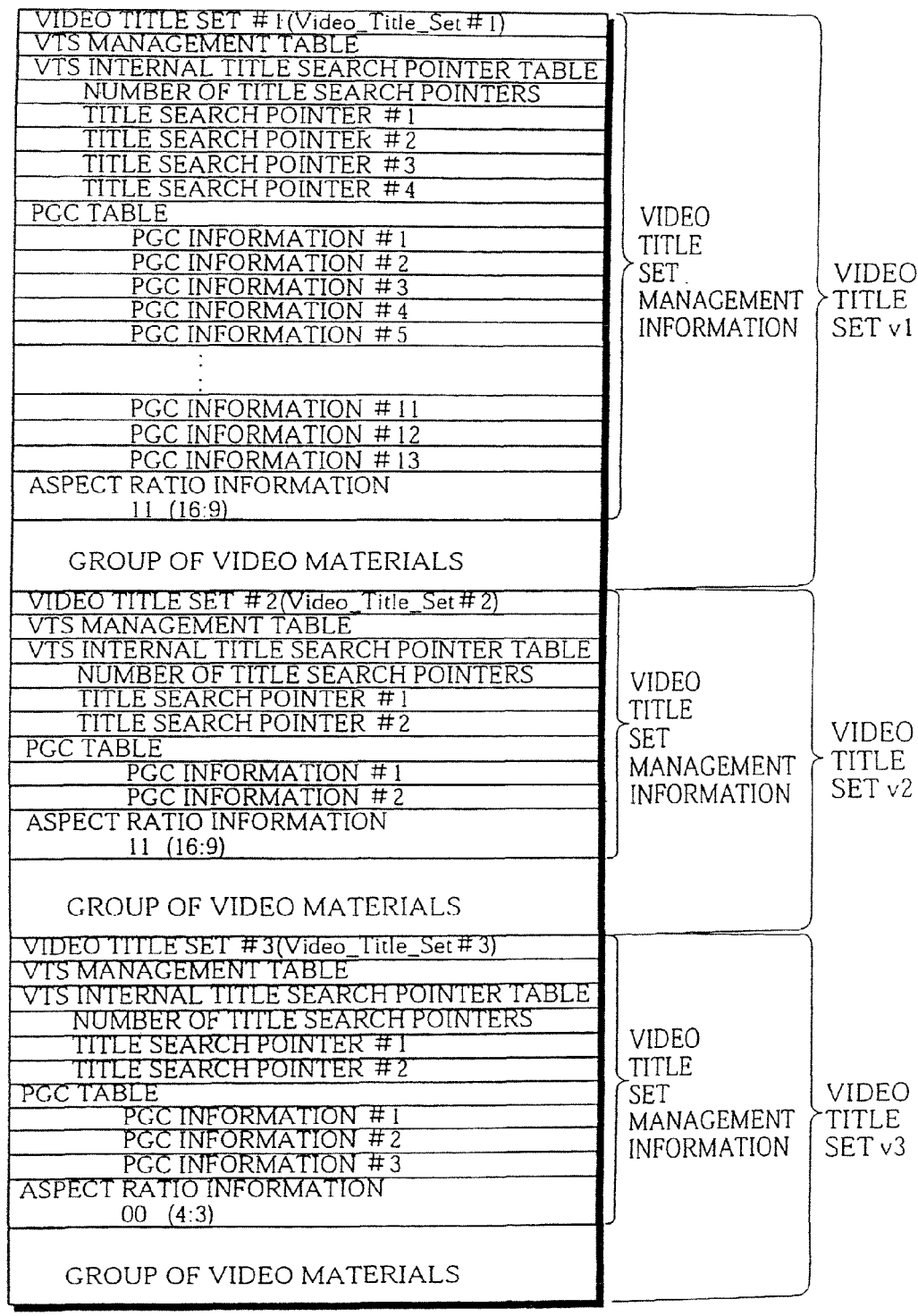
FIG. 6 shows an example of internal composition of video title set V1, video title set V2, and video title set V3.

In the present embodiment, a video title is an image production that is expressed using (1) a Video Title Set number which is uniquely assigned to the title on the optical disc, (2) one or more sets of PGC information which show the route taken by the optical pickup in reading the optical disc, and (3) video information which is successively read from the optical disc in accordance with the PGC information. These kinds of information are managed by the Video Title Set (VTS) management information in each Video Title Set. An example of such Video Title Set management information is shown in FIG. 6. As shown in FIG. 6, this Video Title Set management information is composed of a "VTS internal title search pointer table", a "PGC table", and "VTS internal aspect ratio information".

The "aspect ratio information" informs the disc reproduction apparatus whether the group of video materials in the video title set are to be subjected to wide-screen display processing before display. As described above, the video content of the group of video materials in video title set V1 is squeezed before recording into VOBs, so that in view of this squeezed state of the video content, the aspect ratio information of the video title set V1 is set at "11 bit", indicating the performance of wide-screen display processing to the disc reproduction apparatus. By looking at the aspect ratio information of the other video title sets in the present figure, it can be seen that "11 bit" is also set for video title set V2, while "00 bit" is set for video title set V3. Here, the setting "00 bit" indicates to the disc reproduction apparatus that wide-screen display processing is not to be performed for the set of video materials included in video title set V3.

The "PGC table" stores a plurality of sets of PGC information. As described above, VOBs store images which have not been edited or arranged into reproduction order, so that it is necessary to provide disc reproduction apparatuses with information showing how the video information is to be reproduced. This information is provided by the sets of PGC information which are stored in the PGC table, as shown in FIG. 6. In order to arrange the video materials to create a scenario, each set of PGC information specifies a retrieval order of VOBs and various supplementary control indications for the disc reproduction apparatus to be executed during the reproduction of the indicated VOBs. Examples of such supplementary control are control for the mapping of substreams for the pairing of the logical channel number and the display mode, or control to have branches performed between sets of PGC information.

The VOB reproduction orders in the various sets of PGC information in the PGC table are expressed as lists of VOB position information. Here, the lists of position information included in sets of PGC information are interpreted by a disc reproduction apparatus as retrieval orders for VOBs. In FIG. 8, the sets of PGC information each have their own retrieval order of VOBs, which shows that a plurality of video titles with different reproduction orders are prepared by rearranging the order of the VOB position information in the different sets of PGC information. Putting this into other words, multiple scenarios are created using different arrangements of the same scenes.

Of special note here is that sets of PGC information in the PGC table include link information for branches to other sets of PGC information, and that these links can be branch links in which a plurality of sets of PGC information are linked to the present set of PGC information. For branch links, the branch destination is decided according to a user operation during reproduction. Here, management information for managing all of the PGC information and information which is only valid for the PGC being reproduced are also stored in the PGC table, with an example of such being a color conversion table which is used for the sub-picture throughout the entire reproduction period. This PGC management information is not related to the gist of the present invention, and so will not be described in detail. Instead, it should be noted that the sets of PGC information are provided for the retrieval of VOBs and for the definition of supplementary control, with different sets of PGC information being used in the different scenarios for each video title. Since PGC information is used to describe scenarios, it is also known as "scenario information".

The "Video Title Set (VTS) internal title search pointer table is a table which is composed of title numbers, and pointers to sets of PGC information which correspond to VTS title search pointer #1, VTS title search pointer #2, VTS title search pointer #3, etc. It is a table used for referencing the sets of PGC information stored in the PGC management information table using a VTS internal title number. Here, a VTS internal title number is a locale number for managing separate titles in the Video Title Set.

FIG. 14 shows an example of the content of the VTS internal title search pointer table. As shown in this figure, the VTS internal title search pointers #1, #2, and #3 are respectively made up of a Video Title Set number and VTS internal title number (this pairing corresponding to the title number assigned to one of titles), and a number (PGC number) of a set of corresponding PGC information. The sets of PGC information which are linked to the VTS internal title numbers in VTS internal title search pointers #1, #2, and #3, are sets of PGC information which are specified by a selection operation made by the user. These sets of PGC information are somewhat exceptional when compared to other PGCs, which are stored without information showing the origins of branches, in that they are specified by a clear operation made by the user after referring to the available title names. As a result, these sets of PGC information are appended with the label "Entry-PGC" to distinguish them from other sets of PGC information.

(1.1.1.2.1 Video Title Set Management Information—PGC Information

The following is an explanation of the data construction of the sets of PGC information. Here, FIG. 16A shows the logical format of PGC information #1, #2, #3 . . . #6 in the PGC table, while FIG. 15 shows an example of the kind of values which are set within this logical format.

As shown in FIG. 16A, each set of PGC information is made up of "PGC link information", "sub-picture mapping information", and a "VOB position information table".

The VOB position information table uses sequences of VOB position information to indicate to the disc reproduction apparatus what VOBs should be read in what order for the present set of PGC information. Each set of VOB position information informs the disc reproduction apparatus of the storage position of each VOB on the optical disc, so that the disc reproduction apparatus can have the optical pickup scan that storage position. The content of the set of VOB position information are shown in FIG. 16B. As shown in FIG. 16B, each set of VOB position information in the present embodiment is expressed as a "VOB reproduction time", a "VOB offset", and a "No of blocks in VOB". When reading a VOB, the disc reproduction apparatus uses the offset numbers included in the VOB position information and calculates the logical block numbers of the logical blocks in which the VOB is stored, before having the optical pickup scan only the number of logical blocks indicated by the "No of blocks" on the track of the optical disc.

The PGC link information is information which shows what reproduction route continues after the present logical block. To do so, it stores link destination information which shows what set of PGC information should be next read into the buffer. When the reproduction according to one set of PGC information is completed by the disc reproduction apparatus, the next set of PGC information is determined in accordance with the "PGC link information", and this next set of PGC information is read from the disc and overwritten into the buffer. In this way, the PGC information is updated and reproduction control can continue in accordance with the reproduction route indicated by this updated set of PGC information. Here, for the example shown in FIG. 15, the link destination "PGC information#2" is given for PGC informational, while the link destination "PGC information#3" is given for PGC information#2, and the link destination "PGC information#4" is given for PGC information#3. As a result, the disc reproduction apparatus can perform reproduction control according to PGC information#2 having completed the reproduction control in accordance with PGC information#1, with PGC information#3 and #4 following on after this.

The sub-picture mapping information is information which indicates to the disc reproduction apparatus the sub-picture substreams which can be used when performing reproduction control according to the PGC information and their selection conditions. The selection conditions of each substream are made up of logical channel numbers and display mode information.

Logical channel numbers are classification numbers which are assigned to substream IDs for the management of the display content of each substream. As one example, the classifications referred to here can be English subtitles, Japanese subtitles, and the like.

Display mode information is information which shows what processing should be performed by the disc reproduction apparatus for each frame of video information when the main image data is displayed in each of the different display modes for the different aspect ratios.

The following is an explanation of a specific example composition of a substream using the logical channel numbers and the display mode information. This example is shown in FIG. 15. In FIG. 15, the substream ID expressed as "0010 0001" in binary is the substream ID assigned to the $1^{st}$ sub-picture substream. The information "CH0" and "aspect ratio 4:3 letterbox" are given to the left of this substream ID, with this line of information telling the disc reproduction apparatus to decode the sub-picture unit with the substream ID "0100 0001" when the logical channel number in the disc reproduction apparatus is CH0 and the display mode is "aspect ratio 4:3 letterbox". The line of information written as "CH0", "aspect ratio 4:3 pan scan", "0100 0000", tells the disc reproduction apparatus to decode the sub-picture unit with the substream ID "0100 0000" when the logical channel number in the disc reproduction apparatus is CH0 and the display mode is aspect ratio 4:3 pan scan.

In more detail, the information "aspect ratio 4:3 standard" shows that the viewer wishes to view an image title which has not been adapted for use on a wide-screen TV on a conventional TV screen with an aspect ratio of 4:3. In the same way, the information "aspect ratio 16:9 standard" shows that the viewer wishes to view an image title which has been adapted for use on a wide-screen TV on such a wide-screen TV screen with an aspect ratio of 16:9. The information "aspect ratio 4:3 pan scan" shows that the viewer wishes to view an image title which has been adapted for use on a wide-screen TV on a conventional TV screen with an aspect ratio of 4:3 using a setting of pan scan display mode. Finally, the information "aspect ratio 4:3 letterbox" shows that the viewer wishes to view an image title which has been adapted for use on a wide-screen TV on a conventional TV screen with an aspect ratio of 4:3 using a setting of letterbox display mode.

In FIG. 15, PGC information #1 which defines the retrieval of VOB#1 has the $0^{th}$, $1^{st}$, $2^{nd}$, $6^{th}$, $12^{th}$, and $15^{th}$ sub-picture substream IDs set in the sub-picture mapping information. Since the $0^{th}$, $1^{st}$, $2^{nd}$, $6^{th}$, $12^{th}$, and $15^{th}$ sub-picture units in VOB#1 have their own respective superimposing positions for the different languages and display modes, the disc reproduction apparatus can superimpose the sub-picture at an optimal position for the display mode which is set for the TV screen in use.

PGC information #2 which defines the retrieval of VOB#2, on the other hand, only has the $0^{th}$ and $15^{th}$ sub-picture substream IDs set in the sub-picture mapping information. This is because although VOB#5 assigns a substream to each logical channel number, the substreams for all three display modes use the same substream. Accordingly, for the period when PGC information #2 is valid, the disc reproduction apparatus may select either of the $0^{th}$ and $15^{th}$ sub-picture units in accordance with the value of the logical channel number. It is also possible here for other information to be included in the sets of PGC information, with a representative example of such being the "PGC command table".

The "PGC command table" is a table which stores various commands, such as conditional branch commands which are appended to the "VOB position information table". The disc reproduction apparatus executes the commands which are written here before and after the retrieval of VOBs based on the "VOB position information table", so that more dynamic switching of reproduction routes can be achieved. The conditional branch commands in the present table are expressed as comparisons to see whether the values of general registers and immediate values are equal or higher/lower, with the branch destinations being expressed as PGC numbers. Here, general registers are registers for storing values in accordance with operations made by the user during reproduction, and are used to inform the disc reproduction apparatus of user operations which have been made using a remote controller or a control panel. Branches which are performed in interactive software are performed using these conditional branches which indicate sets of PGC-information as their branch destinations.

(1.1.2) Logical Construction-Video Manager

The Video Manager is made up of VTS internal title search pointers, video objects, and sets of PGC information, with it being possible for its data construction to be standardized to that of the Video Title Set (although it should be obvious that it is far more simplified than that of the Video Title Set). The difference between the VOBs for the Video Manager and the VOBs for the Video Title Set lies in the fact that the Video Manager is used exclusively for reproducing the volume menu. Here, the expression "volume menu" refers to a menu in which all of the titles stored on the optical disc are recorded, so that the user can select one of the titles when the volume menu is displayed. When an optical disc is loaded into the disc reproduction apparatus, this volume menu is displayed on the screen immediately after the optical pickup has moved from the volume management area to the file area.

Since the Video Manager is only used for the volume menu, there are the following two differences between the Video Manager and the Video Title Set. Firstly, while the VOBs in the Video Title Set include video data for actual footage, sub-picture data and audio data, the VOBs in the Video Manager only contain a video pack, a sub-picture pack and a management information pack for a background image for a menu. Secondly, the branch destinations of the branch commands in the PGC information and the management information of the Video Title Set, with certain exceptions, do not exceed the range of the Video Title Set, while the branch commands in the Video Manager have branch addresses for titles in a variety of Video Title Sets on the optical disc, so that they can cross over between Video Title Sets.

The most significant characteristic of the Video Manager is that it is loaded into a memory provided in the disc reproduction apparatus for the duration that the optical disc is loaded in the disc reproduction apparatus. By having the Video Manager stored in memory in this way, the disc reproduction apparatus can refer to the content of the Video Manager without performing a disc access operation.

FIG. 17 shows the data construction of the Video Manager. As shown in this figure, the Video Manager is composed of "VOBs for menu", "PGC for menu", and a "VM internal title search pointer table".

The "VOBs for menu" are VOBs which are specially used for the volume menu. As their name suggests, they include the sub-picture pack for displaying the volume menu and the management information pack for performing reproduction control in accordance with cursor operations and confirmation operations. The display image for a volume menu is shown in FIG. 18. The VOB for the volume menu includes a sub-picture pack in which character strings showing the titles have been subjected to run-length encoding, the titles including "1: Wildlife in the Antarctic: A Pictorial Documentary", "12: Interactive Antarctic Adventure", "3: A Fairy Tale of the Antarctic", "4: Multimedia Guide to the Wildlife of the Antarctic", and "5: Exploring the Historic Sites of South-East Asia". The user selects one of these title name character strings and performs a confirmation operation to indicate the title to be reproduced. Here, the management information pack in the same VOB includes a same number of sets of item information as there are titles. These sets of item information store a "Title Play" command which indicates a branch to each title number and a "palette conversion range" which shows the area on the display whose color will change when the corresponding item is in the selection condition.

The set of "PGC for menu" information is a set of PGC information which is exclusively used for the volume menu, and stores the recording position of the corresponding menu VOB so that the menu VOB can be read when the optical disc is loaded into the disc reproduction apparatus. This set of PGC information is read by the disc reproduction apparatus immediately after the disc has been loaded in the disc reproduction apparatus and the optical pickup has moved from the volume management area to the file area, and is used to guide the optical pickup so as to read the VOB for menu. In this way, the volume menu can quickly be displayed on the screen.

The VM internal title search pointer table is made up of a plurality of VM internal title search pointers #1 ... #69 which each correspond to a title number. In this figure, the VM internal title search pointer #1 corresponds to title number 1, with VM internal title search pointers #2 and #3 respectively corresponding to title numbers 2 and 3.

VM internal title search pointer #1 includes a pairing of a Video Title Set number and a VTS internal title number.

"Title No. 1" assigned to the video title "1: Wildlife in the Antarctic: A Pictorial Documentary" corresponds to the VM internal title search pointer #1. In FIG. 17, the VM internal title search pointer #1 includes the VTS number indicating VTS V1 and the first VTS internal title number. In the title search pointer #1 in VTS V1 shown in FIG. 14, the VTS internal title number is linked to PGC information #5, showing that when the viewer selects the video title "1: Wildlife in the Antarctic: A Pictorial Documentary", the retrieval order of VOBs is given by PGC information #5 in VTS V1.

In the same way, "Title No. 3" assigned to the video title "3: A Fairy Tale of the Antarctic" corresponds to the VM internal title search pointer #3. In FIG. 17, the VM internal title search pointer #3 includes the VTS number indicating VTS V1 and the third VTS internal title number. In the title search pointer #3 in VTS V1 shown in FIG. 14, the VTS internal title number is linked to PGC information #1, showing that when the viewer selects the video title "3: A Fairy Tale of the Antarctic", the retrieval order of VOBs is given by PGC information #1 in VTS V1.

(2.1) Outline of the Disc Reproduction Device

The following is an explanation of the disc reproduction apparatus of the present invention. The viewing setup for video titles, with an emphasis on a household audio-visual disc reproduction apparatus (hereafter referred to as a "DVD player"), is shown in FIG. 19. The illustrated setup is composed of DVD player 1, a wide-screen TV monitor 2, a standard TV monitor 3, and a remote controller 91.

DVD player 1 performs the reproduction of the video titles stored on an optical disc. The reproduction of video titles by DVD player 1 consists of the conversion of the VOB recorded on a DVD into an NTSC (National Television System Committee) or PAL (Phase Alternating by Line) signal. Such signals are standardized according to international television standards, so that the conversion of VOBs to such signals enables the video titles recorded on a DVD to be reproduced by conventional TV sets in use around the world.

DVD player 1 has an opening in the front of its case and has a drive mechanism for driving a disc provided inside this opening.

A remote control receiving unit 92, which includes detecting elements for detecting the infra red signals emitted by the remote controller 91, is provided on the front of the DVD player 1, so that when the user makes an operation with the remote controller 91 in his/her hand, the remote control receiving unit 92 generates an interrupt signal which indicates the inputted key.

A video output terminal and an audio output terminal are provided on the back of the DVD player 1, so that when these terminals are connected to a standard TV set, a video signal (in NTSC or PAL format) read from a DVD can be enjoyed by the user.

In the present embodiment, both the wide-screen TV monitor 2 and the standard TV monitor 3 are TV sets which display the signal outputted by the DVD player 1. The difference between these TV monitors lies in their aspect ratios, with wide-screen TV monitor 2 having an aspect ratio of 16:9 and standard TV monitor 3 having an aspect ratio of 4:3. Since the aspect ratio of standard TV monitor 3 is 4:3, the video content can be arranged on the screen according to letterbox display mode or pan scan display mode.

As mentioned in the description of the construction of the multimedia optical disc, of the titles recorded on DVD 107, video title sets V1 and V2 are adapted for display on a wide-screen TV, while video title set V3 is not adapted for such display.

Figure 20:
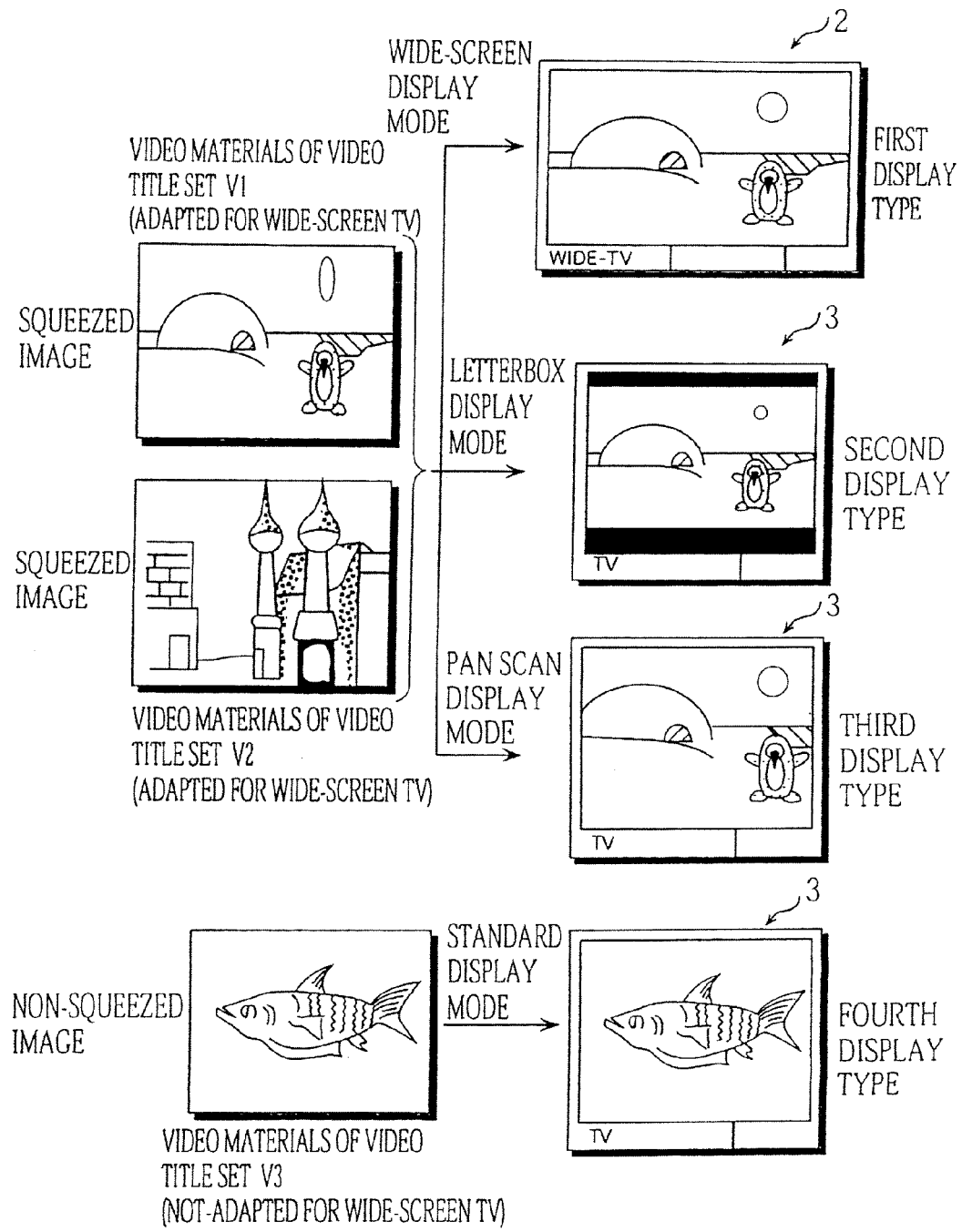
FIG. 20 shows the four display types of video titles.

In the present system, there are four possible viewing environments for the display for video titles, based on the differences in the display modes of the TV sets and whether or not the video titles have been adapted for wide-screen TV display. These four possible viewing environments are shown in FIG. 20. These consist of a first type in which a video title which has been adapted to wide-screen TV display (such as video title which uses the video materials in video title set V1 or V2)

is displayed on a TV monitor which has an aspect ratio of 16:9, a second type in which a video title which has been adapted to wide-screen TV display is displayed on a TV monitor which has an aspect ratio of 4:3 using letterbox display mode, a third type in which a video title which has been adapted to wide-screen TV display is displayed on a TV monitor which has an aspect ratio of 4:3 using pan scan display mode, and a fourth type in which a video title which has not been adapted to wide-screen TV display is displayed on a TV monitor which has an aspect ratio of 4:3, with DVD player 1 performing control to select one of these environments as the present viewing environment. Display mode information is information for managing these modes, which can each be set its own value. These four values can be expressed in binary as "00", "01", "10", and "11", corresponding to "aspect ratio 4:3", "aspect ratio 16:9", "letterbox display mode", and "pan scan display mode". In addition to receiving user settings of the display mode value, the DVD player 1 also manages this value. This receiving of a user setting of the display mode value enables the DVD player 1 to know the user's desired viewing environment for a video title, and on receiving such a setting, the DVD player 1 stores the display mode value corresponding to the chosen type of viewing environment so that it can control the viewing environment based on this value.

Figure 21:
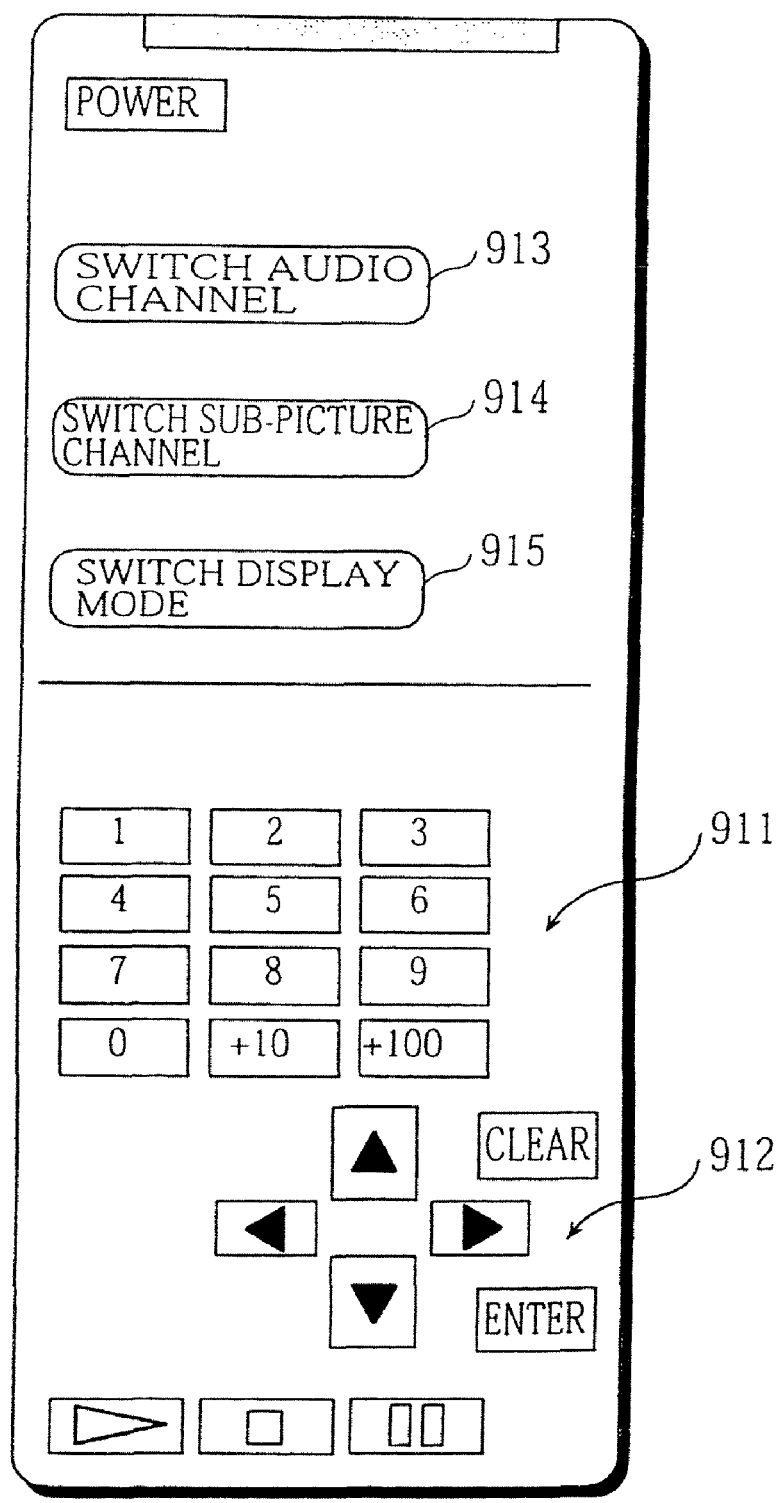
FIG. 21 shows an example key arrangement for the remote controller 91.

The remote controller 91 is used to receive user operations. An example key arrangement for remote controller 91 is shown in FIG. 21. As shown in FIG. 21, the ten key 911 is for numerical input which is made is combination with other keys. The cross-shaped cursor keys 912 are for receiving cursor operations. The "Enter" key is for confirming selection. The "Switch audio channel" key 913 is for cyclically changing the audio logical channel number. Here, "cyclically changing" refers to the incrementing of the value until a maximum value is reached, after which the value returns to zero. For the example when there are eight channels, successive presses of a switch channel key result in the incrementing of the channel number in "0", "1", "2", "3", "4", "5", "6", "7", "0", "1", "2", "3", "4", "5", "6", "7" order to select one channel in the range "0" to "7". The "Switch sub-picture channel" key 914 is for cyclically changing the sub-picture logical channel number. Finally, the "Switch display mode" key 915 is for cyclically changing the display mode value.

(2.2) Construction Elements of the Disc Reproduction Device

Figure 22A:
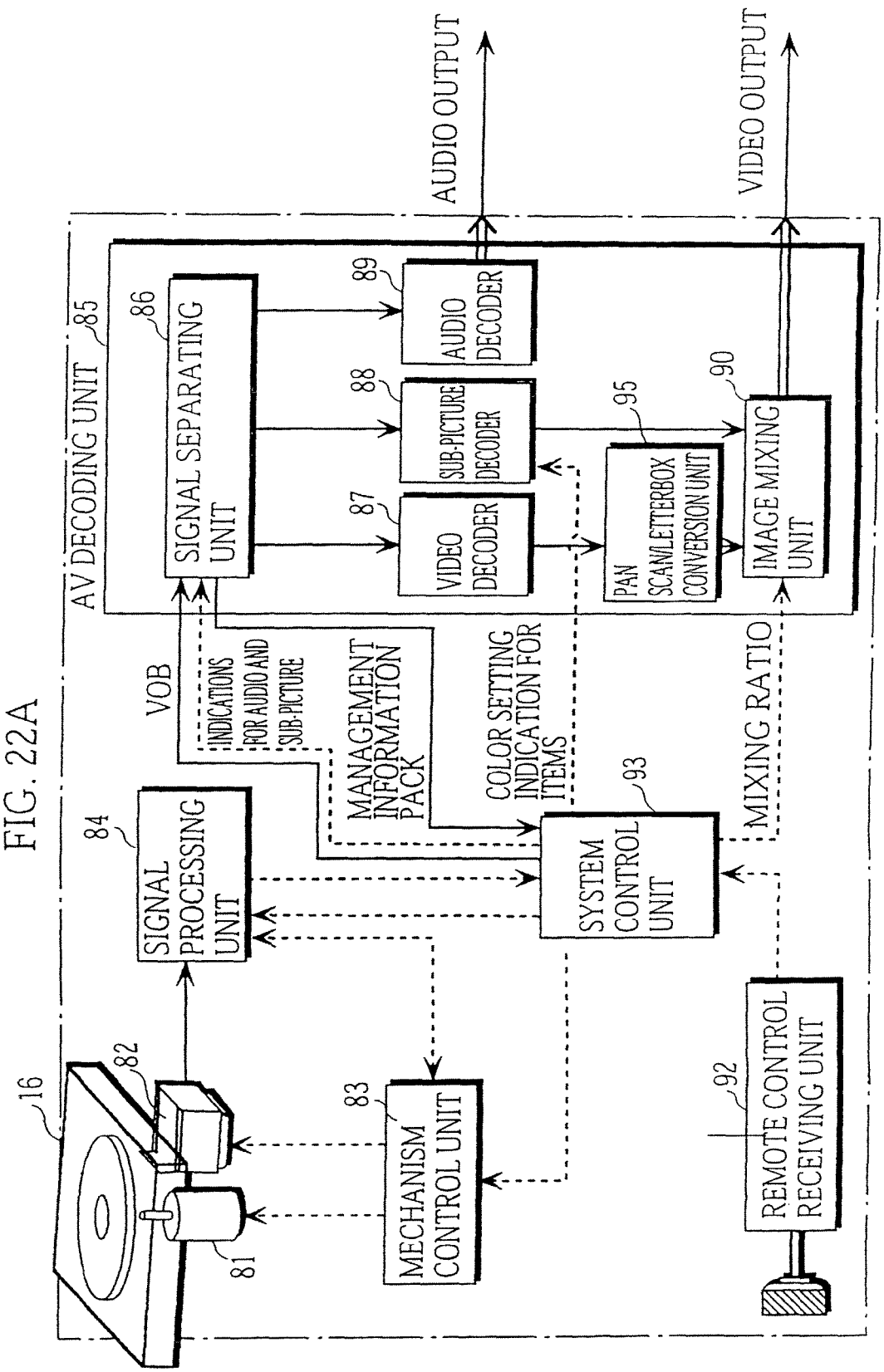
FIG. 22A is a block diagram of the internal construction of the DVD player 1 of the present invention.

FIG. 22A is a block diagram showing the construction of the DVD player used in the present embodiment. The DVD player includes a drive mechanism 16, an optical pickup, a mechanism control unit 83, a signal processing unit 84, an AV decoding unit 85, a remote control receiving unit 92, and a system control unit 93. AV decoding unit 85 comprises a signal separating unit 86, a video decoder 87, a sub-picture decoder 88, audio decoder 89, a picture mixing unit 90, and a pan scan/letterbox conversion unit 95.

The remote control receiving unit 92 receives a key signal which is infra red transmitted when a key on the remote controller 91 is pressed, and generates in interrupt signal indicative of the pressed key to notify the system control unit 93 of the pressed key as a "reception instruction". Here, the kinds of reception instructions which can be used to notify the system control unit 93 include start reproduction instructions, stop reproduction instructions, button selection instructions, button confirmation instructions, display mode switching instructions, sub-picture switching instructions, and audio switching instructions.

The drive mechanism 16 comprises a platter on which an optical disc is placed and spindle motor 81 for rotating the inserted optical disc. The platter can be moved in and out of the DVD player by means of an eject mechanism which is not shown in the drawing. The user places an optical disc on the platter when it has been projected forward outside the DVD player. After this, the platter is moved back into the DVD player to load the optical disc.

The mechanism control unit 83 controls the spindle motor 81 for rotating the disc and the mechanism made up of the optical pickup for reading the signal from the disc and actuator 82 of the optical pickup. More specifically, the mechanism control unit 83 adjusts the motor speed according to a track position specified by system control-unit 93. At the same time, it moves the optical pickup by controlling the actuator 82 of the pickup and, having detected a correct track by servo control, waits until a desired physical sector is reached before continuously reading signals starting from desired position.

The signal processing unit 84 converts the signals read using the optical pickup into a sequence of digital data while performing various processes such as amplification, waveform shaping, conversion to binary, demodulation, and error correction. It then stores the processed data in a buffer memory inside the system control unit 93 in logical block units.

The AV decoding unit 85 applies certain processes to the digital data inputted as VOBs and converts the digital data into video signals and audio signals.

The signal separating unit 86 receives the digital data transferred from the buffer memory in units of logical blocks (packets), and classifies the data into packs of management information data, video data, sub-picture data, or audio data by identifying the stream ID and sub-stream ID of each packet. The signal separating unit 86 outputs video data to the video decoder 87, audio data to the audio data decoder 89, and sub-picture data to the sub-picture decoder 88. The signal separating unit 86 also outputs management information packs to the system control unit 93. When such data is outputted, the system control unit 93 indicates numbers to the signal separating unit 86, with, as shown in FIG. 6, these numbers indicating one set of audio data and one set of sub-picture data. On receiving these indications from the system control unit 93, the signal separating unit 86 outputs only the data on the specified channels to the audio decoder 89 and the sub-picture decoder 89. The data on the other channels is discarded.

(2.2.1) Disc Reproduction Device—Construction of Signal Separating Unit 86

Figure 22B:
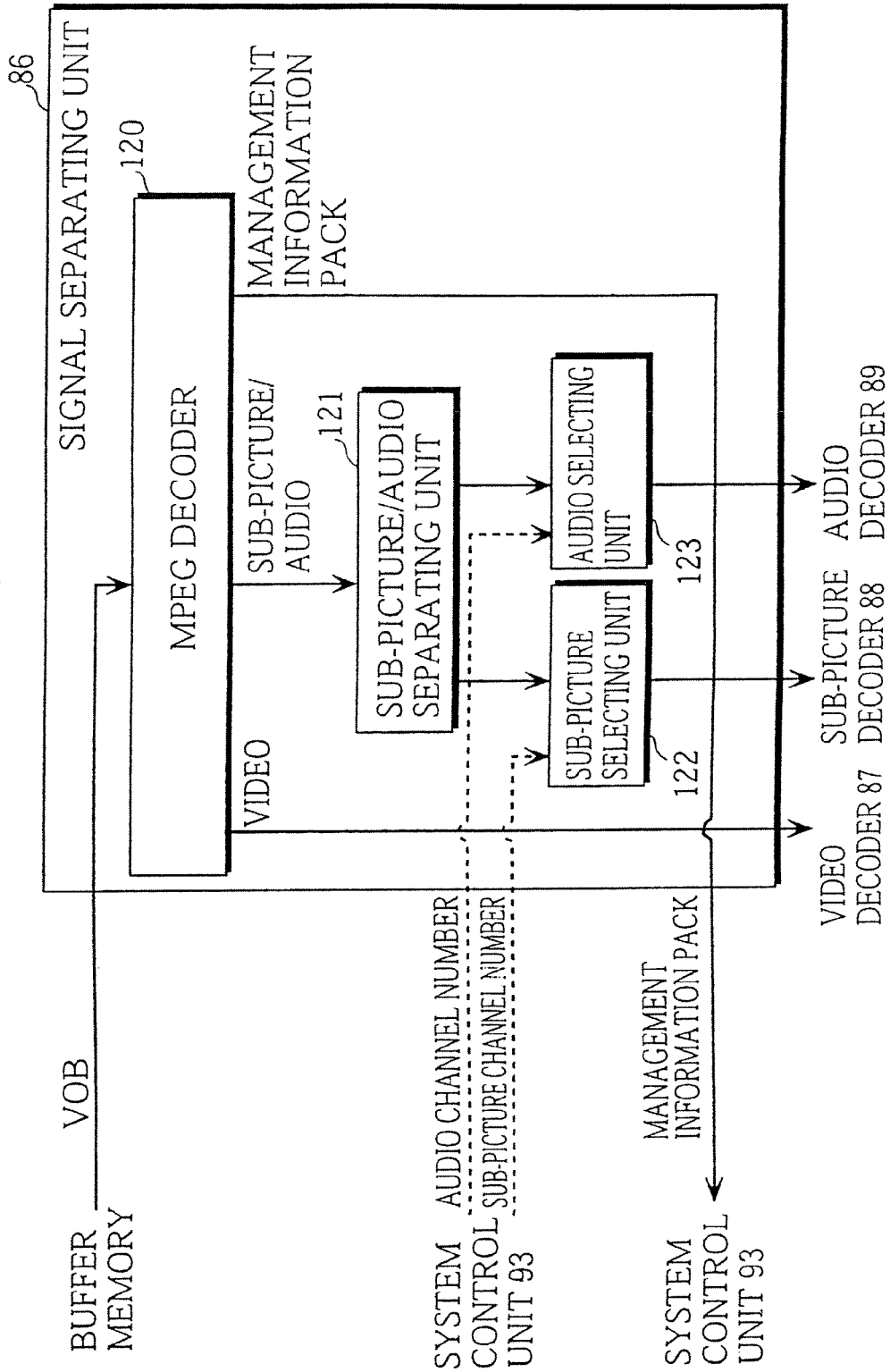
FIG. 22B is a block diagram showing the composition of the signal separating unit 86.

FIG. 22B is a block diagram showing the construction of the signal separating unit 86. As shown in the drawing, the signal separating unit 86 comprises an MPEG decoder 120, a sub-picture/audio separating unit 121, a sub-picture selecting unit 122, and an audio selecting unit 123.

The MPEG decoder 120 determines the types of packs transferred from the buffer memory by checking the stream IDs and outputting the packets as follows. If the stream ID is "1110 0000", the MPEG decoder 120 outputs the packet to the video decoder 87. If the stream ID is "1011 1101", the MPEG decoder outputs the packet to the sub-picture/audio separating unit 121. Alternatively, if the stream ID is "1011 1111", the MPEG decoder 120 outputs the packet to the system control unit 93.

The sub-picture/audio separating unit 121 outputs the packets input from the MPEG decoder 120 to the sub-picture selecting unit 122 if their sub-stream ID is "001* **" or to the audio selecting unit 123 if their sub-stream ID is "1010 0*" or "1000 0*". As a result, each set of sub-picture data and audio data is appropriately output to either the sub-picture selecting unit 122 or the audio selecting unit 123**.

The sub-picture selecting unit 122 performs the selection processing for the sub-picture packs sent from the sub-picture/audio separating unit 121. As mentioned above, up to 32 sub-picture substreams can be included in a VOB, but when English subtitles, for example, are indicated by the system control unit 93, the sub-picture selecting unit 122 will only output the sub-picture packs with the substream ID corresponding to English subtitles to the sub-picture decoder 88 and will discard the rest of the sub-picture packs which do not have the corresponding substream ID. As a result, the sub-picture decoder 88 will decode only the English subtitles.

The audio selecting unit 123 performs the selection processing for the audio packs sent from the sub-picture/audio separating unit 121. The audio selecting unit 123 outputs only the audio data corresponding to the indication from the system control unit 93 to the audio decoder 89 and discards the rest of the audio data which does not have the corresponding substream ID. As one example, when English, French, and Japanese dubbing soundtracks are available and the English dubbing soundtrack is selected by the system control unit 93, the audio selecting unit 123 only outputs the audio packs for the English dubbing soundtrack to the audio decoder 89, with the remaining audio packs being discarded. As a result, the audio decoder 89 decodes only the English dubbing soundtrack.

The video decoder 87 decodes and decompresses the video data sent from the signal separating unit 86, before outputting the data to the picture mixing unit 90 as a digital video signal.

The sub-picture decoder 88 includes a buffer for storing a plurality of sub-picture packs sent from the signal separating unit 86, and obtains sub-picture units by combining the sub-picture packs stored in this buffer.

Figure 26:
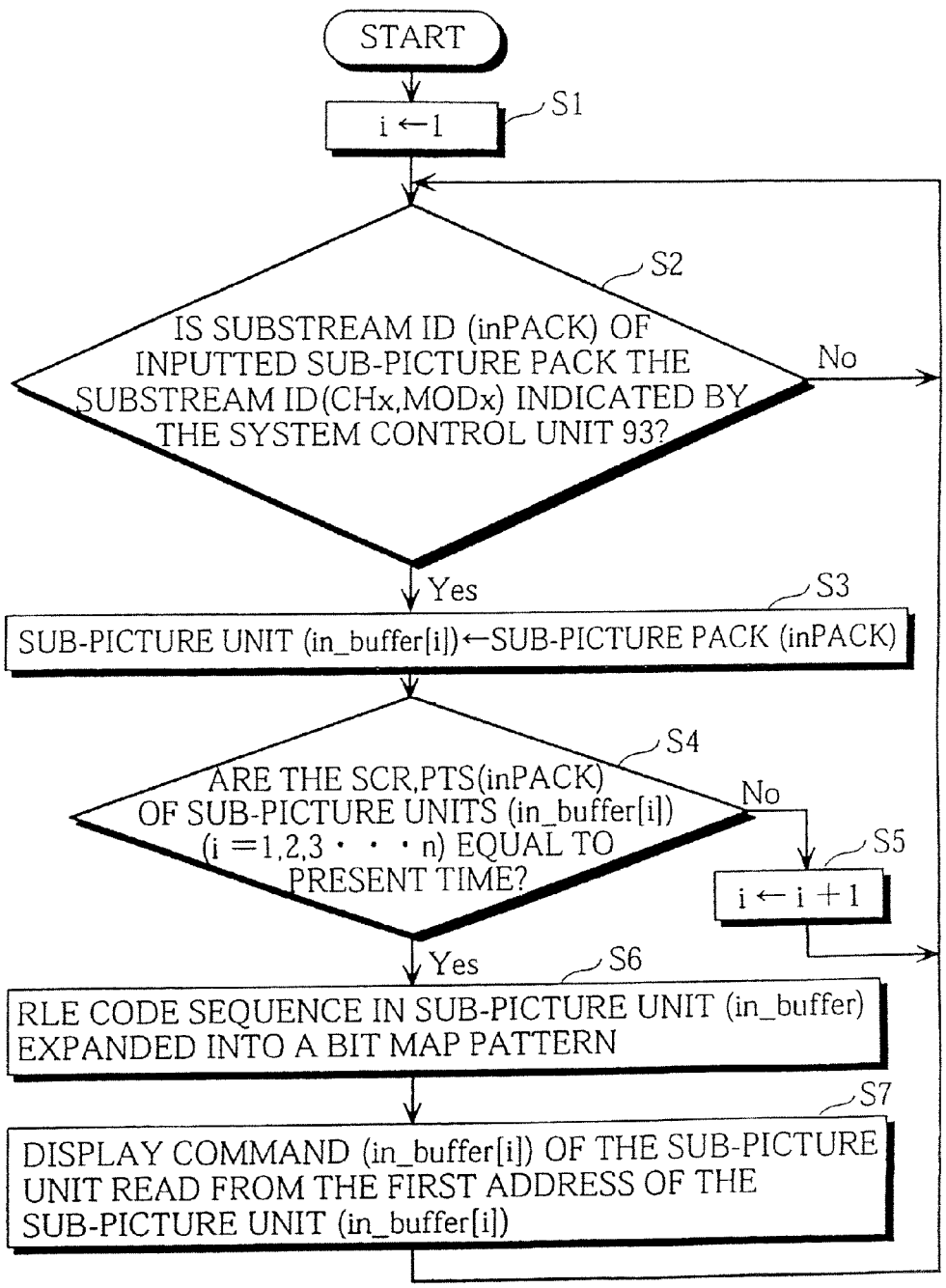
FIG. 26 is a flowchart showing the processing executed by the sub-picture decoder 88.

FIG. 26 is a flowchart for the combining process of sub-picture packs. In step S1, the variable i is initialized. This variable i is used to indicate each of the sub-picture packs which are stored in the buffer in the sub-picture decoder 88 and which form part of a sub-picture unit. In step S2, the sub-picture selecting unit 122 refers to the substream ID (shown as the substream ID "inPACK" in the figure) of the sub-picture packs which are inputted for storage in the buffer, and determines whether this substream ID coincides with the substream ID indicated by the system control unit 93. The substream ID indicated by the system control unit 93 is standardized according to the logical channel number (CHx) and the display mode number (MODx), and so is referred to as the substream ID (CHx, MODx).

If the substream IDs do not coincide, the sub-picture selecting unit 122 discards the present sub-picture pack and the processing returns to step S2, where the sub-picture selecting unit 122 waits for the input of the next sub-picture pack.

If the substream IDs coincide, in step S3 the sub-picture selecting unit 122 stores the present sub-picture pack, sub-picture pack (in PACK), as the first element of the sub-picture unit (in buffer[i]) (where i=1) in the buffer. In step S4, the SCR and the PTS in the header of the sub-picture pack (in buffer[i]) are decoded and are compared to the present time to see if they coincide. This check is performed since there is the possibility that the decoding time for a sub-picture unit already stored in the buffer will have been reached while the storage of sub-picture packs is repeatedly performed according to the process described above.

If the decoding time has not been reached, the variable i is incremented in step S5 and the processing returns to step S2, where the sub-picture selecting unit 122 waits for the input of the next sub-picture pack.

In the next iterations of the processing in steps S2 to S5, the sub-picture units (in buffer[i]) (where i=2, 3, 4, 5) are successively stored in the buffer as the $2^{nd}$, $3^{rd}$, $4^{th}$, and $5^{th}$ elements in the sub-picture unit.

Once the decoding time of the sub-picture unit is reached, in step S6 the RLE code sequence in the sub-picture unit (in buffer) is expanded into image data and is outputted to the image mixing unit 90, with, at the same time, the display command (in buffer[i]) of the sub-picture unit being read from the first address in the sub-picture unit (in buffer) also being outputted to the image mixing unit 90.

Here, if the image data is made up of a plurality of items and the user makes a cursor operation for these items, the system control unit 93 give an indication (called a "color change indication") for a change in the indicated color of the image data to the sub-picture decoder 88. Since such color change indications are performed based on the item color number in the Highlight information, items are changed to the selection color or confirmation color in accordance with this color change indication. By changing the colors of items, the displayed cursor can be moved between the items. Here, the image mixing unit 90 is informed of the coloring position and coloring range of the image data indicated by the display commands in the sub-picture unit.

The following explanation will deal once again with the internal construction of the DVD player shown in FIG. 22A. The audio decoder 89 decodes and expands the audio data inputted from the signal separating unit 86 and outputs the result as a digital audio signal.

The pan scan/letterbox conversion unit 95 performs pan scan conversion or letterbox conversion of the video signal inputted from the video decoder in accordance with the display mode indication from the system control unit 93. Here, if the set display mode is wide-screen TV display mode or 4:3 aspect ratio display mode, the inputted video data is outputted without processing.

When the indicated display mode is pan scan display mode, the left and right edges of the video data are trimmed to convert the video data to a pan scan image. Alternatively, when the indicated display mode is letterbox display mode, the image is reduced in the vertical direction and corrective images are added above and below the image to convert the video data to a letterbox image.

The picture mixing unit 90 outputs a video signal after mixing the outputs from video decoder 87 and sub-picture decoder 88 according to the mixing ratio specified by system control unit 93. In order to perform image mixing, the image mixing unit 90 is provided with a plane buffer, with the image data expanded by the sub-picture decoder 88 being arranged in the plane buffer into the superimposing position indicated by the display command. As described above, this superimposing position is set by the sub-picture decoder 88 decoding the display command in the sub-picture unit. After the image data is positioned, the content of the plane buffer is mixed with the video signal outputted by the pan scan/letterbox conversion unit 95. The mixing ratio used here is set based on the contrast written in the PCI packet in the management information pack, with it being possible to change the mixing ratio for each GOP. The mixed signal is then converted into a video signal for NTSC format and is then outputted to the TV monitor.

The system control unit 93 controls the entire disc reproduction apparatus and is provided with a program memory for storing a program for achieving the functions of the system control unit 93, a work memory which is necessary for executing the program, a buffer memory for storing the data in the logical blocks read from the disc, a CPU (Central Processing Unit) for executing the program, and an interface control unit for handling the input and output of control signals and of data to and from the periphery.

(2.2.2) Disc Reproduction Device—Construction of System Control Unit 93

Figure 23:
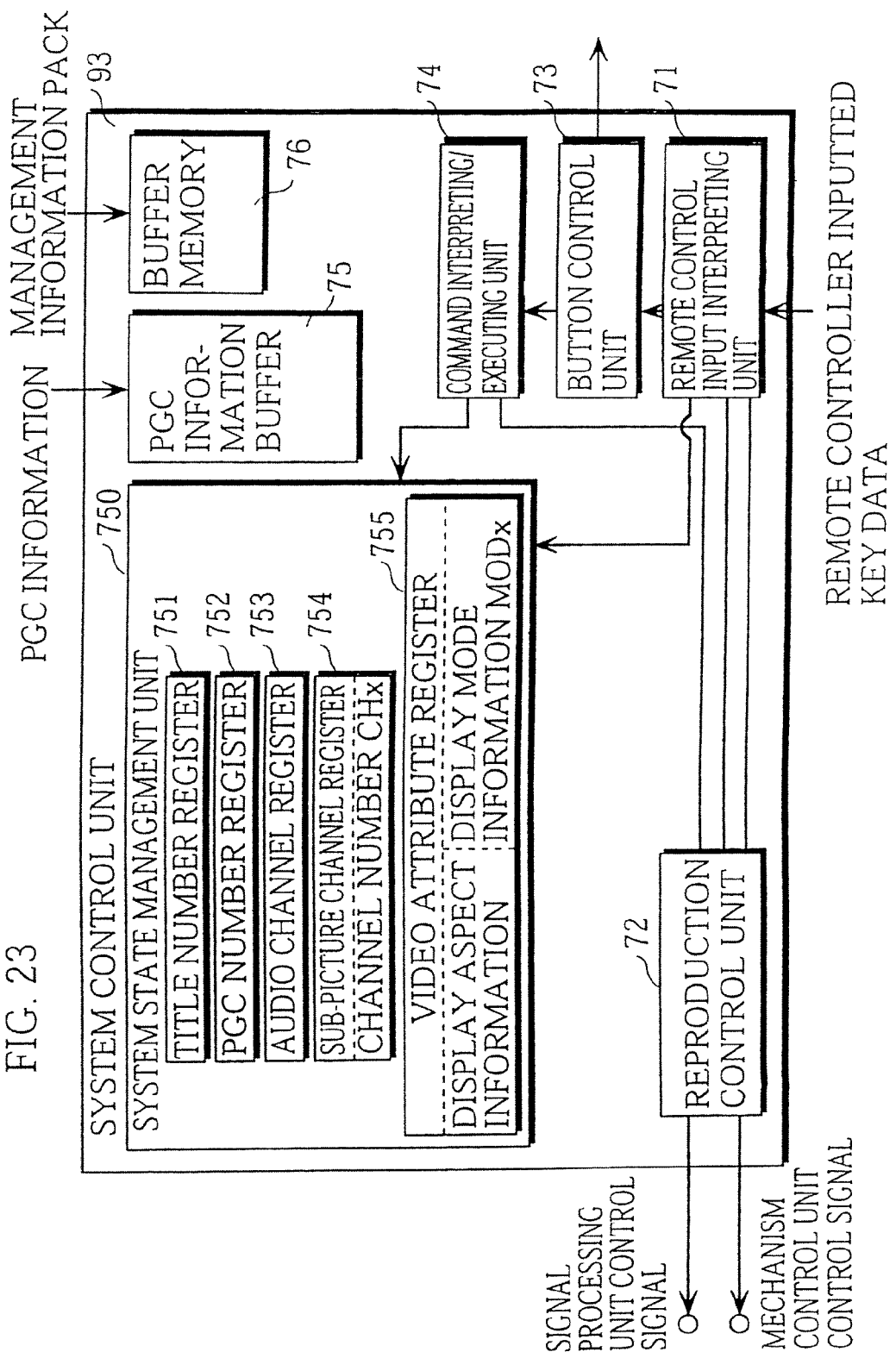
FIG. 23 shows the internal construction of the system control unit 93.

The following is an explanation of the internal construction of the system control unit 93 which is shown in FIG. 23. As shown in the figure, the system control unit 93 is made up of a remote control input interpreting unit 71, a reproduction control unit 72, a button control unit 73, a command interpreting/executing unit 74, a PGC information buffer 75, a buffer memory 76, and a system state management unit 750.

The remote controller input interpreting unit 71 interprets the remote control key data received by the remote control receiving unit 92. This interpreted remote control key data can be button selection instruction, a button confirmation instruction, a menu call instruction, an audio switching instruction, a sub-picture switching instruction, a display mode switching instruction, a start reproduction instruction, or a stop reproduction instruction. Of these, button selection instructions and button confirmation instructions are outputted to the button control unit 73, while start reproduction instructions and stop reproduction instructions are outputted to the reproduction control unit 72. Audio switching instructions, sub-picture switching instructions, and display mode switching instructions are outputted to the system state management unit 750.

The button control unit 73 stores the management information pack of the VOB currently being reproduced which it receives from the AV decoder unit 85, and, when a button selection instruction and a button confirmation instruction are received from the remote controller input interpreting unit 71, outputs a control signal to the AV decoder unit 85 for changing the color of the sub-picture in a screen area assigned to the button to the confirmation color, in accordance with the Highlight information in the PCI packet of the stored management information pack. Also, when a button confirmation instruction is received, it sends the command assigned to the selected button to the command interpreting/executing unit 74.

The command interpreting/executing unit 74 interprets the command inputted from the button control unit 73 and, if there is a change of PGC information which changes the reproduction route, the command interpreting/executing unit 74 outputs a reproduction control instruction notifying the reproduction control unit 72 of the new PGC information. The command interpreting/executing unit 74 also outputs a system state control instruction notifying the system state management unit 750 of when there has been a change to the state parameters stored inside the system.

The PGC information buffer 75 stores the current PGC information which is used by the DVD player during reproduction, out of all the sets of PGC information included in the PGC table.

The buffer memory 76 is used for storing the data which has been subjected to the various processes such as amplification, waveform shaping, conversion to binary, demodulation, and error correction. If the data written into the buffer memory 76 is Video Title Set management information, it is written into another buffer which is not illustrated. On the other hand, if the data is a VOB, the system control unit 93 transfers the data one pack at a time to the signal separating unit 86. When VOBs are transferred in this way, the management information packs will be sent back from the AV decoder unit 85.

The system state management unit 750 includes a group of state registers which is made up of various kinds of registers showing the present state of the disc reproduction apparatus. These registers are the title number register 751, the PGC number register 752, the audio channel register 753, the sub-picture channel register 754, and the video attribute register 755.

The title number register 751 stores the title number of the title selected for reproduction.

The PGC number register 752 stores the number of the PGC information which is being used in the retrieval of the present VOB, out of all of the PGC information included in the video title whose number is stored by the title number register 751.

The audio channel number register 753 stores the number of the audio channel which is presently valid, and outputs a control signal informing the AV decoder 85 of the audio channel which is to be reproduced.

The sub-picture channel number register 754 stores the number of the sub-picture channel which is presently valid, and outputs a control signal informing the AV decoder 85 of the sub-picture channel which is to be reproduced. The logical channel number stored by this register is hereinafter referred to as the sub-picture channel CHx.

The video attribute register 755 stores the aspect ratio information in the VTS management information in its higher-order bits and the display mode number showing the present display mode of the TV monitor in its lower-order bits. If the aspect ratio information stored by the higher-order bits is "16:9", the display mode information can be cyclically changed so as to be one of "standard display mode", "pan scan display mode", and "letterbox display mode". If the aspect ratio information stored by the higher-order bits is "4:3", the display mode information is fixed at "standard display mode".

The reproduction control unit 72 receives reproduction start instructions, reproduction stop instructions, and menu call instructions, and performs predetermined control operations.

FIGS. 24A to 24C and 25A and 25B are flowcharts showing the processing performed by the system control unit 93. These flowcharts will be referred to in the following explanation of the operation of DVD player 1.

When the user presses the eject button on DVD player 1, the platter is moved outside the cover. After the user places an optical disc on this platter, the platter is moved back into the DVD player 1 to load the disc. As shown in step S121 of FIG. 24A, the system control unit 93 first waits for a disc to be inserted, and, on detecting that a disc has been loaded using an optical sensor or the like, controls the mechanism control unit 83 and the signal processing unit 84 to perform rotation control with the optical pickup positioned in the lead-in region. This operation continues until stabilized rotation has been achieved, at which point the optical pickup is moved outward from the lead-in region to read the volume management area. Based on the information in this volume management area, the video manager is written into a buffer (step S122). The system control unit 93 also calculates the storage address of the PGC information for the volume menu, and writes the PGC information into the PGC information buffer 75 (step S123). Since this PGC information is for the volume menu, it is stored in the buffer so that the system control unit 93 can refer to its content and calculate the storage address of the VOBs to be reproduced for the menu. Once the VOB to be reproduced is decided, the system control unit 93 outputs a control signal to the mechanism control unit 83 and to the signal control unit 84 and has the determined VOBs read from the optical disc. As a result, a volume menu, such as that shown in FIG. 18, is displayed on the TV monitor 2 (step S124). While this volume menu is displayed, the reproduction control unit 72 waits for the selection of a title number (step S125).

Here, the user views the list of titles and confirms a selection of his/her desired title number. The selected title number is displayed, and the Highlight command, "PlayTitle", which is stored corresponding to the selected title number, is read. Following this, in step S127 the VTS number #i and the VTS internal title number #j are read from the title search pointer #k corresponding to the title number #k indicated by the operands of the "PlayTitle" command.

Next, in step S131 of FIG. 24B, the aspect ratio information included in the VTS management information for VTS#i is read and in step S132, it is determined whether the read aspect ratio information is 16:9. If this is not the case, such as for VTS V3 which has an aspect ratio of 4:3, the processing advances to S144. If the read aspect ratio is 16:9, the processing advances to S133 where the initial value of the display mode MODx is read from the video attribute register 755, before the processing advances to the determination in step S138. In step S138, the system determines whether the display mode MODx is pan scan display mode, and if so, the processing advances to step S139 where the pan scan/letterbox conversion unit 95 is informed of pan scan display mode, before the processing advances to step S144.

If, in step S138, the read display mode MODx is not pan scan display mode, the processing advances to step S140, where the system determines whether the display mode MODx is letterbox display mode. If so, the processing advances to step S141 where the pan scan/letterbox conversion unit 95 is informed of letterbox display mode, before the processing advances to step S144.

In step S144, the title number#j and the number of the Entry-PGC information are read from the title search pointer of VTS#i indicated by VTS number#i and are respectively written into the title number register 751 and the PGC number register 752. After this, the route processing routine is called in step S145 with the read PGC information#k as the Entry-PGC information.

Figure 24A:
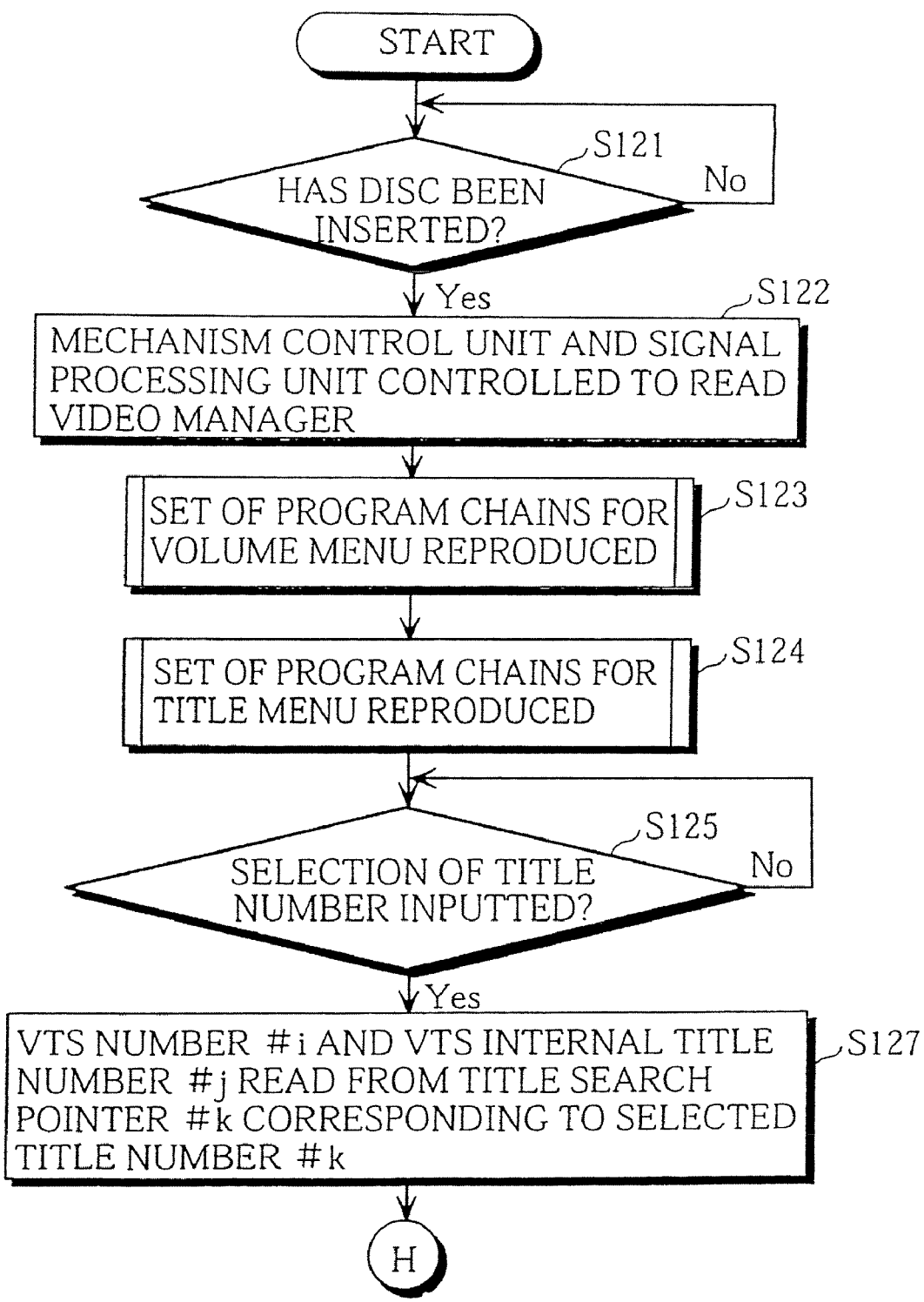
Figure 24C:
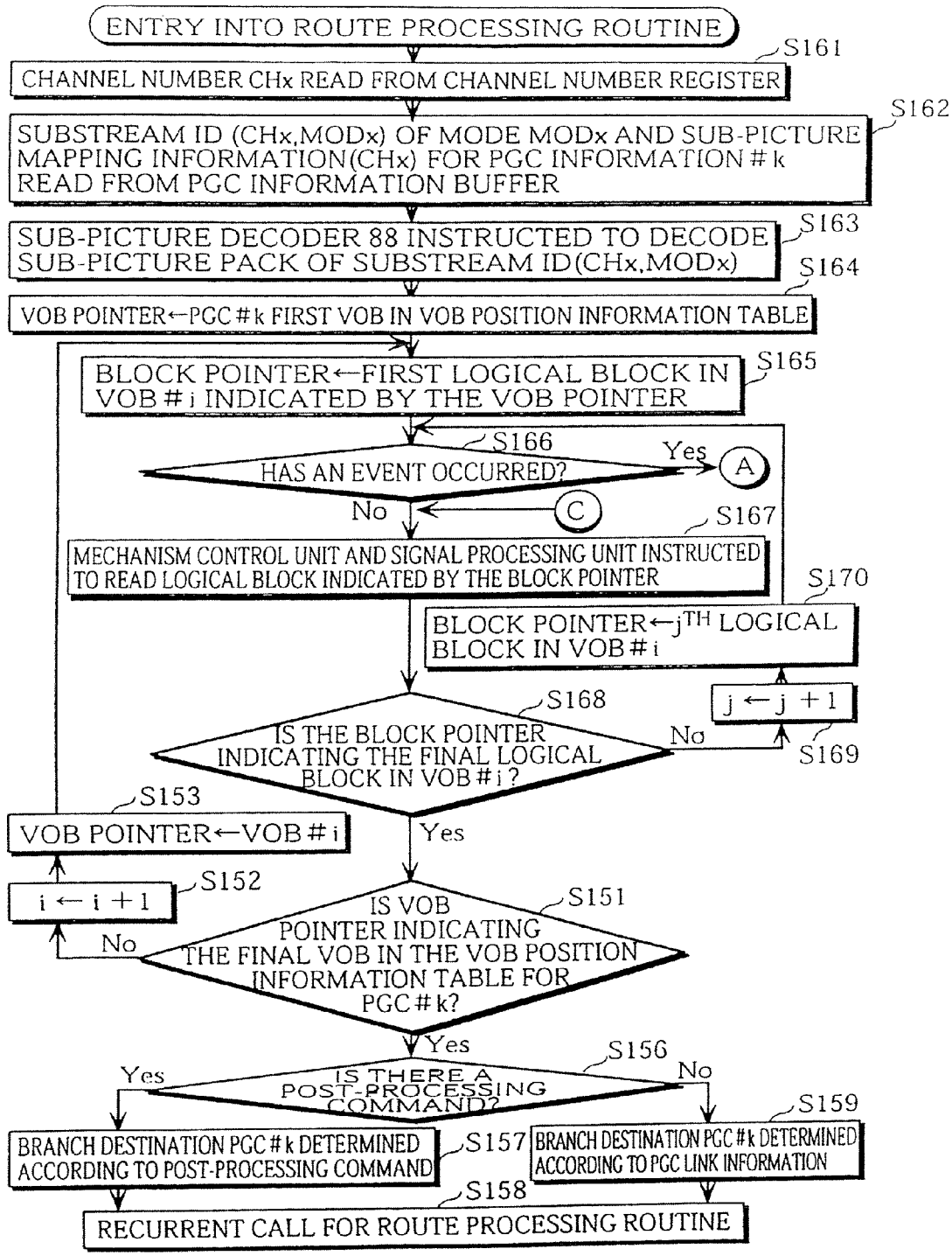
Figure 25B:
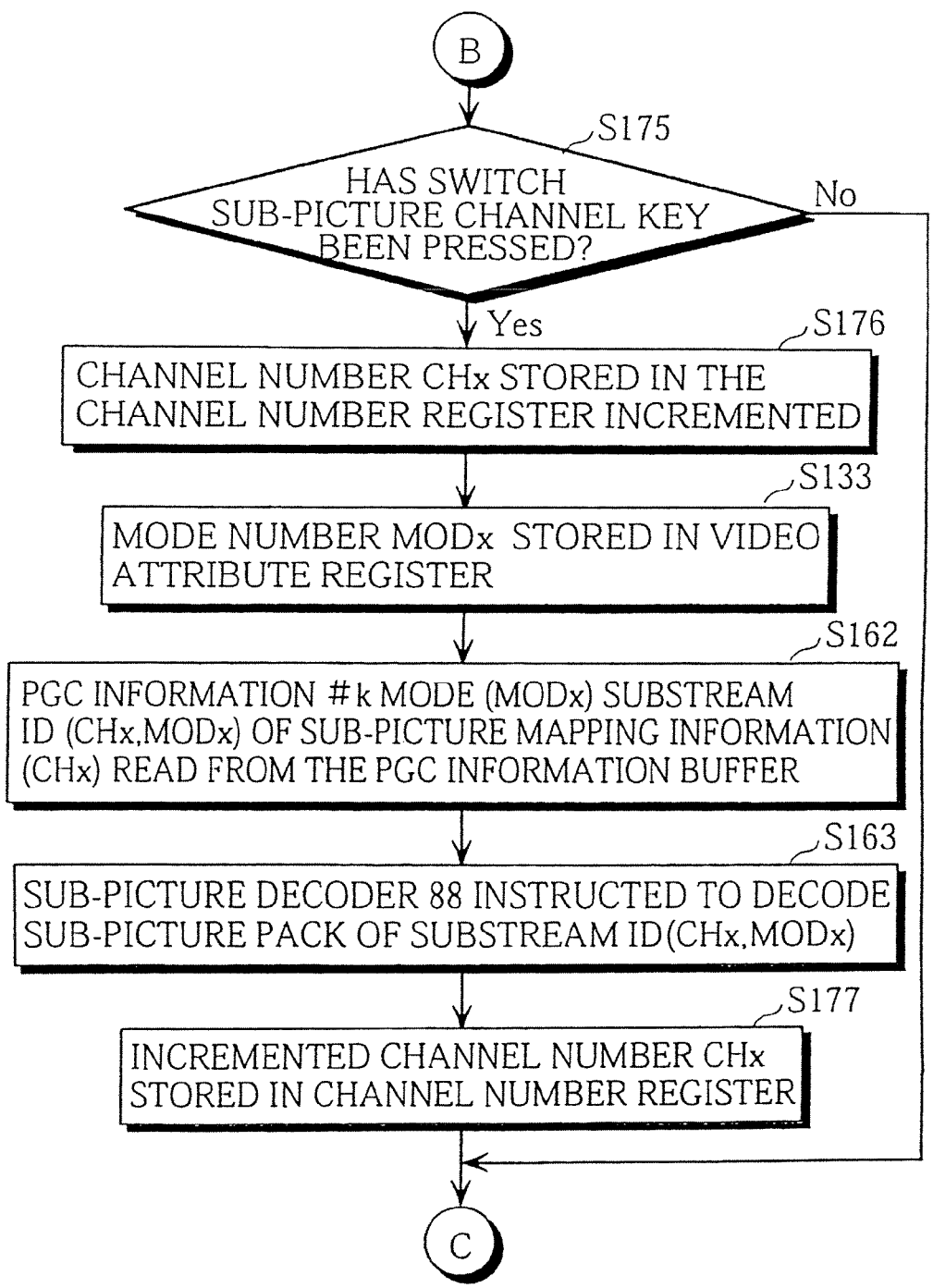

FIG. 24C is the flowchart for the route processing routine. In this figure, the "VOB pointer" indicates the VOB to be read, out of the VOB position information in the PGC information buffer 75, while the "block pointer" indicates the logical block which is presently being read, out of the VOB indicated by the VOB pointer.

In step S161, the logical channel number CHx stored in the sub-picture channel register 754 is read, and the display mode number stored in the video attribute register 755 is read. In step S162, the sub-picture substream which has a substream ID that coincides with the combination (CHx, MODx) of the numbers read in step S161 is determined out of the 32 substreams which can be included in the VOB. This is determined by referring to the sub-picture mapping information of PGC information#k which is stored in the PGC information buffer 75. When the combined number (CHx, MODx) is mapped onto one of the substream IDs, only the substream packs with this substream ID (hereinafter referred to a substream ID (CHx, MODx) are decoded in step S163, with the sub-picture selecting unit 122 and the sub-picture decoder 88 being instructed beforehand to discard sub-picture packs with other substream IDs.

Once these indications have been sent to the sub-picture selecting unit 122 and the sub-picture decoder 88, the processing advances to S164 where the system control unit 93 initializes the VOB pointer by setting the first VOB in the VOB position information table of PGC information#k in the VOB pointer. In step S165, the system control unit 93 initializes the block pointer by setting the first logical block in VOB#i indicated by the VOB pointer in the block pointer. Next, in step S166, a check is performed to see whether an event has been caused by a user operation, and if not, in step S167, the mechanism control unit 83 and the signal processing unit 84 are activated to read the logical block indicated by the block pointer. Here, since each VOB is made up of a plurality of VOB units which each have a management information pack at the front, a management information pack is read first by the signal processing unit 84. The signal processing unit subjects the signal read by the optical pickup to the variety of processes described above, and the processed data is stored in logical block units in the buffer memory inside the system control unit 93. The signal separating unit 86 receives the packs transmitted from the buffer memory and refers to the stream ID and substream ID in the header of each pack to detect whether each pack is a management information pack. Here, detected management information packs are outputted to the system control unit 93.

The reproduction control unit 72 sets the transfer rate and buffer size included in each management information pack and prepares for the decoding of the video pack, audio pack, and sub-picture pack which follow the management information pack in question.

Next, in step S168, the reproduction control unit 72 judges whether the block pointer is indicating the final logical block in VOB#i, and if not, the processing advances to step S169, where the variable j is incremented by one, and to step S170, where the block pointer is updated to the jth logical block in VOB#i. After this, the processing returns to step S166 in FIG. 24C.

By repeating the processing in steps S166 to S170, all of the video packs, audio packs, and sub-picture packs which compose the present VOB are successively read. The signal processing unit 84 performs the stated processing for the signal read by the optical pickup and stores the data in logical block units in the buffer memory inside the system control unit 93. The signal processing unit 86 receives the packs sent from the buffer memory and determines the stream ID and substream ID in the header of each pack.

For video packs, the MPEG decoder 120 judges whether the stream ID is "1110 0000" and outputs the packs to the video decoder 87. The video decoder 87 decodes the packs according to MPEG methods and, having waited an appropriate time according to the SCR and PTS, outputs the decoded video signal to the picture mixing unit 90.

For sub-picture packs, the MPEG decoder 120 judges whether the stream ID is "1011 1101" and whether the first three bits of the substream ID are "001". The sub-picture selecting unit 122 refers to the lower-order five bits of the sub-stream ID and judges whether the display mode indicated in the read sub-picture pack coincides with the substream ID (CHx, MODx) indicated by the system control unit 93. This substream ID (CHx, MODx) is the substream ID, out of the sub-picture mapping information in PGC information #k, which coincides with the combination of the logical channel number (CHx) stored by the sub-picture channel register 754 and the display mode number MODx stored by the video attribute register 755. The sub-picture selecting unit 122 discards sub-picture packs which do not have this substream ID (CHx, MODx). Here, the logical channel number (CHx) stored by the sub-picture channel register 754 and the display mode number MODx stored by the video attribute register 755 are set in the disc reproduction apparatus in accordance with user operations, or with values which are set within the disc reproduction apparatus before shipping from the factory.

By having only the matching sub-picture packs outputted from the sub-picture selecting unit 122 to the sub-picture decoder 88, the sub-picture decoder 88 will only receive sub-picture data for the display mode and the subtitle language settings which are currently operational. The sub-picture decoder 88 subjects the received sub-picture packs to run-length decoding and waits for an appropriate period of time based on the SCR and the PTS before outputting the result of the decoding to the image mixing unit 90. The outputs of the video decoder 87 and the sub-picture decoder 88 are then mixed by the image mixing unit 90 according to the mixing ratio specified by the system control unit 93. This mixed signal is converted into an analog signal and is outputted to the wide-screen TV monitor 2 or the standard TV monitor 3.

When the above processing has been repeated a number of times, the block pointer ends up indicating the final logical block in the VOB indicated by the VOB pointer. When this is the case, the judgment "Yes" is given in step S168, and the processing advances to step S151, where it is judged whether the VOB pointer is indicating the final VOB in the VOB position information table for PGC information #k. If this is not the case, in step S152 the variable i is incremented and in step S153 the VOB pointer is set to indicate the next VOB in the VOB position information of PGC#k. The processing then returns to step S165 and the processing in steps S166 to S170 is repeated for the newly indicated VOB.

By repeating the above processing, the VOB pointer will end up indicating the final VOB in the VOB position information table of PGC information #k, with this being detected in step S151. If the VOB pointer indicates the final VOB in a VOB position information table, this means that the reproduction route indicated by one set of PGC information has been completed. Once a reproduction route has been completed, a check is performed to see if a post-processing command is present in the command field of the PGC information stored in the PGC information buffer 75. When such a command is present, the branch destination PGC information #k is set according to the post-processing command in step S157, while if no command is present, the branch destination PGC information #k is set in step S159 according to the PGC link information. After the branch destination PGC information #k has been set, a recurrent call of the route processing routine is performed.

The following is an explanation of the case when the user presses the "switch display mode" key 915 during the repeated retrieval of VOBs in steps S166-S170 in the flowchart of FIG. 24C. When the "switch display mode" key 915 is pressed, the judgment "Yes" is given in step S166 and the processing switches to step S174 of the flowchart in FIG. 25A. Step S174 is performed to determine whether the switch display mode key 915 has been pressed, so that in the present case the judgment "Yes" is given and the processing advances to step S131 where the aspect ratio information is read from the VTS management information of VTS#i. Once this has been read, a determination is performed in step S132 to see whether the read aspect information is "16:9 wide screen".

If the read aspect ratio information is "16:9 wide screen", the processing advances to step S133, where the display mode information MODx stored in the video attribute register 755 is read. In step S134, the set value of the display mode information MODx is incremented, and the incremented value is stored once again in the video attribute register 755 to update the display mode information.

As one example, when the set value MODx of the display mode represents "wide-screen TV display mode", the updating in step S134 can update the set value MODx to a value which represents "letterbox display mode".

As another example, when the set value MODx of the display mode represents "letterbox display mode", the updating in step S134 can update the set value MODx to a value which represents "pan scan display mode".

After updating, the processing advances to step S138 where the system determines whether the stored display mode MODx is pan scan display mode, and if so, the processing advances to step S139 where the pan scan/letterbox conversion unit 95 is informed of pan scan display mode, before the processing advances to step S161.

If in step S138, the read display mode MODx is not pan scan display mode, the processing advances to step S140, where the system determines whether the stored display mode MODx is letterbox display mode. If so, the processing advances to step S141 where the pan scan/letterbox conversion unit 95 is informed of letterbox display mode, before the processing advances to step S161.

In step S161, the logical channel number CHx stored by the sub-picture channel register 754 and the display mode number MODx stored by the video attribute register 755 are read. In step S162, the sub-picture substream which has a substream ID that coincides with the combination (CHx, MODx) of the numbers read in step S161 is determined out of the 32 substreams which can be included in the VOB. This is determined by referring to the sub-picture mapping information of PGC information#k which is stored in the PGC information buffer 75. When the combined number (CHx, MODx) is mapped onto one of the substream IDs, only the substream packs with this substream ID (hereinafter referred to a substream ID (CHx, MODx) are decoded in step S163, with the sub-picture selecting unit 122 and the sub-picture decoder 88 being instructed to discard sub-picture packs with other substream IDs.

As described above, when the switch display mode key 915 is pressed, the display mode MODx stored in the video attribute register 755 is incremented, a switching of display mode is performed by the pan scan/letterbox conversion unit 95, and the sub-picture data to be decoded is selected in accordance with the newly set display mode. By doing so, even if the user requests a switching of display mode during the reproduction of a video title, the sub-picture data which includes a display command that sets the superimposing position for the new display mode will be selected.

The following is an explanation of the case when the user presses the "switch sub-picture channel" key 914 during the repeated retrieval of VOBs in steps S166-S170 in the flowchart of FIG. 24C. When the "switch sub-picture channel" key 914 is pressed, the judgment "Yes" is given in step S166 and the processing switches to step S174 of the flowchart in FIG. 25A. Step S174 is performed to determine whether the switch display mode key 915 has been pressed, so that in the present case the judgment "No" is given and the processing advances to step S175. In step S175, it is determined whether the switch sub-picture key 914 has been pressed, so that in the present case the judgment "Yes" is given and the processing advances to step S176. In step S176, the logical channel number CHx stored in the sub-picture channel register 754 is read and is incremented. Next, in step S133, the display mode information MODx stored in the video attribute register 755 is read. In step S162, the sub-picture substream which has a substream ID that coincides with the combination (CHx, MODx) of the read numbers is determined out of the 32 possible substreams which can be included in the VOB. This is determined by referring to the sub-picture mapping information of PGC information#k which is stored in the PGC information buffer 75. When the combined number (CHx, MODx) is mapped onto one of the substream IDs, only the substream packs with this substream ID (hereinafter referred to a substream ID (CHx, MODx) are decoded in step S163, with the sub-picture selecting unit 122 and the sub-picture decoder 88 being instructed to discard sub-picture packs with other substream IDs. In step S177, the incremented channel number (CHx) is stored once again in the sub-picture channel register 754.

As described above, when the switch sub-picture channel key 914 is pressed, the logical channel number stored in the sub-picture channel register 754 is incremented, a switching of the logical channel number is performed by the pan scan/letterbox conversion unit 95, and the sub-picture data to be decoded is selected in accordance with the newly set channel number. By doing so, even if the user requests a switching of display language of subtitles during the reproduction of a video title, the sub-picture data which includes a display command that sets the superimposing position for the new display language will be selected.

FIGS. 27A to 27D show the combined images given by combining the main image and the sub-picture in the four display types shown in FIG. 20.

For the first display type which corresponds to the case when the aspect ratio of the screen is 16:9 and the video materials have been adapted for wide-screen display, the DVD player 1 superimposes the English subtitles "Penguin" at the superimposing position (Xw1, Yw1) to (Xw2, Yw2) shown in FIG. 13C which is unique to wide-screen TV display mode. As can be seen from FIGS. 27A and 27C, the subtitles are superimposed at a position in wide-screen TV display mode which protrudes into the area trimmed in pan scan display mode. This sub-picture unit displayed in wide-screen TV display mode can therefore be seen to make full use of the width of a wide-screen TV and is superimposed at the position shown in FIG. 27A.

For the second display type which corresponds to the case when the display mode is "4:3 letterbox" and the video materials have been adapted for wide-screen display, the DVD player 1 superimposes the English subtitles "Penguin" at the superimposing position (Xb1, Yb1) to (Xb2, Yb2) shown in FIG. 13B which is unique to letterbox display mode. As shown in FIG. 13B, the subtitles "Penguin" are superimposed at a position which is neatly positioned over the corrective image. By setting the superimposing position of RLE code sequence f11 in this way, the subtitles can be displayed in letterbox display mode at a position which does not overlap the main image, with this being shown in FIG. 27B.

Figure 27A:
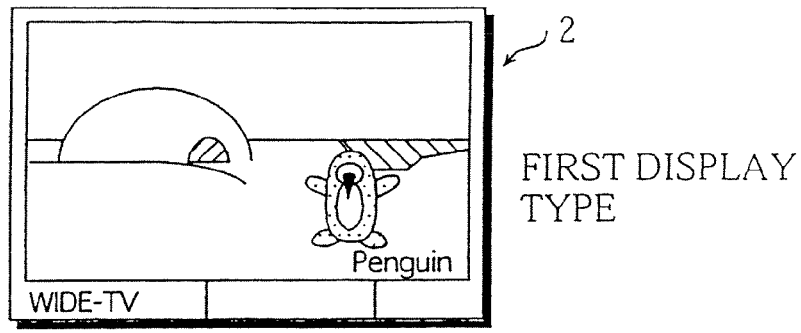
FIGS. 27A to 27D show combined images which are used in the four types of viewing environments.
Figure 27B:
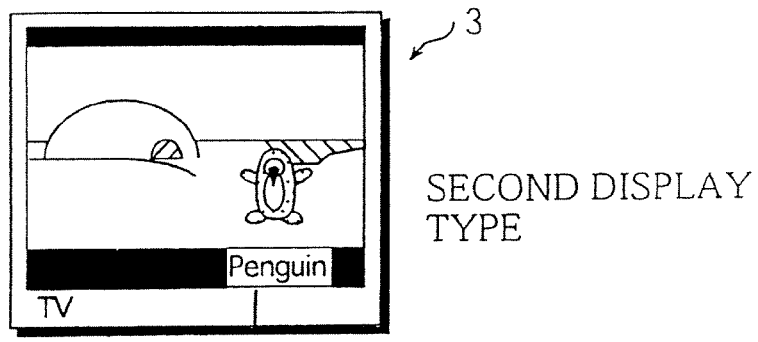
Figure 27C:
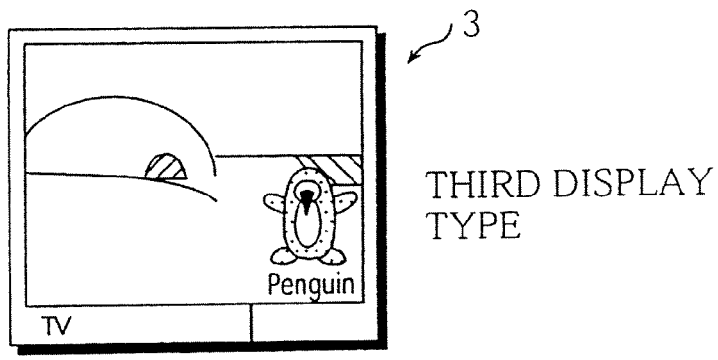

For the third display type which corresponds to the case when the display mode is "4:3 pan scan" and the video materials have been adapted for wide-screen display, the DVD player 1 superimposes the English subtitles "Penguin" at the superimposing position (Xp1, Yp1) to (Xp2, Yp2) shown in FIG. 13A which is unique to pan scan display mode. As shown in FIG. 13A, the subtitles have been superimposed at a position which has been shifted somewhat to the left so as to not protrude into the trimmed area. As a result, the subtitles do not end up being trimmed and so can be properly displayed, as shown in FIG. 27C.

Figure 27D:
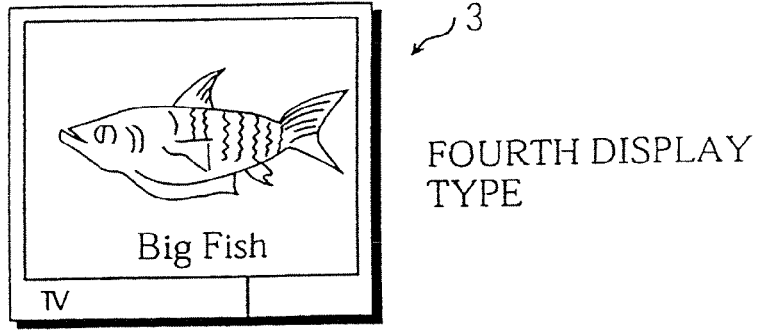

For the fourth display type which corresponds to the case when the aspect ratio of the screen is 4:3 and the video materials have not been adapted for wide-screen display, DVD player 1 superimposes the English subtitles "Big Fish" as shown in FIG. 27D.

With the present embodiment of the invention described above, a multimedia optical disc can be achieved where information for the selection of sub-picture information, in accordance with the settings of display mode and sub-picture channel number, is stored for each unit of PGC information. As a result, a disc reproduction apparatus can change the substream ID by which the selection of sub-picture information is made for every PGC information unit.

As one example, in one set of PGC information, the substream ID#1 can represent English subtitles and letterbox display mode, substream ID#2 can represent English subtitles and pan scan display mode, and substream ID#3 can represent English subtitles and wide-screen TV display mode. Even so, in a different set of PGC information, all display modes can be set at, say, substream ID#2 by changing the sub-picture mapping information in the PGC information. This corresponds to the case where the subtitles are centered on the screen and so are largely unaffected by the selected display mode. As a result, all display modes may use the same substream.

The present invention has been described in terms of one specific embodiment, although it should be obvious that several modifications are possible within its scope, provided they are still relate to a system which avoids the displacement of a sub-picture when switching display mode. Examples of possible modifications are given below.

(a) The present embodiment describes the case where a digital video disc (DVD) is used as the multimedia optical disc, although any other type of recording media which can store a plurality of sub-pictures multiplexed with video data may be used. The reproduction device is also described as reproducing a DVD, although so long as it receives information in which a plurality of sub-pictures are multiplexed with video information, this need not be the case. The reproduction device may instead include a reception means for receiving data communication. An example of this communication would be a digital broadcast of a MPEG stream using satellite broadcasting. Here, frequency multiplexing and time axis multiplexing are available as methods for transmitting a plurality of MPEG streams to allow selective reproduction. In the time axis multiplexing method, selective reproduction is performed by waiting for the broadcast of the selected MPEG stream and reproducing the stream when it is transferred.

(b) In the present embodiment, all video materials which are adapted to wide-screen display mode are described as having the potential to be displayed in pan scan display mode or letterbox display mode, although in reality, there are cases where the video content is unsuited to trimming or reduction, making it necessary to clarify such limitations. To overcome this problem, "display mode information", which shows whether letterbox or pan scan display modes are available, can be included in the video title set management information to prevent the user from selecting letterbox or pan scan display mode where inappropriate.

(c) The VOB position information table of the present invention has been described as a list of storage locations for VOBs, based on which the disc reproduction apparatus reads VOBs, although by storing partial areas of the storage locations of the VOBs in this table, the optical pickup can be made to read only part of the VOBs, such partial reading being known as "trimming". These trimmed parts of VOBs are indicated in units called cells. By doing so, by indicating partial areas in the VOB position information, only part of a VOB is used as a core part, so that an increase in the efficiency with which video materials are used can be made.

(d) In the present embodiment, the subtitles are described as being composed of image data, although it is equally possible for the sub-picture to be composed of vector graphics, or three-dimensional computer graphics (CG). By doing so, games which use compressed video footage and computer graphics can be achieved using the present disc.

(e) In the present embodiment, a VOB unit consists of one GOP, although it should be needless to say that if the stored video information has a reproduction time of about one second, a VOB unit may consist of two or three GOPs with a very short reproduction time. In this case, one management information pack is set before such a plurality of consecutive GOPs. The management information pack is then effective for the plurality of GOPs.

(f) In the present embodiment, PCM data and AC-3 data are used as the audio data, although any other format which may be interleaved into a system stream may be used, with examples of such being compressed PCM, MPEG audio data, and MIDI data.

(g) In the present embodiment, digital moving picture data according to MPEG2 standard is used for the moving picture data. However, other kinds of moving picture data, such as the digital moving picture data under MPEG1 or digital moving picture data with a conversion algorithm other than DCT (Discrete Cosine Transform) under MPEG, may be used so long as the moving picture data can be combined with audio data and sub-picture data to form multimedia data.

(h) In the present embodiment, management information packs are included in VOBUs in units of GOPs, these being the units of reproducing moving picture data. However, it should be obvious that if the method for compressing digital moving pictures changes, the unit of the management information pack changes according to the compression method.

Finally, a method for producing the optical disc used in the present embodiment is described. The editor prepares master tapes, such as video tapes of various shots filmed with video cameras and music tapes in which songs and sounds are recorded live. The moving pictures and sounds in the tapes are digitized and loaded into a nonlinear editing machine. The editor creates menus and items using application programs, such as a graphic editor provided in an editing machine, and reproduces video and sounds frame by frame. The editor also creates management information packs including Highlight commands using a GUI generator or the like. The editor then encodes the above data according to MPEG standards to create video data, audio data, sub-picture data, and management information packs. After this, the editor creates VOB units and VOBs using the nonlinear editing machine. The editor also assigns numbers to the VOBs. Also, the editor creates PGC information #1, #2, #3, . . . , #n, a VM title search pointer table, and a video manager. The editor then loads these sets of data into the memory of a workstation.

The data is converted into logical data sequences so that the data is recorded in the file area. The logical data sequences are recorded onto a medium, such as the magnetic tape, then converted to physical data sequences. The physical data sequences include volume data with ECC (Error Check Code), Eight-to-Sixteen conversion, and data in the lead-in area and lead-out area. A master optical disc is produced using the physical data sequences. Then, copies of the master optical disc are manufactured by using a pressing machine.

Conventional CD manufacturing machines may be used for manufacturing the above-constructed optical disc with the exception of the processes related to the generation of logical data sequences for the data construction of the present invention. These manufacturing methods are described in Heitaro Nakajima and Hiroji Ogawa: "Compact Disc Dokuhon", Ohmu Ltd. and Applied Physics Society Optics Meeting Optical Disc System, Asakura Shoten.

Commercial Applications

The multimedia optical disc of the present invention stores high impact wide-screen TV video titles and allows the favorable distribution and retailing of such optical titles.

The reproduction apparatus and method of the present invention allow the reproduction of the above disc by low cost household AV equipment with limited memory capacity.

Although the present invention has been fully described by way of examples with reference to the accompanying drawings, it is to be noted that various changes and modifications will be apparent to those skilled in the art. Therefore, unless such changes and modifications depart from the scope of the present invention, they should be construed as being included therein.

What is claimed is:

1. A non-transitory recording medium having recorded thereon a set of data and a set of management information, wherein
   the set of data includes a plurality of video objects that include a set of moving picture data that composes a video title and a plurality of sets of sub-picture data to be reproduced selectively,
   each set of the sub-picture data includes a set of still image data and a set of coordinate information indicating a display position of a still image,
   the set of management information includes pairs of a set of display mode information and a set of the sub-picture indicating information for indicating, for each display mode for the moving picture data, the corresponding sets of sub-picture data,
   the set of display mode information indicates one of a plurality of display methods when the set of moving picture data is displayed at one of a plurality of aspect ratios; and
   the set of sub-picture indicating information indicates a set of sub-picture data, out of the plurality of sets of sub-picture data, that includes the set of coordinate information which coincides with one of the display methods indicated by the set of display mode information,
   the plurality of aspect ratios are 3:4 and 9:16,
   the display methods are a pan scan and a letterbox at an aspect ratio of 3:4, and
   the management information further includes information, for each video title, indicating whether the pan-scan or the letterbox is permitted or not.

2. A playback apparatus that reads the plurality of video objects from the non-transitory recording medium of claim 1, the playback apparatus comprising:
   a display mode register storing therein a setting of a display mode of a display screen on which a moving picture is to be displayed;
   a determining unit determining one of the set of display mode information that corresponds to the setting stored in the display mode register, the set of display mode information being included in the set of management information;
   a separating unit separating, from one of the plurality of video objects, sub-picture data and moving picture data that are indicated by the determined one of the set of display mode information;
   a sub-picture decoder decoding the separated sub-picture data to obtain a sub-picture;
   a moving picture decoder decoding the separated moving picture data to obtain the moving picture; and
   a combining unit combining the sub-picture with the moving picture.

* * * * *